May 10, 1960

P. A. ADAMSON ET AL 2,936,116

ELECTRONIC DIGITAL COMPUTER

Filed Nov. 12, 1952

INVENTOR.
PHIL A. ADAMSON,
HOWARD L. ENGEL,
BY ELDRED C. NELSON,

Seymour M. Rosenberg

ATTORNEY.

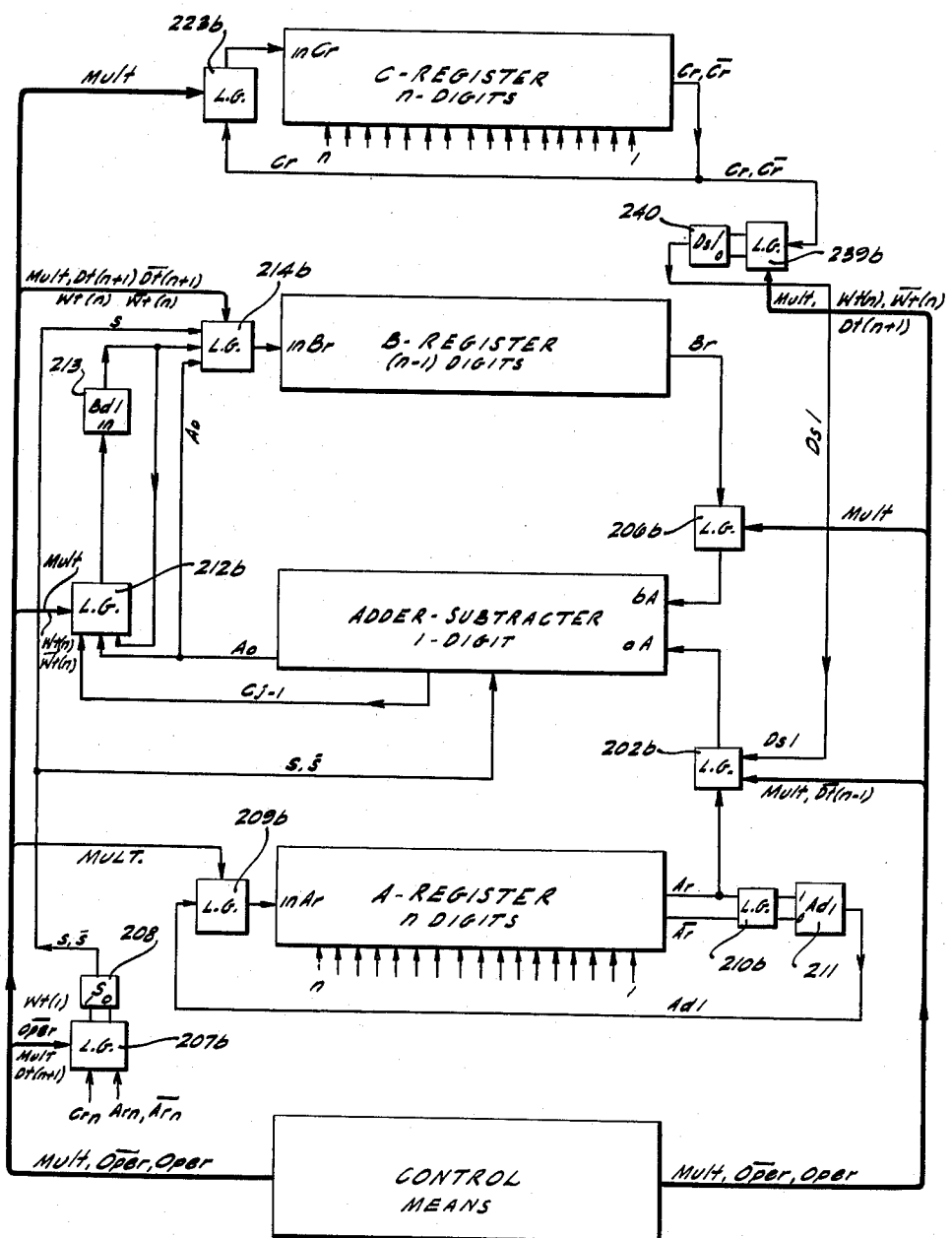

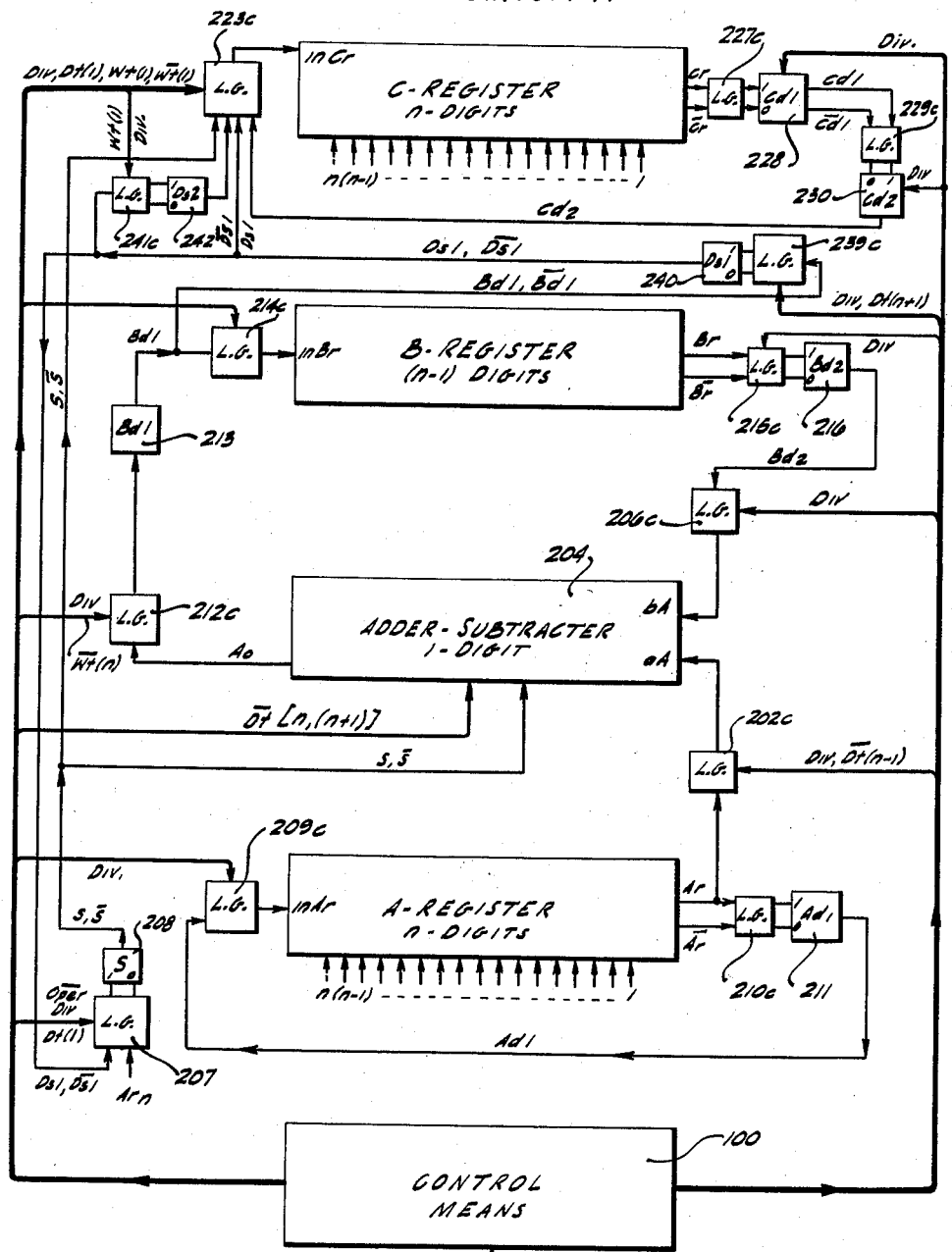

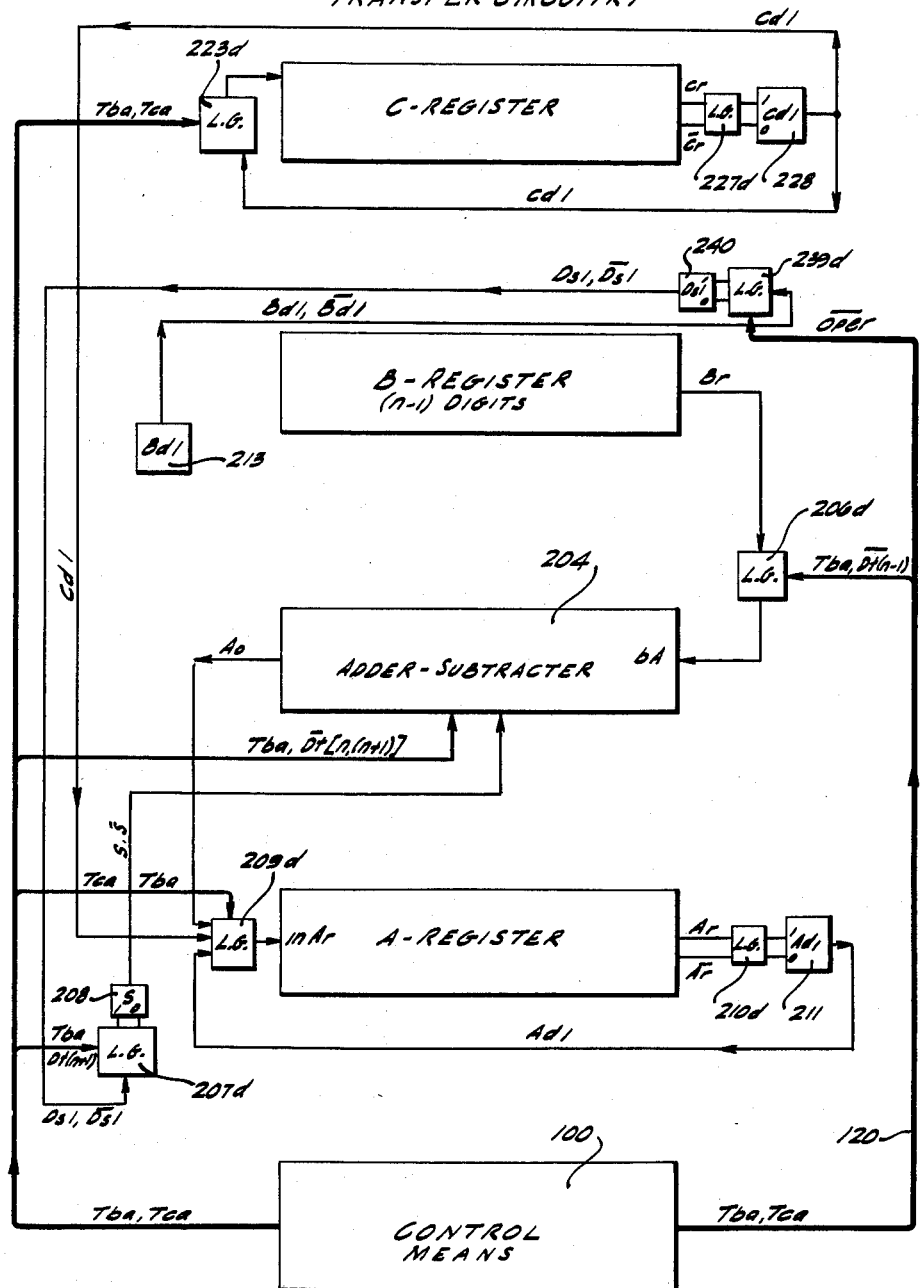

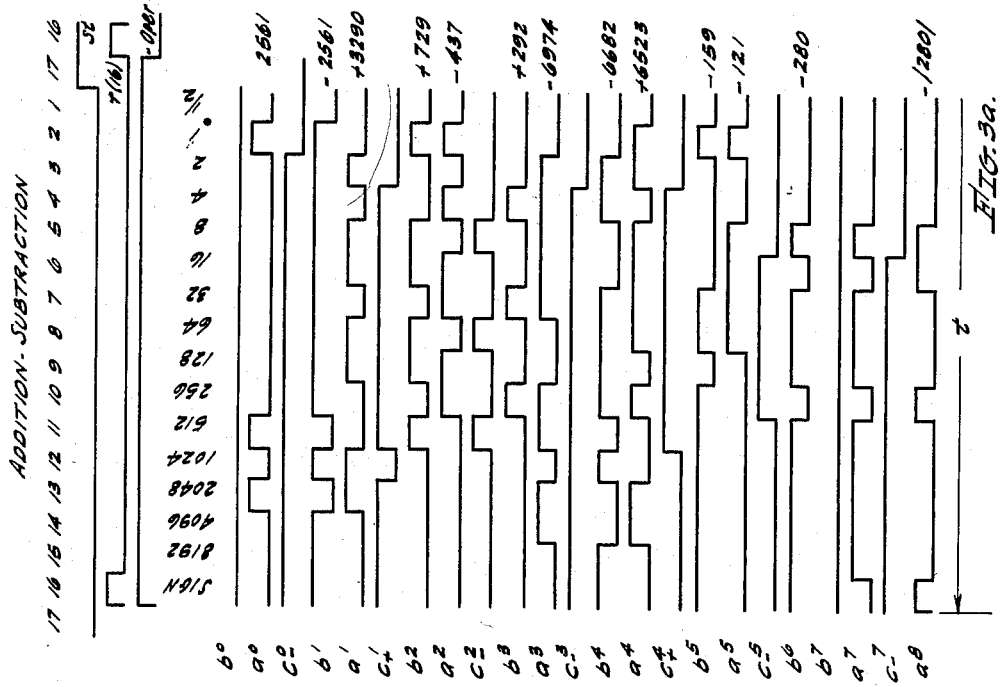
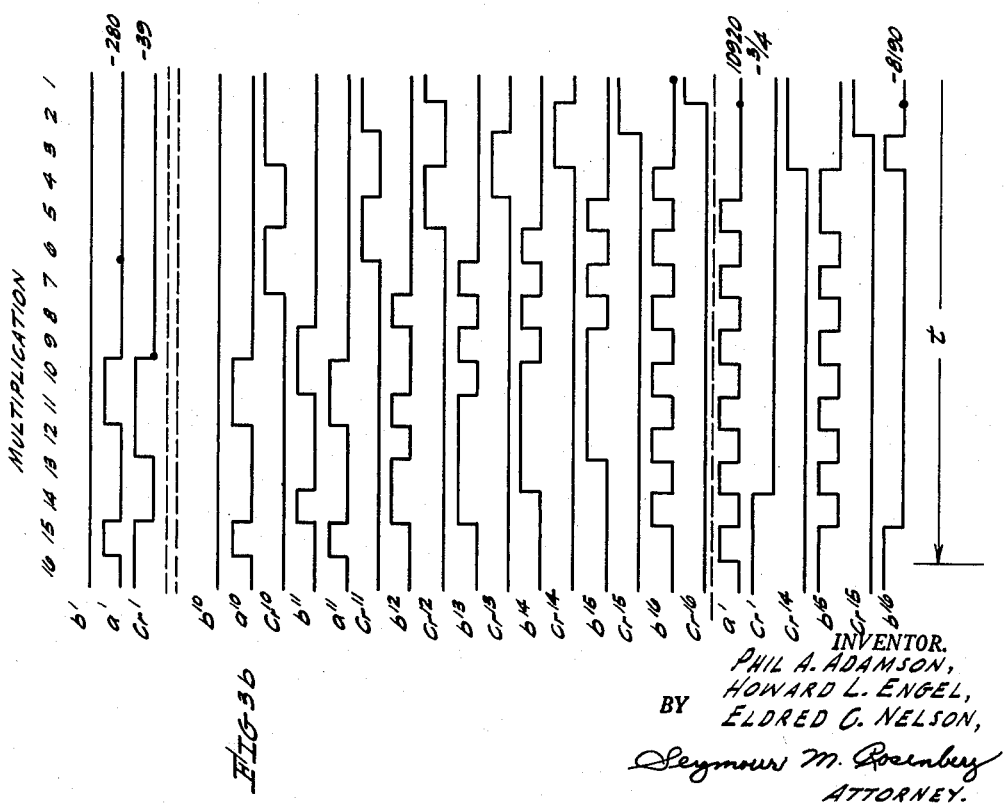

INVENTOR.
PHIL A. ADAMSON,
HOWARD L. ENGEL,
ELDRED C. NELSON,
ATTORNEY.

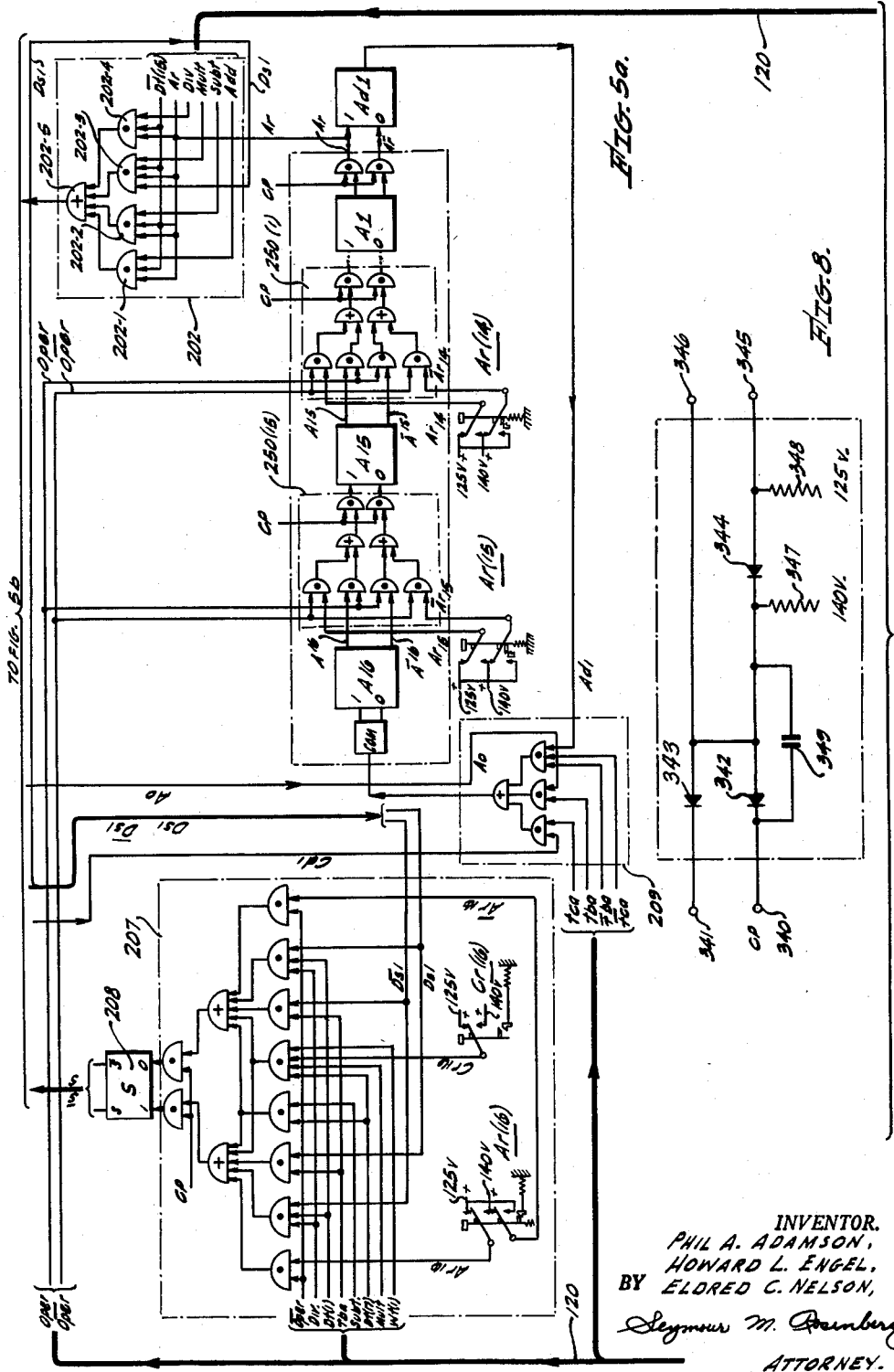

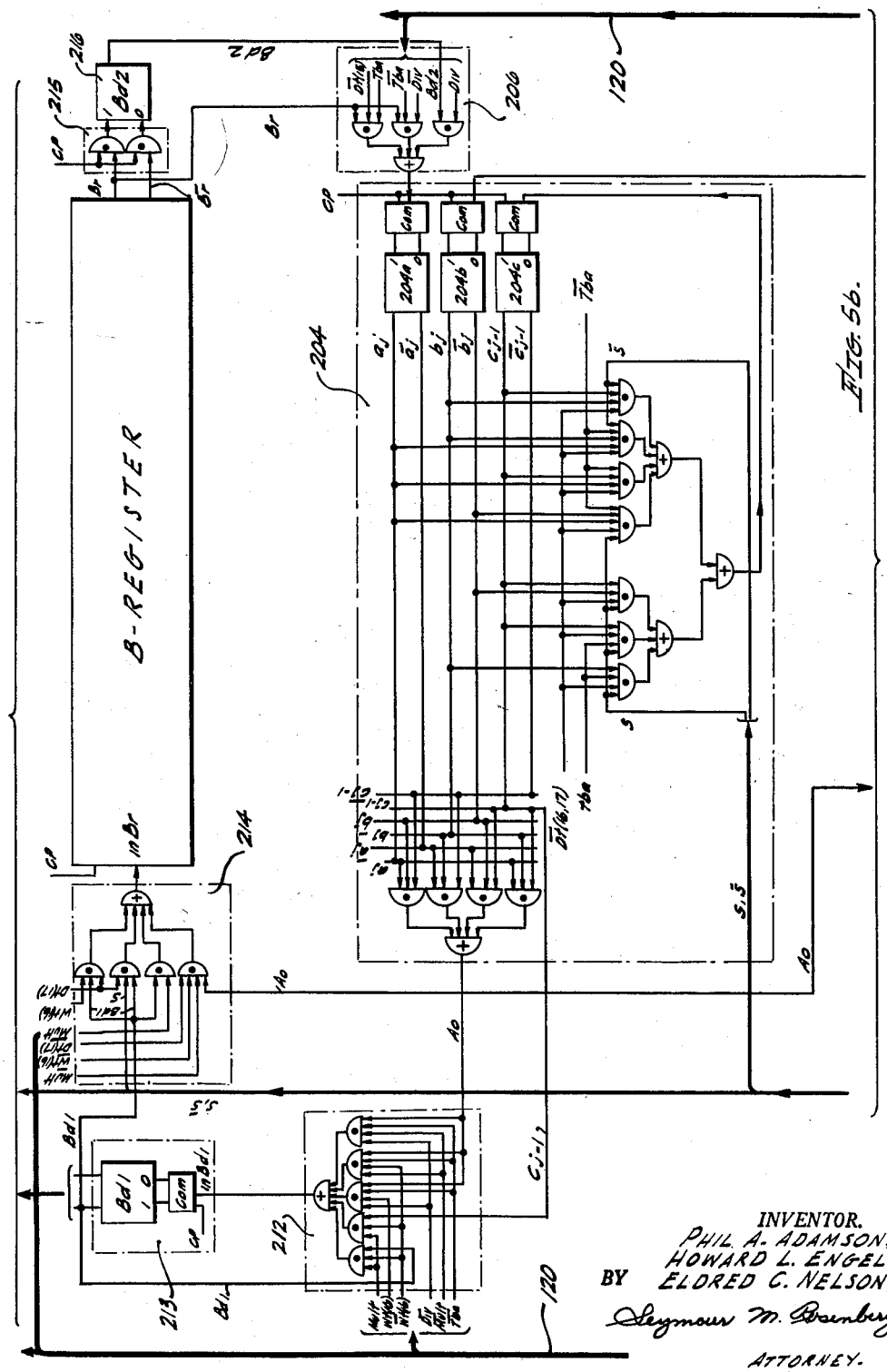

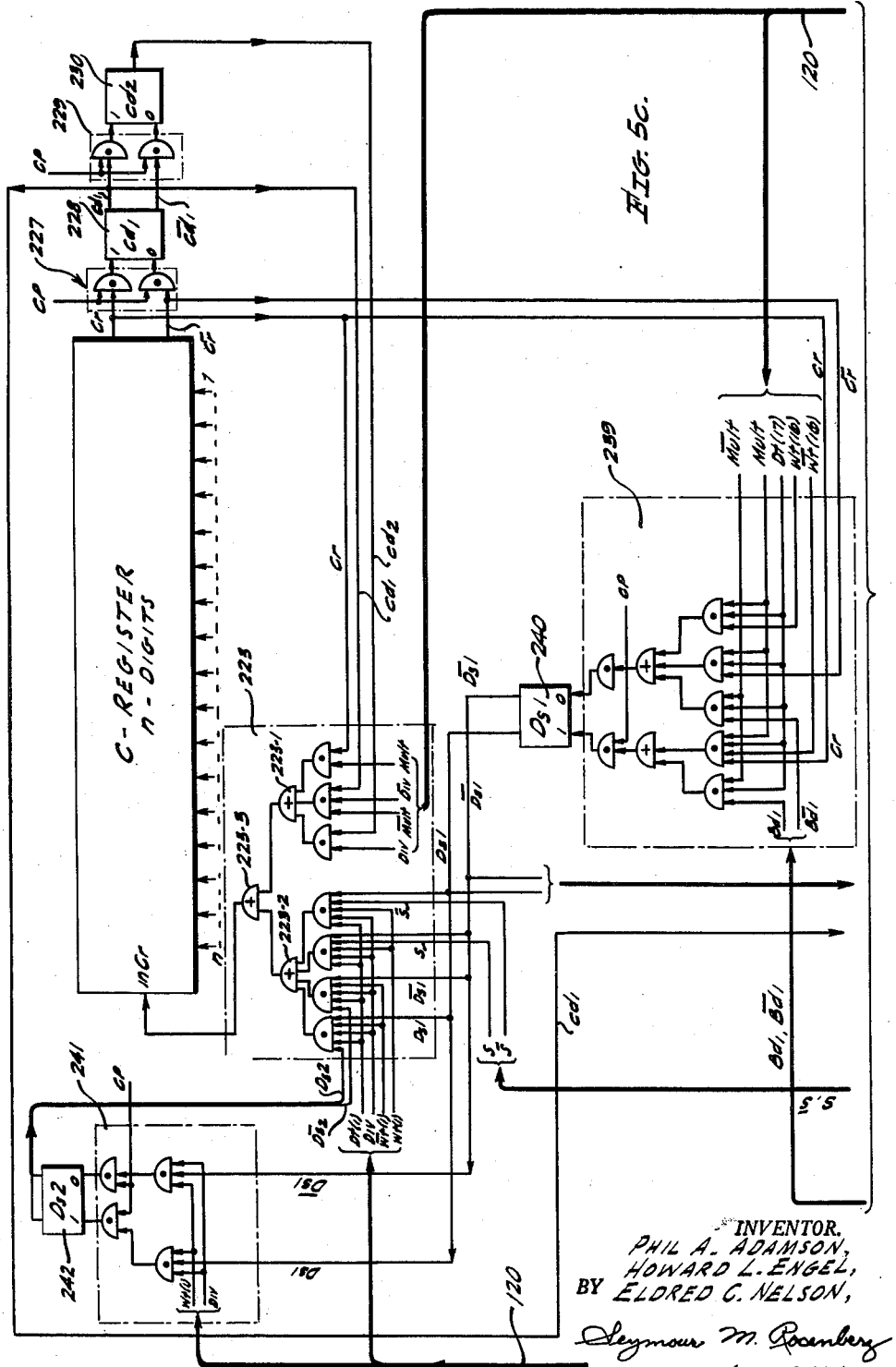

May 10, 1960 — P. A. ADAMSON ET AL — 2,936,116
ELECTRONIC DIGITAL COMPUTER
Filed Nov. 12, 1952 — 13 Sheets-Sheet 12

INVENTOR.
PHIL A. ADAMSON,
HOWARD L. ENGEL,
BY ELDRED C. NELSON,
Seymour M. Rosenberg
ATTORNEY.

United States Patent Office 2,936,116
Patented May 10, 1960

2,936,116

ELECTRONIC DIGITAL COMPUTER

Phil A. Adamson, San Gabriel, and Howard L. Engel and Eldred C. Nelson, Los Angeles, Calif., assignors, by mesne assignments, to Hughes Aircraft Company, a corporation of Delaware Application November 12, 1952, Serial No. 319,815

20 Claims. (Cl. 235—165)

This invention relates to an electronic digital computer and, more particularly, to an electronic digital computer for performing arithmetic operations in accordance with binary-coded instructions upon binary-coded numbers, the computer being completely mechanized in accordance with diagrammatic notation or Boolean algebraic equations.

It has been well established that electronic digital computers may be designed most efficiently when the computations are performed in a binary-coded system of notation. One reason for this is that it has been found that the most reliable, inherently digital, electronic element is a two-stable-state device, such as a bistable multivibrator or flip-flop. Electronic devices having more than two states, such as multielectrode tubes for storing decimal digits, have not been reduced to economical and efficient practice. Once it is recognized that the electronic two-state device is the most practical, then it can be readily shown that these two-state devices may be utilized most economically if they are incorporated into a binary-coded system.

In general, any machine, whether electronic or not, which uses two-state devices and signals can be analyzed in terms of diagrammatic notation, such as Boolean algebra. In Boolean algebra, the variables or algebraic quantities have only two values or states, conveniently referred to as "one" and "zero" (1, 0), or as "on" and "off." These values may be represented in an electrical system by two voltages, where according to one convention, the higher of the two voltages may be considered as the "1" or "on" voltage and the lower of the two voltages as the "0" or "off" voltage. Where the values are represented by voltages, the system is herein referred to as a voltage-level system, as distinguished from a pulse system where, according to one convention, the presence of a positive or negative pulse represents "1" and the absence of a pulse represents "0,"

For each Boolean algebraic variable or function, such as A, there is a complementary variable or function $\bar{A}$, where $\bar{A}$ has the values of "1" and "0" when A has the values of "0" and "1," respectively. Each pair of complementary variables may be provided by a flip-flop, where one output terminal or anode connection of the flip-flop may be considered as the A output and the other output terminal considered as the $\bar{A}$ output. Thus, when the flip-flop is "on," A is 1 and $\bar{A}$ is 0, whereas when the flip-flop is "off," A is 0 and $\bar{A}$ is 1.

Any Boolean algebraic function may be defined in terms of logical additions and logical multiplications. Logical addition may also be referred to herein as an "or" function or operation and is represented as the sum of two or more variables. For example, $f(A,B)=A+B$ represents the "or" function of A and B and is defined as meaning that $f(A,B)$ is 1, when A is 1, or B is 1, or A and B are 1. Thus, the plus sign between variables indicates an "or" relationship. Logical multiplication may also be referred to herein as an "and" function or operation and is represented as the product of two or more variables. For example, $f(A,B)=A.B$ represents the "and" function of A and B, and is defined as meaning that $f(A,B)$ is 1 only when both A and B are 1. Thus, the dot between the variables indicates an "and" relationship.

In a voltage-level system, the "and" function provides an output voltage representing 1 only when all variables in the "and" function are at the voltage level corresponding to 1. In a pulse system, on the other hand, the "and" function may be considered as a coincidence function where a pulse, representing 1, is produced only when there is a coincidence of input pulses representing the variables. Similarly, the "or" functions can be interpreted for voltage level and pulse systems.

Consider now a complete Boolean algebraic function comprising both "and" and "or" functions:

$$f(A,B,C,D)=A.\bar{B}.\bar{C}.\bar{D}+\bar{A}.B.C.D+\bar{A}.\bar{B}.C.D$$

The function $f(A,B,C,D)$ is 1 when: A is 1 and B, C, and D are 0; or A is 0 and B, C, and D are 1; or A and B are 0 and C and D are 1. Such a function is typical of the signal and mechanization functions which are explained in detail below, where the basic rules for Boolean algebraic manipulation are considered with respect to specific circuits.

For each of the basic functions of logical addition and logical multiplication, there are basic electrical circuits referred to in the art as "and" circuits and "or" circuits, respectively. Examples of such circuits are shown on pages 37 to 45 of "High-Speed Computing Devices" by Engineering Research Associates, published in 1950 by McGraw-Hill Book Company, Inc., New York and London, and in an article entitled "Diode Coincidence and Mixing Circuits in Digital Computers" by Tung Chang Chen, in volume 38 of the "Proceedings of the Institute of Radio Engineers" on pages 511 through 514. In addition, specific diode "and" and "or" circuits as well as clock pulse circuits are considered in detail in this specification.

For every type of electrical "and" and "or" circuit, there are basic rules of mechanization, where mechanization means the electrical connections which are to be made in order that the electrical circuit produce signals representative of the desired Boolean algebraic function. For example, if it is desired to use two cathode-follower stages having a common cathode load circuit as an "or" circuit in order to produce an output signal representative of the Boolean function $f(A,B)=A+B$, signals representative of A and B are applied to the grids of the cathode-follower stages, respectively. In this manner, a 1 representing signal is produced across the common cathode load when either A or B is 1. Similar mechanizations for diode "and" and "or" circuits are explained in detail in this specification.

One of the earliest applications of Boolean algebra to practical circuit design was in the field of telephone switching, where the electromagnetic relay is the basic bistable device. The extensive work which has been done in analyzing relay switching circuits is summarized in a book entitled "The Design of Switching Circuits" by William Keister, Alistair E. Ritchie, and Seth H. Washburn, published by D. Van Nostrand Company, Inc., 1951.

Boolean algebra has also been utilized in the analysis of computer circuits. For example, a class of adder circuits, based upon a type of algebra which requires inhibitor elements and utilizes no complementary input signals, is shown and described on pages 97 to 106 in "Calculating Instruments and Machines" by Douglas R. Hartree, published by the University of Illinois Press, 1949. In addition, a complete algebraic analysis of certain types of computer switching circuits, binary function generating circuits, counter circuits, rectifier circuits, coding systems, binary adders, accumulators, and multipliers is found in "Synthesis of Electronic Computing and Control Circuits" by the Staff of the Computation Laboratory, published in 1951 by Harvard University Press, Cambridge, Massachusetts.

It will be noted, however, that none of the above references shows, and that none of the existing electronic digital computers comprises, a system completely mechanized in accordance with Boolean algebraic equations, where all of the operating instructions, timing instructions, and arithmetic routines are specified in accordance with Boolean algebraic equations.

The present invention discloses an electronic calculator for performing mathematical operations, in accordance with binary input instructions, upon binary numbers and is completely mechanized in accordance with Boolean algebraic equations. All instructions, such as orders to add, subtract, multiply, and divide, are specified in accordance with a first set of Boolean algebraic equations which may be referred to as control functions, and all instructions are carried out by means of a logical network which includes a plurality of logical "and" and "or" circuits mechanized in accordance with a second set of Boolean algebraic equations.

A logically mechanized system such as is provided by the present invention has many advantages over prior systems. Although it is possible to simplify specific logical switching circuits and logical computing circuits within prior art systems, the systems themselves cannot be analyzed so as to determine the most economical use of the specific logical circuits employed. In a specific case, this may mean that a flip-flop in the arithmetic unit of a prior art computer will have only one function, whereas, in the present invention, such a flip-flop may be utilized to the full extent indicated to be possible in the analysis of the system algebra. As a result, many of the components of the system of the present invention may be utilized on a time-sharing basis to perform more than one function.

A computer, which may be designed entirely according to logical equations, such as is provided by the present invention, is readily incorporated into a more complicated system, since the computer system algebra indicates how external signals should be applied to it. This means that the electronic computer provided by the present invention may be built initially as an independent unit, such as a desk calculator, and then incorporated into a complete computer system for performing the computation of more complicated problems.

The versatility of an embodiment of the present invention is limited only by the versatility of its defining Boolean algebra. Thus, an arithmetic unit based upon principles of the present invention can be modified with a minimum of circuitry to perform other operations in addition to the basic operations of addition, subtraction, multiplication, and division. For example, logical circuits may be included for various transfer operations in order to facilitate the sequencing or programming of arithmetic operations. An illustrative case is a transfer circuit for transferring the product resulting from a multiplication to a multiplier or multiplicand position, such that it may be utilized in a subsequent multiplication. Such a transfer operation makes it possible to multiply a series of numbers with considerable speed without necessitating an extra register to store numbers. In the programmed electronic computer described in the above copending application, the arithmetic unit of this invention is modified to include a function table operation which requires that the arithmetic unit perform a logical comparison.

Another contribution of the present invention results from the fact that mechanization functions may be directly interpreted as structure. It is possible, in view of this fact, to separate the problem of computer design into two principal parts, one being the derivation of the basic Boolean algebraic equations for the problem, and the second being the modification of the basic equations and the mechanization of the resulting modified equations. The basic functions may be formulated by specialists who become expert in the art of translating a particular problem into Boolean algebraic logic. The general principles of this translation are fully described in the detailed description which follows. After the basic Boolean algebraic equations have been formulated, engineering personnel, specializing in the circuit techniques required to mechanize the input functions, design the basic circuit components and modify the basic algebraic equations in order to minimize the power required for operation, provide the most reliable operation, and insure economy in equipment cost. In a specific way, this may mean that the specialists will study a particular business accounting problem and put it into terms of Boolean algebraic logic. The engineering personnel, then, having selected the basic logical circuits to be utilized, will modify these equations in order to provide an efficient machine. The resulting logical circuits may be mechanized by technicians in accordance with basic mechanization rules which are dependent upon the particular type of logical circuits utilized. These mechanization rules are fully explained hereinafter.

After the computer has been constructed, it may be tested in accordance with the modified Boolean algebraic equations provided by the engineering personnel. Thus, technicians knowing only the simplest mechanization rules may check each of the logical circuits of the computer in order to determine whether the logical circuits provide output signals specified by the modified logical equations. In addition, the computer may be checked for errors during its operation by providing a test program which is introduced into the system algebra. Thus, extremely simple service and error checking techniques can be specified for a very complicated computer system constructed in accordance with the principles of the present invention.

Another feature of the present invention is its adaptability to miniaturization techniques. The logical "and" and "or" circuits utilized may comprise germanium diodes which occupy very little space. Thus, all of the logical circuits may be mechanized with a minimum of space consuming components. Moreover, since the diodes require a minimum of operating power, the storage devices which are utilized to supply signals for operating the logical circuits may also be miniaturized. From this discussion, it should be apparent, moreover, that the power required is minimized as the total circuit is miniaturized.

Although the principles of the present invention may be most effectively utilized in solving problems presented in a straight binary code, problems in other codes, such as binary-coded decimal or straight decimal may be solved if appropriate conversions are mechanized into the system, either as programs or as specific operations.

The principles of the present invention are applicable to either a serial or a parallel system. In the serial system, arithmetic operations are performed upon binary numbers which are coded in time, that is, each binary digit of a number follows a preceding digit after a predetermined time corresponding to a binary digit time. In the parallel system the binary numbers are coded in space, that is, there is a different position for each binary digit. Where miniaturization and minimization of power is of the utmost importance, the serial system is preferred, since the time sharing inherent in the serial system makes it possible to use the same logical circuits for a great number of functions. On the other hand, where speed of operation is of the utmost importance, the parallel system is preferred, since it is approximately $n$ times as fast as the serial system, where $n$ is equal to the number of digits in the binary numbers to be operated upon.

Accordingly, it is an object of the present invention to provide an electronic binary computer which is completely mechanized in accordance with logical algebraic equations.

Another object of the present invention is to provide a system for performing arithmetic operations upon binary numbers, the system being mechanized in accordance with a first set of Boolean algebraic equations for providing control functions corresponding to the arithmetic operations, respectively, and being mechanized in accordance with a second set of Boolean algebraic equations for carrying out the operations.

An additional object of the present invention is to provide an electronic computing system mechanized entirely in accordance with Boolean system algebra, the system utilizing a minimum of specific logical circuits as indicated to be required by the system algebra.

A further object of the present invention is to provide an electronic computer which is designed entirely according to logical equations and is readily incorporated into a more complicated computer system in a manner indicated by the logical equations.

Still another object of the present invention is to provide an electronic binary calculator which is defined by Boolean algebraic equations, the versatility of the calculator being limited only by the capacity of the defining Boolean algebra itself.

Still an additional object of the present invention is to provide a logically-designed electronic calculator which is readily adaptable to miniaturization techniques.

A still further object of the present invention is to provide a logically-designed binary computer which is economical to construct and to operate.

It is also another object of the present invention to provide a logically-designed computer which may be mechanized for a particular problem in accordance with Boolean algebraic equations, provided by specialists, said equations being modified in accordance with the practical considerations provided by engineering personnel.

It is also an object of the present invention to provide a logically-designed electronic binary computer which may be conveniently checked for errors in accordance with the system algebra.

It is yet another object of the present invention to provide a serial binary arithmetic unit which is completely mechanized in accordance with Boolean algebraic equations.

It is yet a further object of the present invention to provide a parallel binary arithmetic unit which is completely mechanized in accordance with Boolean algebraic equations.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only and are not intended as a definition of the limits of the invention.

Fig. 2b is a block diagram of the multiplication circuitry of the serial arithmetic system shown in Fig. 2;

Fig. 2c is a block diagram of the division circuitry of the serial arithmetic system shown in Fig. 2;

Fig. 2d is a block diagram of the transfer circuitry of the serial arithmetic system shown in Fig. 2;

Fig. 3a is a composite diagram of the waveforms of signals appearing at various points in the embodiment of Fig. 2 during the operations of addition and subtraction;

Fig. 3b is a composite diagram of the waveforms of signals appearing at various points in the embodiment of Fig. 2 during the operation of multiplication;

Figure 2A:
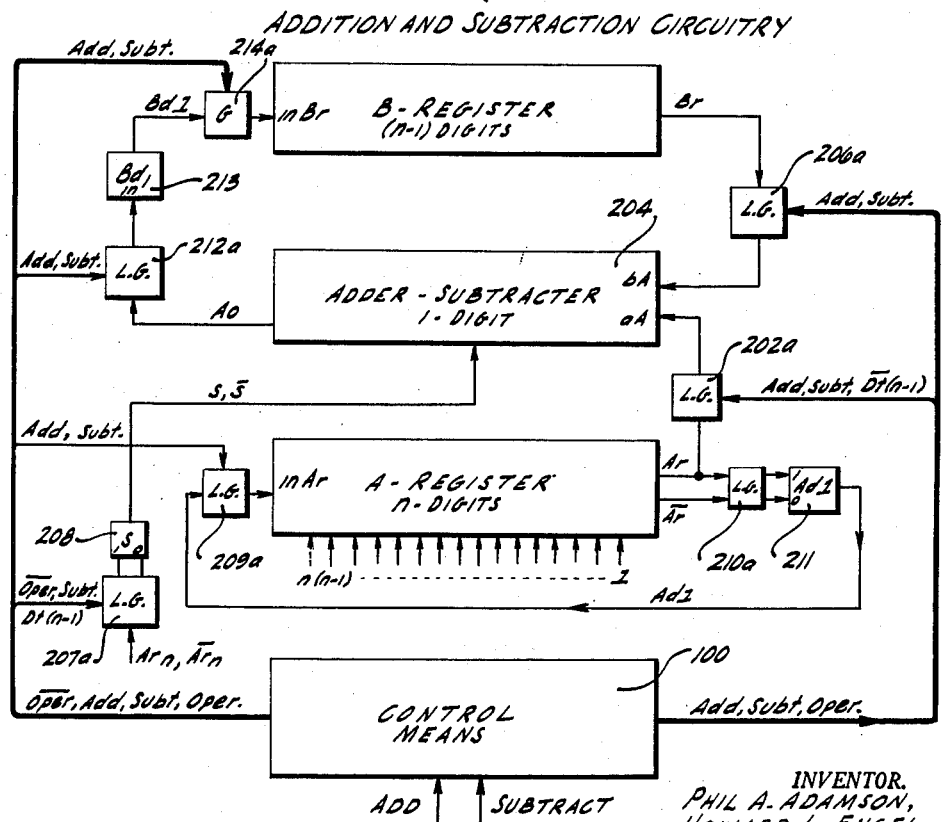
Fig. 2a is a block diagram of the addition and subtraction circuitry of the serial arithmetic system shown in Fig. 2.
Figure 2:
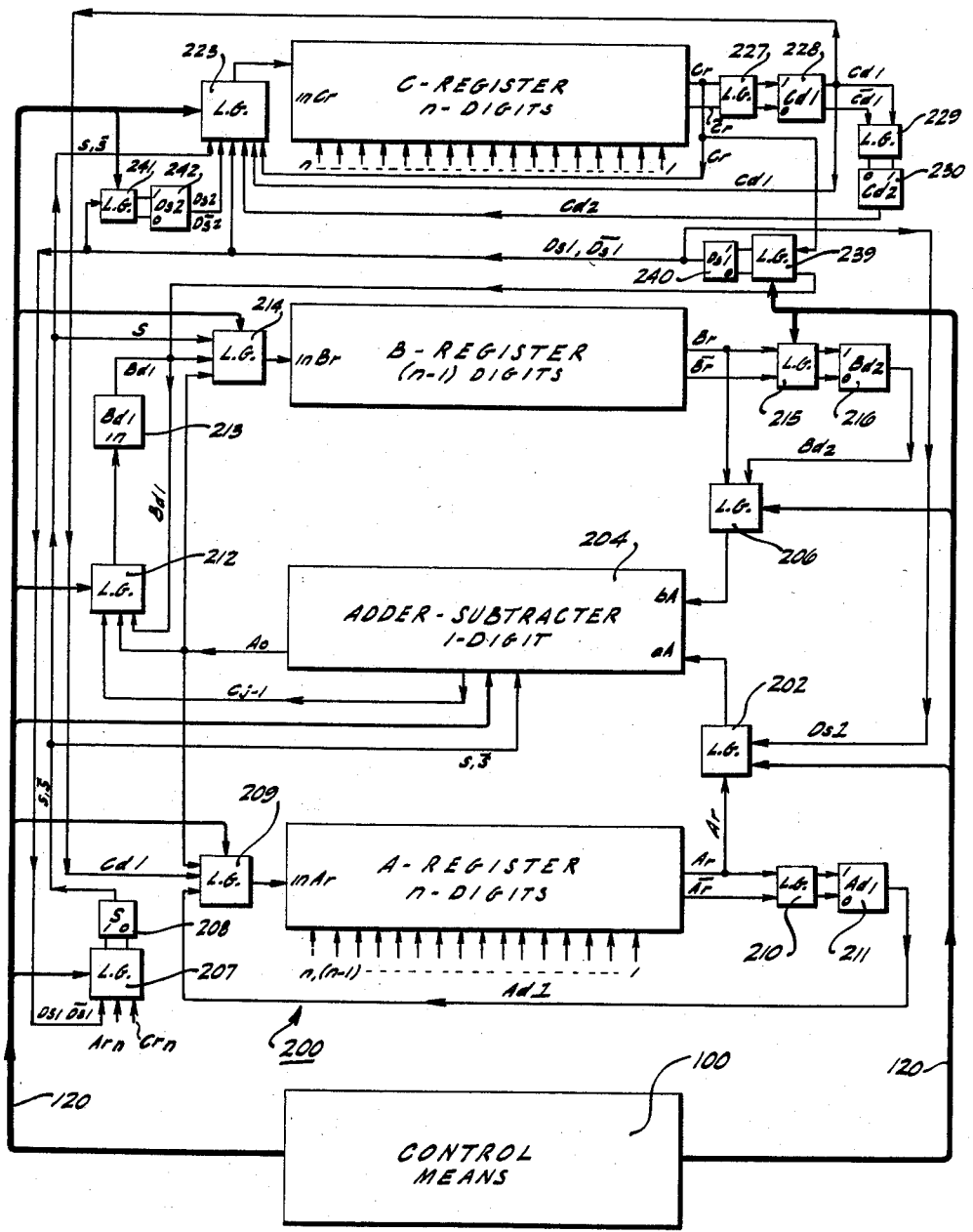
Fig. 2 is a block diagram of a serial arithmetic system.
Figure 6:
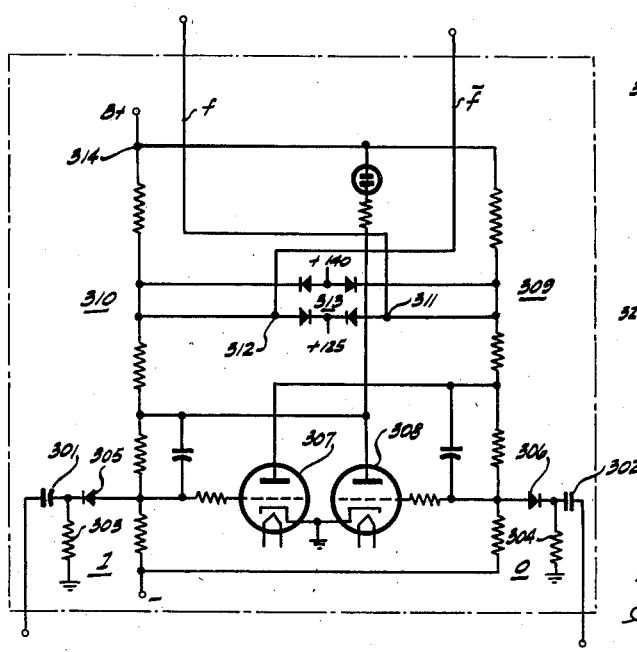
Figure 7:
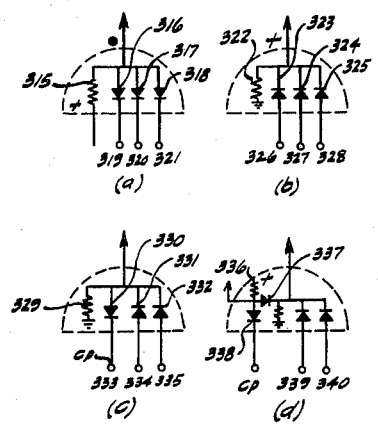
Figure 9:
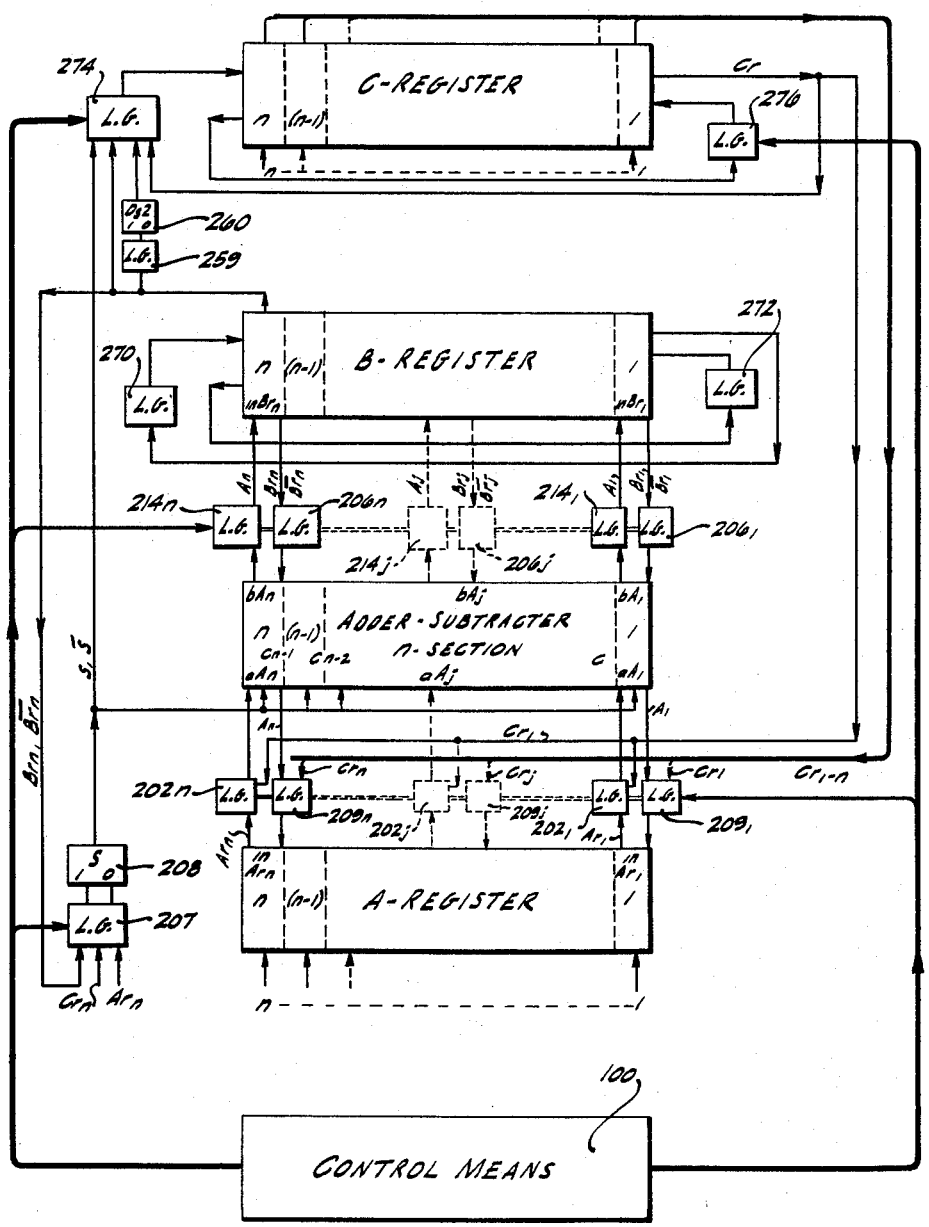

Figs. 5a, 5b, and 5c are parts of a schematic diagram illustrating the complete logical circuitry of the serial arithmetic system shown in Fig. 2;

Fig. 6 is a schematic diagram of a two-stable-state device or flip-flop which may be utilized in the embodiments of the present invention;

Figs. 7a and 7b are schematic diagrams illustrative of "and" and "or" circuits suitable for use in embodiments of the present invention;

Figs. 7c and 7d are schematic diagrams illustrative of combined clock pulse and "or" circuits suitable for use in embodiments of the present invention;

Fig. 8 is a schematic diagram of a complementing circuit which may be utilized in the logical circuitry shown in Figs. 5a, 5b, and 5c; and Fig. 9 is a block diagram of a parallel arithmetic system.

Figure 1:
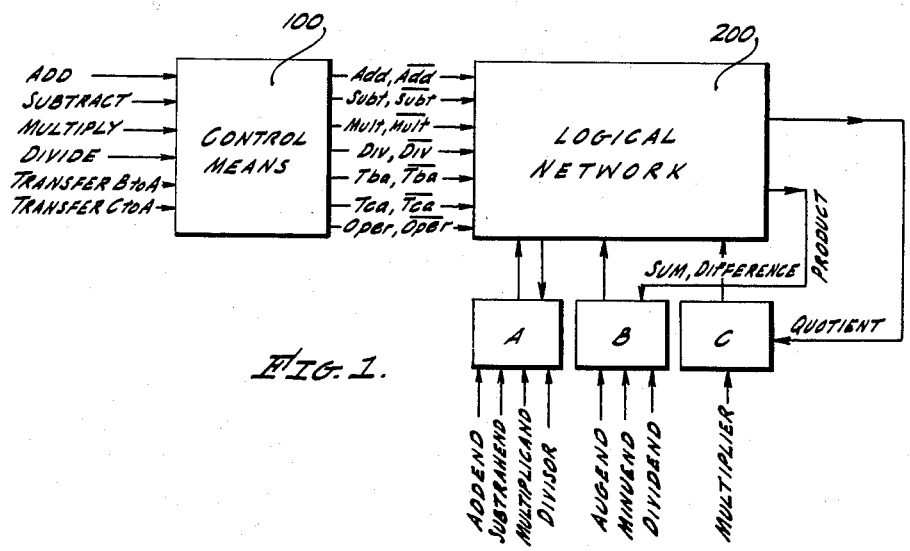
Fig. 1 is a block diagram of the basic embodiment of the present invention.

Referring now to Fig. 1, there is shown an embodiment of an electronic binary computer, according to this invention, which is completely mechanized in accordance with Boolean algebraic equations. The computer shown in Fig. 1 comprises: control means 100, responsive to electrical signals representative of operations to be performed, for producing electrical binary control signals corresponding to these operations, respectively; a plurality of storage registers A, B, and C for storing complementary sets of electrical signals representative of binary numbers to be operated upon; and logical network means 200 responsive to the binary control signals and to the complementary sets of binary number signals for producing electrical binary output signals representative, respectively, of the results of different operations upon the binary numbers.

In an illustrative utilization of the calculator shown in Fig. 1, register A stores the addend, subtrahend, multiplicand, and the divisor for the operations of addition, subtraction, multiplication, and division, respectively; register B stores the augend, minuend, and dividend for the operations of addition, subtraction, and division, respectively; and register C stores the multiplier for the operation of multiplication. Registers A, B, and C may also be used to store the results of the operation. For example, register B may store sum, difference, and product; and register C the quotient, as indicated in Fig. 1.

Since the complementary binary control signals produced by the control means are representative of operations, it is convenient to express them as abbreviations of the corresponding operations. Thus, control means 100 produces signals Add and $\overline{\text{Add}}$ for the operation of addition, Subt and $\overline{\text{Subt}}$, for the operation of subtraction, Mult and $\overline{\text{Mult}}$ for the operation of multiplication, Div and $\overline{\text{Div}}$ for the operation of division, Tba and $\overline{\text{Tba}}$ for the operation of transferring signals in register B to register A, Tca and $\overline{\text{Tca}}$ for the operation of transferring signals in register C to register A, and Oper and $\overline{\text{Oper}}$ for any operation.

Before considering the details of the mechanization functions, it is necessary to understand the principles involved in binary computation itself, since most of the mechanization functions are derived either directly or indirectly from binary arithmetic functions. These principles are considered under the headings Addition and Subtraction of Binary Numbers, Multiplication of Binary Numbers, and Division of Binary Numbers.

The notation which is utilized to represent the binary numbers is also utilized below to represent corresponding signals. Thus, the variable $a_j$, which is considered in addition and subtraction, is utilized later to represent a signal series which appears in the adder-subtracter unit described below.

ADDITION AND SUBTRACTION OF BINARY NUMBERS

Let us consider the addition of two binary numbers:

$$a = \sum_{1}^{n} a_j \cdot 2^{j-(R+1)} \text{ and}$$

$$b = \sum_{1}^{n} b_j \cdot 2^{j-(R+1)}$$

where $j$ represents the digit position or place of the binary digits, $n$ the number of binary digits, and R the number of binary digits to the right of the radix point. Consider, for example, the binary equivalents $a$ and $b$ of the decimal numbers 1.75 and 2.5:

$$a = \sum_{1}^{3} a_j \cdot 2^{j-3} \text{ and}$$

$$b = \sum_{1}^{3} b_j \cdot 2^{j-2}$$

Substituting the binary coefficients for $a_j$ and $b_j$, $a$ and $b$ are then written as:

$$a = 1 \cdot 2^{-2} + 1 \cdot 2^{-1} + 1 \cdot 2^0 \text{ and } b = 1 \cdot 2^{-1} + 0 \cdot 2^0 + 1 \cdot 2^1$$

or, expressed in the usual convention where the least significant digits appear at the right and higher place digits appear in succession to the left, these are written as: $a = 1.11$ and $b = 10.1$. It should be noted that where $n$, the total number of digits, includes a sign digit, the summation for the number is made from 1 to $(n-1)$, since the sign digit is not a binary coefficient.

In the addition of binary numbers, the digits in the same place and the carry from the preceding place are added. Thus, when $a$ and $b$ are added, the sum for each place is a function of the variables: $a_j$, $b_j$, and $c_{j-1}$, where $c_{j-1}$ represents a carry from a preceding place; and $c_j$, representing a carry to the next place, is a function of the same variables. The sum and carry functions are conveniently represented as:

$$f_s(a_j, b_j, c_{j-1}), \text{ and } f_c(a_j, b_j, c_{j-1})$$

respectively. Consider, then, the sum of $a=1.11$ and $b=10.1$:

```
            543 21
   a        001.11    (1.75)
   b        010.10    (2.5)
   c+       111.0
   Sum      100.01    (4.25)
```

The sum in the first place is $f_s(a_1, b_1) = f_s(1,0) = 1$, and the positive carry to the next place, $c_1^+$, is $$f_c(a_1, b_1) = f_c(1,0) = 0$$

the sum in the second place is $f_s(a_2, b_2, c_1) = f_s(1,1,0) = 0$, and the carry to the next place, $c_2^+$, is $$f_c(a_2, b_2, c_1) = f_c(1,1,0) = 1$$

the sum in the third place is $$f_s(1,0,1) = 0, \text{ and } c_3^+ = f_c(1,0,1) = 1$$

the sum in the fourth place is $$f_s(0,1,1) = 0 \text{ and } c_4^+ = f_c(0,1,1) = 1$$

the sum in the fifth place is $f_s(0,0,1) = 1$.

Consider now the table below, where all eight of the possible combinations of digits in the same place are listed:

Table I

| $a_j$ | $b_j$ | $c_{j-1}$ | Sum | $c_j^+$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

From this table, the general Boolean algebraic rules for sum and positive carry to the next place ($c_j^+$) are found to be:

$$\text{sum} = a_j.\bar{b}_j.\bar{c}_{j-1} + \bar{a}_j.b_j.\bar{c}_{j-1} + \bar{a}_j.\bar{b}_j.c_{j-1} + a_j.b_j.c_{j-1} \text{ and}$$

$$c_j = a_j.b_j + a_j.c_{j-1} + b_j.c_{j-1}$$

The derivation of these functions is fully explained in copending application for patent entitled "Arithmetic Units for Digital Computers" by Eldred C. Nelson, Serial No. 189,318, filed October 10, 1950.

The sum function may be interpreted as meaning that there is a sum of 1 when one variable in a place is 1 and the others are 0, or when all three variables in a place are 1. Thus, $a_j.\bar{b}_j.\bar{c}_{j-1}$, $\bar{a}_j.b_j.\bar{c}_{j-1}$, and $\bar{a}_j.\bar{b}_j.c_{j-1}$, are 1, respectively, when only $a_j$ is 1, when only $b_j$ is 1, and when only $c_{j-1}$ is 1; and $a_j.b_j.c_{j-1}$ is 1 when all of the variables are 1.

The positive carry function may be interpreted as follows: There is a carry to the $(j+1)$st place from the $j$th place if there are two or more binary digits in the $j$th place. Thus, when $a_j$ and $b_j$ are 1, or $a_j$ and $c_{j-1}$ are 1 or $b_j$ and $c_{j-1}$ are 1, there is a carry to the $(j+1)$st place.

In a similar manner, the Boolean algebraic functions for subtraction may be derived from the table below, where $c_j^-$ represents a negative carry to the next place and Diff. represents the difference for the subtraction: $b-a$.

Table II

| $a_j$ | $b_j$ | $c_{j-1}$ | Diff. | $c_j^-$ |
|---|---|---|---|---|
| 0 | 0 | 0 | 0 | 0 |
| 0 | 0 | 1 | 1 | 1 |
| 0 | 1 | 0 | 1 | 0 |
| 0 | 1 | 1 | 0 | 0 |
| 1 | 0 | 0 | 1 | 1 |
| 1 | 0 | 1 | 0 | 1 |
| 1 | 1 | 0 | 0 | 0 |
| 1 | 1 | 1 | 1 | 1 |

These are:

$$c_j^- = a_j.\bar{b}_j + a_j.c_{j-1} + \bar{b}_j.c_{j-1}, \text{ and}$$

$$\text{Diff.} = a_j.\bar{b}_j.\bar{c}_{j-1} + \bar{a}_j.b_j.\bar{c}_{j-1} + \bar{a}_j.\bar{b}_j.c_{j-1} + a_j.b_j.c_{j-1}$$

The derivation of these functions is fully explained in the above-mentioned copending application to Nelson, Serial No. 189,318. It will be noted that the function for the difference is the same as the function for the sum above. Interpretation of the difference function, therefore, is deemed unnecessary. The carry $c_j^-$ for subtraction is 1 when $a_j$ is 1 and $b_j$ is 0, or when $c_{j-1}$ is 1 and $b_j$ is 0, or when both $a_j$ and $c_{j-1}$ are 1.

The positive and negative carry functions above may be combined by introducing a binary variable which has a value of 1 when a negative carry functions is required and has a complementary value of 1 when a positive carry is required. Assuming then that S is this variable, the combined carry function may then be written as:

$$c_j \pm = \bar{S}.(a_j.b_j + a_j.c_{j-1} + b_j.c_{j-1})$$

$$+ S.(a_j.\bar{b}_j + a_j.c_{j-1} + \bar{b}_j.c_{j-1})$$

Since the term $a_j.c_{j-1}$ is utilized in both positive and negative carry, the combined positive and negative carry function may be reduced to:

$$c_j^\pm = \bar{S}\cdot(a_j\cdot b_j + b_j\cdot c_{j-1}) + a_j\cdot c_{j-1} + S\cdot(a_j\cdot \bar{b}_j + \bar{b}_j\cdot c_{j-1})$$

Hereinafter the variable $b$ will be utilized to represent the augend or minuend, and the variable $a$ will be utilized to represent the addend or subtrahend. Assuming this convention, then, it will be noted that there are sixteen situations which may arise in the addition and subtraction of the binary numbers $a$ and $b$. Of these, eight are addition and eight are subtraction problems. However, since each addition problem may also be considered as a subtraction problem, it is unnecessary to consider both. For example, $b-a$ can be considered as either $b+(-a)$ or $b-a$. Analysis of the problem $b-a$, therefore, will be considered as covering either: $b+(-a)$ or $b-a$.

Of the eight situations which are considered, four occur when $b$ is greater than $a$ ($b>a$), for the sign combinations of $b$ and $a$, i.e.: $b+a$; $b-a$; $-b+a$; and $-b-a$. The remaining four situations occur when $b$ is less than $a$ for the same sign combinations above. A problem is set forth below which includes all of the eight situations, except: $b+a$ (either $b>a$ or $b<a$) and one of the two cases of $-b-a$. Only one case of $-b-a$ is considered since the relative values of $a$ and $b$ are unimportant. Neither case of $b+a$ is considered since the principles involved are fully illustrated in the other problems. Consider now the problem:

$$-b^6 = -a^0 + a^1 - a^2 - a^3 + a^4 - a^5$$

where: $-a^0 = -2561 = 10101000000001.0$
$+a^1 = +3290 = 00110011011010.0$
$-a^2 = -\phantom{0}437 = 10000110110101.0$
$-a^3 = -6974 = 11101100111110.0$
$+a^4 = +6523 = 01100101111011.0$
$-a^5 = -\phantom{00}121 = 10000001111001.0$ It will be noted that the most significant binary digits of the addends and subtrahends appearing in the problems herein considered represent the sign, where 1 indicates a negative number and 0 a positive number. The signs of the augends and minuends are indicated in the same manner. Where the augend or minuend is negative, however, the convention herein adopted is to express the number as its 0's complement explained below. It will be noted in the problems that are considered that the binary sign digits of the addend and subtrahend are eliminated, although the augend sign digit is included. This, it will be shown, is necessary in order to obtain negative augends which are 0's complements with a sign digit of 1.

The superscripts in the problems are utilized to designate the operants and are not to be confused with the subscripts which designate the place of the binary digits. Thus, $a^5$ is the fifth addend and is not the fifth digit of a binary number $a$. Each of the operants, then, comprises a series of binary digits and, thus, can be written as: $a_j{}^N$, where N represents the number of the operant and $j$ a binary digit position.

It will be observed that initially the augend is 0, or $b^0 = 0$. The first operation then is to add $-a^0$ to 0 or to subtract $a^0$ from 0. In either case, the negative carry function is utilized where, as above, $$c_j{}^- = a_j\bar{b}_j + \bar{b}_j c_{j-1} + a_j c_{j-1}$$

The operation appears as follows:

```
       b⁰  00000000000000.0
      −a⁰  01010000000001.0   −2561
      c₋⁰  11111111111110
  Sum      11010111111111.0
```

In subtracting $a^0$ from 0, we obtain what is known as the "0's" or "2's" complement of $a$. This may also be found by changing each of the digits of $a$ to its complement (the "1's" complement of $a$), and then adding 1 to the least significant place. The "0's" complement may also be found by recording successive digits of the number, starting from the least significant digit, until the first "1" is recorded and thereafter recording in succession the complements of the higher placed digits. The first sum then is the "0's" complement of $a$ and includes a sign digit in the extreme left hand place indicating that the sum is negative and complemented. Since for the "0's" complementing operation $b$ is 0, the algebraic functions above may be reduced to: $c_j^- = a + c_{j-1}$ and $$\text{Sum} = a_j \cdot \bar{c}_{j-1} + \bar{a}_j c_{j-1}$$

where $b_j = 0$ and $\bar{b}_j = 1$ have been substituted into the functions above. The reason that the addend sign digit must be eliminated from the problems should be apparent from the above example. Were it to be included, then the sign digit of the sum above would be 0 although the sum is negative.

In the next operation of the problem, the sum of the first operation is the augend $b^1$, to which the new addend $a^1$ is added or from which $-a^1$ is subtracted. The situation which is considered is: $-b+a$ where $b<a$.

```
                    −b¹  11010111111111.0   −2561
  −b+a(b<a)         +a¹  00110011011010.0   +3290
                    c₊¹  11101111111100
              Sum        00001011011001.0   +729
```

Since $b<a$, the sum shows a change of sign; that is, the sign digit changes from a "1" to a "0." It should be noted that the positive carry function was utilized for this operation. The positive carry is utilized wherever the resulting sign between $b$ and $a$ is positive. Thus, the positive carry is utilized for the operation $-b-(-a)$.

The remaining operations are outlined below where the particular situation involved is indicated to the left of the operation:

```
                    +b²  00001011011001.0   +729
  +b−a(b>a)         −a²  00001101010101.0   −437
                    c₋²  00001001001000
```

```
                    +b³  00000100100100.0   +292
  +b−a(b<a)         −a³  11011001111110.0   −6974
                    c₋³  11111111111100
```

```
                    −b⁴  10010111100110.0   −6682
  −b+a(b>a)         +a⁴  11001011111011.0   +6523
                    c₊⁴  00001111111100
```

```
                    −b⁵  11111101100001.0   −159
  −b−a(b>a)         −a⁵  00000011110001.0   −121
                    c₋⁵  00000111110000
                    −b⁶  11111011101000.0   −280
```

Since $-b^6$ is a negative number in its "0's" complemented form, it may be desirable to convert it to an absolute value plus sign. This is done by taking the "0's" complement of $-b^6$ without the sign digit of 1 or by subtracting $-b^6$, without the sign digit of 1, from 0 in the manner explained above. This operation appears as follows:

```
             b⁷   00000000000000.0
  a⁷=−b⁶    11111011101000.0   −280
             c₋⁷  11111111110000
  a⁸=−|b⁶|  10000100011000.0   −|280|
```

MULTIPLICATION OF BINARY NUMBERS

Multiplication is performed by a series of additions or subtractions depending upon the product of the signs of the multiplicand and the multiplier and upon the convention adopted for representing the product. Since most problems involve a mixture of multiplications, additions, and subtractions, it is convenient to adopt the same convention for multiplication with respect to the product, as has been adopted above with respect to the augend in addition, namely that a negative product is always to be represented as a "0's" complement with a sign of "1," whereas a positive product is represented as an absolute value with a sign digit of "0." The multiplicand and multiplier, like the addend, are represented as absolute values plus sign digits, the sign digit being eliminated from the multiplication itself.

Assuming this convention, then, when the product is negative, as indicated by opposite signals for the multiplier and multiplicand, the multiplication is performed by a series of subtractions; whereas, if the product is positive, as indicated by similar signals for the multiplier and multiplicand, then the multplication is performed by a series of additions. The operation producing a negative product is herein referred to as negative multiplication, whereas that producing a positive product is herein referred to as positive multiplication.

Each addition or subtraction is made or not made in accordance with the corresponding multiplier digit, herein referred to as $m_j$. When $m_j$ is 1, the multiplicand is added or subtracted to the partial product which is initially 0; when $m_j$ is 0, no addition or subtraction is performed or 0 is added to the partial product.

In each addition of the multiplicand, in accordance with a multiplier digit $m_j$, the multiplicand is shifted $j-1$ digit positions to the left with respect to the original partial product. If the multiplication is initiated by adding or subtracting the multiplicand in accordance with the first multiplier digit $m_1$, then there is no shift for the first addition. Assuming that successive additions or subtractions are made in accordance with the successively higher digits of the multiplier, then, after each addition or subtraction the multiplicand is shifted one digit position to the left with respect to the partial product or the partial product is shifted one digit position to the right with respect to the multiplicand. On the other hand, it may be convenient to initiate multiplication by adding the multiplicand in accordance with the highest place multiplier digit, $m_{n-1}$, where $m_n$ is the multiplier sign digit. In this case, in the first addition the multiplicand is considered as shifted $n-1$ places to the left of the first partial product (which is 0), and after each addition, the multiplicand is shifted one place to the right with respect to the partial product or the partial product is shifted one place to the left with respect to the multiplicand.

There are four multiplication situations which are of interest, corresponding to four sign combinations of multiplier and multiplicand. Of these, only two, illustrative of positive and negative multiplication, are considered. In the first problem presented below, the multiplicand is the final sum of the addition and subtraction problem above.

Since the product in the first problem is positive, the multiplication is performed by a series of additions, where the partial products are considered as augends $b$ and the multiplicand appears as a series of addends $a$.

It will be noted in the problem below the 0's are included in both the multiplicand and multiplier to the right of the radix point, although they have been eliminated in the actual problem for simplicity. The 0's have been included so that the problem below corresponds to that considered in the operation of the computer which is described hereinafter, reference being made to Fig. 3b. Since the multiplier in the first problem includes nine 0's to the right of the first 1, the multiplicand is not added until the tenth operation when it is considered as operant $a^{10}$. In the second problem there are 13 multiplier zeros and thus the first multiplicand to be added is operant $a^{14}$.

*First multiplication problem*

| | |
|---|---|
| Multiplicand= −280=1100011000.000000 | |
| Multiplier = − 39=1100111.000000000 | |
| $b^1$ | 000000000.0 |
| $a^{10}$ | 100011000.0 |
| $b^{11}$ | 100011000.0 |
| $a^{11}$ | 1000110000 |
| $b^{12}$ | 1101001000.0 |
| $a^{12}$ | 1000110000 |
| $b^{13}$ | 11110101000.0 |
| $a^{13}$ | 0000000000 |
| $b^{14}$ | 011110101000.0 |
| $a^{14}$ | 0000000000 |
| $b^{15}$ | 0011110101000.0 |
| $a^{15}$ | 1000110000 |
| Product=+10920=$b^{16}$ | 010101010101000.0 |

The second multiplication problem is performed by shifting the partial product to the right with respect to the multiplicand. Negative multiplication is also illustrated, since the multiplicand and multiplier have different signs. The second multiplication problem, then, is:

| | | |
|---|---|---|
| Multiplicand=+10920=010101010101000.0 | | |
| Multiplier = − ¾=1.110000000000000 | | |
| $b^1$ | 000000000000000.0 | |
| $-a^{14}$ | 10101010101000.0 | 10920 |
| $-b^{15}$ | 101010101011000.0 | |
| Shift−$b^{15}$ | 110101010101100.0 | |
| $-a^{15}$ | 10101010101000.0 | |
| $-b^{16}$ | 100000000000100 0 | |
| Shift−$b^{16}$ | 110000000000010.0 | or, |
| "0's" complemented−$b^{16}$ | 101111111111110.0 | −8190 |

It should be noted that in negative multiplication, it is necessary to shift in an additional negative sign digit of 1 after each shift following the first subtraction. This is due to the fact that all partial products after the first subtraction are "0's" complements which, theoretically, have an infinite number of 1's to the left of the most significant digit.

DIVISION OF BINARY NUMBERS

There are two basic approaches to the binary division problem. One is similar to that utilized in the division of decimal numbers where the division is performed by a series of subtractions or additions of the divisor and the partial remainder (initially the dividend), depending upon the signs of the dividend and divisor and the convention adopted for representing the dividend and divisor. The other approach depends upon the fact that a subtraction which causes an overdraft may be corrected by adding the divisor after the next shift.

For either approach, it is convenient to adopt the convention that a negative dividend is represented as a "0's" complement, whereas a negative divisor is represented as an absolute value plus a negative sign digit of 1. Assuming this convention, division, according to the first approach, is performed by a series of subtractions when the dividend is positive, and by a series of additions when the dividend is negative, regardless of the sign of the divisor. Accordingly, when the dividend is negative the operation is herein referred to as negative division; and when the dividend is positive the operation is herein referred to as positive division.

According to the first approach to division, the subtraction or addition of the divisor and partial remainder is not performed or is performed and cancelled if an overdraft would result. Except for one special case in negative division explained below, an overdraft is indicated by a change in the sign digit of the partial remainder. Thus, when the subtraction or addition would cause a change in the partial remainder sign, no subtraction or addition is performed, a quotient digit of 0 is recorded, and the divisor is shifted to the right with respect to the partial remainder or the partial remainder is shifted to the left with respect to the divisor. Whenever a subtraction or addition is performed without a change in partial remainder sign, a quotient digit of 1 is recorded.

According to the second approach to binary division, the divisor and the partial remainder are continuously added or subtracted. If an overdraft occurs, as indicated by a change in the sign of the partial remainder from its original value or the original sign value of the dividend, a quotient digit of 0 is recorded, the divisor is shifted to the right with respect to the partial remainder or the partial remainder is shifted to the left with respect to the divisor, and the next operation is addition, if the initial operation was subtraction, or is subtraction if the initial operation was addition. Thus, instead of continuously subtracting for positive division, and then correcting an overdraft by adding a divisor, $d$, without a shift, the divisor $d$ is shifted as though no overdraft occurred, and $d$ is then added to the next operation. This provides the correct partial remainder because, for binary numbers, subtracting and adding $d$ and then subtracting $d$ after a shift of one is equivalent to subtracting $d$ and then adding $d$ after a shift of one. In the first case, the operation appears as: $-d+d-d/2=-d/2$, and in the second case, the operation appears as: $-d+d/2=-d/2$, where it will be noted that shifting the binary number $d$ is equivalent to dividing by 2.

Two problems are considered below. In the first, a negative division is performed in accordance with both the first and second approaches above. In the second problem, a positive division is performed according to the second approach above. Each operation, and all but the first digit of the quotient, is numbered. Thus, in the first operation of the first division problem, the divisor is added and a quotient digit of 1 is entered, the sign digit of 0 having been previously entered. When positive division is performed, according to the first approach, the divisor is added or not added according to whether or not an overdraft would result. This is indicated adjacent to the operation number in the problem below.

In division, according to the second approach, the quotient digit is obtained after an operation and, thus, the numbers designating an operation appear after it is performed. Thus, the number (1) in the first problem appears below Add, corresponding to the first addition of the divisor. It will also be noted that when division is performed according to the second approach, the dividend and partial remainders are given the designation $b^N$, where N is an operant number, and that the divisor in each of its positions is given the designation $a^N$. This notation is used in explaining the operation of the computer so that a signal series corresponding to an operant in the problems below is given the same designation. Division in the illustrative operation of the serial arithmetic system, as described below, is performed according to the second approach and, therefore, a similar notation is not used in connection with the solution to the first division problem according to the first approach.

In all cases of division, the final sign of the quotient is positive if the dividend and divisor have the same sign, and is negative if the dividend and divisor have different signs. It will be noted that the divisor sign digit is eliminated from the problems and that unnecessary zeros are removed for simplicity.

*First division problem*

Dividend = −8190 = 10000000000010.00
Divisor = − 13 = 11101.00000000000

FIRST APPROACH

```
                      123456789
                      01001110110.00 = +630
                -1101 √10000000000010.00
(1) 1 added           1101
                      ─────────────────
                      11101000000010 0
(2) 0 not added       1101
                      ─────────────────
                      1101000000010 0
(3) 0 not added        1101
                      ─────────────────
                      101000000010 0
(4) 1 added           1101
                      ─────────────────
                      10101000010 0
(5) 1 added           1101
                      ─────────────────
                      1011100010 0
(6) 1 added           1101
                      ─────────────────
                      110110010 0
(7) 0 not added       1101
                      ─────────────────
                      10110010 0
(8) 1 added           1101
                      ─────────────────
                      1100110 0
(9) 1 added           1101
                      ─────────────────
(10)                  000000 0
```

In operation (9) above, it will be noted that the divisor and partial remainder are added, even though the sign digit changed to 0. This was done because the change of sign in this case does not indicate an overdraft, but rather that the division has resulted in a quotient with no remainder. If the change of sign is considered as the true indication of an overdraft, then the divisor would not be added in operation (9) and the division problem above would continue as below:

```
(9) 0 not added       11001100
                      1101
                      ─────────
                      1001100 0
(10) 1 added          1101
                      ─────────
                      1001100 0
(11) 1 added          1101
                      ─────────
                      etc.
```

In this case, the quotient becomes 01001110101.11 . . . , where there is an error of 1 in the least significant place. The same error occurs if negative division is performed according to the second approach:

SECOND APPROACH

```
                      123456789
                      01001110101.11
               -1101 √10000000000010.00   b¹
Add                  1101                 a¹
                     ─────────────────
(1)                  111010                b²
Add                  1101                  a²
                     ──────
(2)                  001110                b³
Subt                 1101                  a³
                     ──────
(3)                  000010                b⁴
Subt                 1101                  a⁴
                     ──────
(4)                  101010                b⁵
Add                  1101                  a⁵
                     ──────
(5)                  101110                b⁶
Add                  1101                  a⁶
                     ──────
(6)                  110110                b⁷
Add                  1101                  a⁷
                     ──────
(7)                  000110                b⁸
Subt                 1101                  a⁸
                     ──────
(8)                  110011                b⁹
Add                  1101                  a⁹
                     ──────
(9)                  000000                b¹⁰
Subt                 1101                  a¹⁰
                     ──────
(10)                 100110                b¹¹
Add                  1101                  a¹¹
                     ──────
(11)                 100110                b¹²
```

*Second division problem*

Dividend  630  01001110110.00000
Divisor  −30  111110.0000000000

SECOND APPROACH

```
                      12345678
                      1010101.00
              -11110 √01001110110.0    b¹
Subt                 11110             a¹
                     ───────
(1)                  1101011           b²
Add                  11110             a²
                     ───────
(2)                  0010010           b³
Subt                 11110             a³
                     ───────
(3)                  1101001           b⁴
Add                  11110             a⁴
                     ───────
(4)                  0001111           b⁵
Subt                 11110             a⁵
                     ───────
(5)                  1100010           b⁶
Add                  11110             a⁶
                     ───────
(6)                  0000000           b⁷
Subt                 11110             a⁷
                     ───────
(7)                  1000100           b⁸
Add                  11110             a⁸
                     ───────
(8)                  100010            b⁹
```

It will be noted that in positive division, according to the second approach, the quotient digits are complements of the partial remainder sign digits, whereas in negative division, according to the second approach, the quotient digits are the same as the sign digits of the partial remainders.

The rules for division, according to the second approach, may be summarized as follows: Positive division is initiated by a subtraction of the divisor from the dividend, negative division is initiated by the addition of a divisor to the dividend. The divisor is then shifted to the right with respect to the partial remainder or the partial remainder is shifted to the left with respect to the divisor after each subtraction or addition. If, in positive division the sign digit of the partial remainder is 1 after a subtraction, a 0 is recorded as the quotient digit and, after the next shift, the divisor is added. On the other hand, if the sign digit is 0, a quotient digit of 1 is recorded and the divisor is again subtracted. In negative division a quotient digit of 0 is recorded whenever the partial remainder sign digit is 0, and 1 is recorded whenever the partial remainder sign digit is 1. If a 0 is recorded as a quotient digit, the divisor is subtracted in the next operation, whereas if a 1 quotient digit is recorded, the divisor is added in the next operation.

The principles of binary arithmetic computation discussed above are applicable to both serial and parallel systems. In the serial system, the binary variables are positioned in time and consequently the subscript $j$ corresponds to a time interval, whereas in the parallel system, the binary digits are positioned in space and consequently, $j$ corresponds to a position. The serial arithmetic system is considered first below in considerable detail, and then the parallel system is considered to the extent necessary to point out the distinction between the two systems.

Referring now to Fig. 2, there is shown an embodiment of an electronic calculator for performing serial arithmetic operations upon serial binary numbers. The serial calculator shown in Fig. 2 includes control means 100 mechanized in accordance with a first set of Boolean algebraic equations for producing complementary binary control signals Add, $\overline{\text{Add}}$; Subt, $\overline{\text{Subt}}$; Mult, $\overline{\text{Mult}}$; Div, $\overline{\text{Div}}$; Tba, $\overline{\text{Tba}}$, Tca, $\overline{\text{Tca}}$; and Oper, $\overline{\text{Oper}}$, corresponding to the arithmetic operations, respectively; logical network means 200 corresponding to the logical network 200 shown in Fig. 1; and a plurality of registers A, B, and C, hereinafter referred to as the A register, the B register, and the C register, respectively, the registers being utilized to store the operants in the manner explained above in column 6, lines 47 to 50, with regard to Fig. 1.

As shown in Fig. 2, logical network means 200 includes an adder-subtracter unit 204 which responds to signals produced by the A and B registers applied, respectively, through logical gates 202 and 206, and produces signals corresponding to the binary sum or difference. Adder-subtracter unit 204 is controlled by signals produced by control means 100 and by sign indicating signals produced by a sign storage device 208. The sign of the operation is entered into sign storage device 208 through a logical gate 207.

A circulation path for the A register is completed through a logical gate 209, a logical gate 210, and delay means 211.

The B register has three circulation paths. A first circulation path is completed through logical gate 206, adder-subtracter unit 204, a logical gate 212, a delay means 213, and a logical gate 214. A second circulation path is completed through logical gate 206, adder-subtracter unit 204, and logical gate 214. A third circulation path is completed through a logical gate 215, a delay means 216, logical gate 206, adder-subtracter unit 204, logical gate 212, delay means 213, and logical gate 214.

The C register also has three circulation paths. A first circulation path is completed through logical gate 223. A second circulation path is completed through logical gate 223, a logical gate 227, and a delay means 228. A third circulation path is completed through logical gate 223, logical gate 227, delay means 228, a logical gate 229, and a delay means 230.

Logical network 200 also includes first and second digit storage means 240 and 242 which are utilized to store digits during certain operations. Digits which are to be stored in digit storage means 240 are entered through a logical gate 239 and digits to be entered into digit storage means 242 are entered through a logical gate 241.

An adder-subtracter unit suitable for use in the embodiment shown in Fig. 2 is shown in detail in Fig. 5b. Other adder-subtracter units which are suitable are described in the above-mentioned copending application to Nelson, Serial No. 189,318.

Sign storage device 208 and digit storage devices 240 and 242 may be any two-stable-state storage devices, such as flip-flops. A flip-flop suitable for use as a digit storage device is shown in Fig. 6 and is described in detail in connection therewith. The delay means 211, 213, 216, 228, and 230 may be any signal delay means, such as are well known in the art, for delaying a signal one digit time interval. As an illustration, however, the delay means shown in Fig. 2 are assumed to be flip-flops, where a delay results in entering a binary digit at the beginning of a digit time interval and extracting it at the end of a digit time interval in a manner more fully explained below. The flip-flop shown in Fig. 6 is also suitable for use as a delay means of this type or as a combined delay means and digit storage device.

The registers utilized may be either circulating or shifting registers. Suitable circulating registers may, for example, be of the Mercury delay line type, such as is shown and described in an article entitled "Mercury Delay Line Memory Using a Pulse Rate of Several Megacycles," by Isaac L. Auerbach et al., in the Proceedings of the Institute of Radio Engineers for August 1949, pages 855 through 861; or of the static magnetic delay line type such as is shown and described in an article entitled "Static Magnetic Memory" by M. Kincaid, et al., in Electronics, January 1951, pages 108 through 111; or of the circulating magnetic drum storage type. An illustrative type of shifting register which is suitable is the A register shown in Fig. 5a in the present application. Other suitable shifting registers may be found in an article entitled "Gate-Type Shifting Register," by James H. Knapton et al., in Electronics, December 1949, page 186 or in U.S. Patent No. 2,580,771 issued January 1, 1952 for "Stepping Register" by Leonard R. Harper.

When the A register is a circulating register of the type described above, the operants must be entered serially; whereas, if it is a shifting register, the operants may be entered either serially or in parallel. If the B register is a circulating register, the computing operation must be synchronized with its circulation, so that addition, subtraction, etc. are initiated when the lowest place binary digit is being read from the B register. In further discussion, it will be assumed that both the A and B registers are shifting registers and that shifting is begun in response to control signals which are discussed below. It is assumed further that numbers are stored in the registers with the highest place digit or sign digit appearing at the extreme left, and that all registers are shifted to the right.

The A, B, and C registers produce complementary signal series $Ar$, $\overline{Ar}$; $Br$, $\overline{Br}$; $Cr$, $\overline{Cr}$, and have input circuits $inAr$, $inBr$, and $inCr$, respectively. A signal series is herein considered as complementary to another when the $j$th binary digits of the two series are complementary. Thus, signal $Ar_j$ of signal series $Ar$ is complementary to signal $\overline{Ar}_j$ of signal series $\overline{Ar}$.

Adder-subtracter unit 204 has two input circuits $aA$ and $bA$ and produces output signal series $A_0$ representing a sum or difference signal series, and also carry signal $c_{j-1}$, which is utilized in multiplication. Signal series $Ar$ is applied to input circuit $aA$ of the adder-subtracter unit through logical gate 202, and signal series $Br$ is applied to the $bA$ input circuit of the adder-subtracter unit through logical gate 206. Signal series $A_0$, produced by the adder-subtracter unit, is applied to the input circuit inBr of the B register through logical gate 214.

It will be noted that, where it is convenient, each of the leads and cables shown in Fig. 2 is designated by the signal or signals it carries. Thus, lead Ar carries signal series Ar and lead $A_0$ carries signal series $A_0$. Each of the cables shown includes a lead for every signal it carries. Thus, the cable 120 of control means 100 includes leads Add, Subt, . . . etc.

Sign storage device 208 and digit storage devices 240 and 242 are assumed to be flip-flops, each having two input circuits designated as 1 and 0. If a pulse signal is applied to the 1 input circuit of one of these devices, it registers or stores a 1, whereas, if a pulse signal is applied to the 0 input circuit of one of these devices, it is caused to register or store a 0. If pulses are applied to both input circuits, the device is "triggered" or complemented, as will be more fully explained below.

Sign storage device 208 and first and second digit storage devices 240 and 242 produce complementary binary signals S, $\bar{S}$; Ds1, $\overline{Ds1}$; and Ds2, $\overline{Ds2}$, respectively. Thus, cable S, $\bar{S}$ connected to the output circuit of sign storage device 208, includes two leads S and $\bar{S}$ carrying signals S and $\bar{S}$, respectively, and cables Ds1, $\overline{Ds1}$ and Ds2, $\overline{Ds2}$ carry the signals of digit storage devices 240 and 242, respectively. When a 1 is stored in any of the storage devices, its output signal has a value of 1 and the complementary output signals has a value of 0. For example, if a 1 is stored in sign storage device 208, $S=1$ and $\bar{S}=0$; whereas, if a 0 is stored in sign storage device 208, $S=0$ and $\bar{S}=1$. The input circuits of the storage devices will be designated hereinafter by a 1 or a 0 and the output signal which is produced by the corresponding device. Thus, the 0 input circuit of digit storage device 242 is designated as 0Ds2.

Delay means 211, 213, 216, 228, and 230 produce signal series Ad1, Bd1, Bd2, Cd1, and Cd2, respectively. It is assumed, for the purpose of facilitating the description which follows, that each of the delay means is a flip-flip having a 1 and a 0 input circuit. The convention for designating the input circuits of the flip-flop delay means is the same as has been explained above. Thus, the 0 input circuit of delay means 216 is designated as 0Bd2.

In addition to producing complementary binary control signals, control means 100 also produces complementary timing signals. The timing signals are designated by symbols according to the time interval during which they have a value of 1.

In certain operations, the serial arithmetic system operates for a plurality of cycles or periods herein referred to as word time intervals. During each word time interval, there are $(n+1)$ digit time intervals, where $n$ is the number of digits in the operants, including the sign digit. The digit time intervals and word time intervals are conveniently represented as $Dt(k)$ and $Wt(k)$, where $k$ is an integer corresponding to the interval. According to the convention herein adopted, signals $Dt(k)$ and $Wt(k)$ have values of 1 during the $k$th digit time interval and the $k$th word time interval, respectively.

Corresponding to each timing control signal, $Dt(k)$ and $Wt(k)$, there is a complementary timing control signal $\overline{Dt}(k)$ and $\overline{Wt}(k)$ which has a value of 1 during all but the $k$th time interval. Thus, $\overline{Dt}(15)$ has a value of 1 except during the 15th digit time interval of each word time of operation.

In a pulse system, a signal may be entered into a storage device through a logical gate by the coincidence of a pulse signal $Dt(k)$ or $Wt(k)$ and a digit-representing pulse signal, during digit time $Dt(k)$ or word time $Wt(k)$. Thus, in a pulse system, the timing signals directly correspond to the time when an entry is made. In a voltage-level system, however, a logical gate is "opened" one digit time before a pulse signal is passed through to an associated storage device or register. Thus, voltage-level signal $Dt(k-1)$ is utilized to "open" a logical gate connected to the input circuit of a storage device so that a pulse signal representing a digit is entered into the storage device at the beginning of digit time $Dt(k)$.

To facilitate the detailed explanation which follows, it is assumed that the embodiment shown in Fig. 2 is a voltage-level system. It is further assumed that the first or least significant digits of the operants are operated upon and that the adder-subtracter unit produces the first or least significant digit of the result during $Dt(1)$ time. This means that the binary control signal corresponding to the operation to be performed, must become 1 one digit time before $Dt(1)$ time. Since the serial arithmetic system operates cyclically for multiplication and division, it is convenient to consider the digit time prior to $Dt(1)$ as the last digit time of a preceding word time of operation. The digit time interval prior to $Dt(1)$, therefore, is represented as $Dt(+1)$. Moreover, since operation begins at $Dt(n+1)$ time, each word time signal becomes 1 at $Dt(n+1)$ time and becomes 0 after $Dt(n)$ time.

Since it has been assumed that the numbers are registered with the least significant digits at the extreme right, signal $Dt(j-1)$ is utilized to enter each digit into the adder-subtracter unit. Thus, signal $\overline{Dt}(n-1)$ prevents the entry of the $n$th or sign digit into the adder-subtracter unit.

Logical gates 202, 206, 207, 209, 210, 212, 214, 215, 223, 227, 229, 239, and 241 are coupled, respectively, to input circuits $a$A, $b$A, 1S and 0S, inAr, 1Ad1 and 0Ad1, inBd1, inBr, 1Bd2 and 0Bd2, inCr, 1Cd1 and 0Cd1, 1Cd2 and 0Cd2, 1Ds1 and 0Ds1, and 1Ds2 and 0Ds2. Each of these logical gates is mechanized according to one of a second set of Boolean algebraic equations, the equations being numbered according to the corresponding logical gate. Thus, Boolean algebraic equation 202 provides the mechanization function for logical gate 202 which is connected to the input circuit $a$A of the adder-subtracter unit 204, and equation 209 provides the mechanization function for logical gate 209, which is connected to the input circuit inAr of the A register. Each of the mechanization functions may be considered either as a signal function, which includes signal or signal series variables, such as Add or Ar; or as a mechanization function, where each variable is a lead or connection, such as lead Ar or lead Br. Each Boolean algebraic signal function, as here defined, is generic to all other signal functions which may be derived from it according to the Boolean algebraic manipulations explained below, as well as to all mechanization functions which may be derived therefrom. The manner in which the signal function may be manipulated without changing the signal or signal series which the corresponding logical gate produces, is fully explained below.

In the discussion which follows, the Boolean algebraic signal functions are derived separately for the operations of addition and subtraction, multiplication, division, transfer B to A, and transfer C to A, reference being made to Figs. 2a, 2b, 2c, and 2d, respectively, where the corresponding circuitry is shown in block diagram form, the functions being distinguished by the letters $a$, $b$, $c$, and $d$. Thus, equation 209a is the signal or mechanization function for logical gate 209a shown in Fig. 2a, and is utilized for addition and subtraction.

After the signal functions have been derived separately for the various operations, they are combined and simplified according to certain Boolean algebraic rules, which are explained below. Thus, the signal functions 202a, 202b, 202c, and 202d are combined and simplified and become equation 202, which is a mechanization function utilized in the complete serial system shown in Fig. 2. Again, it should be understood that the combined signal function is generic to any modification thereof, such as that provided by separating it into individual functions for the separate operations. Therefore, when it is said that a logical gate is mechanized in accordance with the signal function, it is to be understood that what is meant is that it is mechanized according to any algebraic variation thereof.

After the Boolean algebraic signal functions for the various operations have been combined and simplified, the control signal functions are introduced, and specific mechanization functions are provided for producing complementary binary control signals and complementary timing signals. The control signal functions correspond to a first set of Boolean algebraic equations, and the combined and simplified functions above correspond to the second set of Boolean algebraic equations.

As has been explained, each algebraic equation may also be considered as a mechanization function. When considered as a mechanization function, however, it is necessary to specify a particular form, since each form of equation will determine a different mechanization. Following the discussion of the signal functions, therefore, various factored forms of the signal functions are considered in the light of certain engineering considerations. At the same time, a specific mechanization form for signal function is selected and the mechanization thereof is discussed, reference being made to Figs. 4a, 4b, 5a, 5b, and 5c, wherein this mechanization is illustrated in detail.

Finally, specific circuits are considered, such as the flip-flop shown in Fig. 6, the diode "and" and "or" circuits shown in Figs. 7a and 7b, and the signal complementing circuit shown in Fig. 8.

BOOLEAN ALGEBRAIC SIGNAL FUNCTIONS FOR ADDITION-SUBTRACTION CIRCUITRY

Referring now to Fig. 2a, it will be noted that all entries are made into the A register which has an $n$-digit capacity. The $n$th digit, designated as $Ar_n$, is entered into sign storage device 208 through logical gate 207a. All entries are made prior to operation as signalled by complementary binary control signal $\overline{Oper}=1$. Numbers may be entered serially into the A register or in parallel as indicated.

The A register signal series $Ar$ is applied to logical gate 202a which has its output terminal connected to the $aA$ input circuit of the adder-subtracter unit 204. Logical gate 202a is controlled by binary control signals Add and Subt and timing signal $\overline{Dt}(n-1)$ which prevents the $n$th or sign digit of the A register from entering into the adder-subtracter unit. In order to insure that all operations are synchronized, it is assumed that a clock pulse signal is included in the signal function of logical gate 202a. Thus, the signal function for the $aA$ input of the adder-subtracter unit appears as follows:

$$(202a) \quad aA = (\text{Add} + \text{Subt}) . \overline{Dt}(n-1) . Ar.cp$$

This function is interpreted as follows: When either of signals Add or Subt is 1 and signals $\overline{Dt}(n-1)$ and $Ar$ are 1, a clock pulse is applied to the $aA$ input of adder-subtracter unit 204. From this, it can be seen that, in effect, logical gate 202a is "opened" by a control signal (Add+Subt) and passes signal series $Ar$ so that it is entered in the adder-subtracter unit after each digit time interval except $Dt(n-1)$, when a sign digit signal would be entered.

The B register signal series $Br$ is entered into adder-subtracter unit 204 through logical gate 206a in response to binary control signals Add or Subt. This signal function then appears as:

$$(206a) \quad bA = (\text{Add} + \text{Subt}) . Br.cp$$

As shown in Fig. 5b, input circuits $aA$ and $bA$ of adder-subtracter unit 204 each include a complementer circuit, such as is shown in Fig. 8, and flip-flops 204a, 204b, for converting signal series $Ar$ and $Br$ into complementary signal series $a_j, \bar{a}_j$ and $b_j, \bar{b}_j$ corresponding to $Ar$ and $Br$, respectively. These signals correspond to the variables $a_j$ and $b_j$ discussed above. The adder-subtracter unit responds to these signals and produces complementary carry signals $c_j$ and $\bar{c}_j$, which are delayed one digit time interval and then utilized in producing the sum signal series $A_0$. Complementary timing control signal $\overline{Dt[n,(n+1)]}$ (1 during all but $Dt(n)$ and $Dt(n+1)$ time intervals) is utilized to prevent a carry after the B register sign digit has been entered into the adder-subtracter unit. Thus, the signal functions which are utilized in the added-subtracter unit 204 are:

$$A_0 = a_j.\bar{b}_j.\bar{c}_{j-1} + \bar{a}_j.b_j.\bar{c}_{j-1} + \bar{a}_j.\bar{b}_j.c_{j-1} + a_j.b_j.c_{j-1}$$

$$c_j \pm = \overline{Dt}(n,n+1).[\bar{S}.(a_j.b_j + b_j.c_{j-1})$$
$$+ a_j.c_{j-1} + S.(a_j.\bar{b}_j + \bar{b}_j.c_{j-1})]$$

Signals $Ar_n$ and $\overline{Ar}_n$ representing the sign digit of the addend or subtrahend are entered into sign storage device 208 through logical gate 207a just prior to operation, as signalled by $\overline{Oper}=1$, in such a manner that the sign storage device 208 registers a 1 if the addend or subtrahend is negative, and registers a 0 if the addend or subtrahend is positive. As explained above, negative numbers have a sign digit of 1 and positive numbers have a sign digit of 0. If the operation is subtraction, then sign storage device 208 must be complemented by applying a "triggering" signal to both of its input circuits. This is done at the beginning of the subtraction operation which, as will be recalled, begins at $Dt(n+1)$ time. Thus, when signal Subt and signal $Dt(n+1)$ are 1, sign storage device 208 is complemented. The signal functions for the sign storage device entry then appear as:

$$(207a) \quad \begin{cases} 1S = [\overline{Oper}.Ar_n \\ 0S = [\overline{Oper}.\overline{Ar}_n \end{cases} + \text{Subt}.Dt(n+1)].cp$$

It will be noted that the term $\text{Subt}.Dt(n+1)$ is centered between the 1S and 0S input functions in order to indicate that it is a "triggering" function which is common to both input circuits.

During addition or subtraction, the A register is circulated through logical gate 210a, delay means 211, and logical gate 209a. Thus, when signal (Add+Subt) is 1, logical gates 209a and 210a are "opened" and signal series $Ar$ is shifted or circulated. It should be noted that the A register circulation path includes $(n+1)$ digit delays, $n$ delays being in the A register itself and 1 delay being in delay means 211. A circulation path comprising $(n+1)$ digit time delays is herein referred to as a normal circulation path. The circulation functions, then, for the A register appear as follows:

$$(209a) \quad inAr = (\text{Add} + \text{Subt}).Ad1.cp$$

$$(210a) \quad \begin{cases} 1Ad1 = Ar.cp \\ 0Ad1 = \overline{Ar}.cp \end{cases}$$

It will be noted that if the A register is a flip-flop register of the type shown in Fig. 5a, it must include a complementer circuit for converting signal series $Ar$ into complementary signal series. A complementer circuit is not required for delay means 211 since complementary signal series $Ar$ and $\overline{Ar}$ are applied directly to the 1 and 0 input circuits. From the discussion above, it should now be understood that the delay through delay means 211 is due to the fact that one digit time is required for the voltage-level signal output of delay means 211 to "open" the logical gate 209a. Thus, after an A register digit has been entered into delay means 211, it is not until the beginning of the next digit time interval that the same digit is entered through logical gate 209 to the input circuit $inAr$ of the A register.

During addition and subtraction, the B register circulates through logical gate 206a, adder-subtracter unit 204, logical gate 212a, delay means 213, and logical gate 214a. One digit time delay is required for producing adder-subtracter output signal series $A_0$, and one digit time is utilized for passing signals through delay means 213. Consequently, the B register includes only $n-1$ digit delays so that it has a normal circulation path of $(n+1)$ digit delays. The B register circulation functions then appear as:

(212a)    $inBd1 = (\text{Add} + \text{Subt}).A_0.cp$
(214a)    $inBr = (\text{Add} + \text{Subt}).Bd1.cp$ Complementer input circuits are included in delay means 213 and the B register, since the input function for the 0 input circuits of these devices is complementary to the 1 input function.

In order to illustrate the operation of the addition-subtraction circuitry, the addition-subtraction problem discussed in column 9, line 17, to column 10, line 55, will be considered again. In this problem, it will be recalled:

$$-b^6 = a^0 + a^1 - a^2 - a^3 + a^4 - a^5$$

where: 
$-a^0 = -2561 = 10101000000001.0$
$+a^1 = +3290 = 00110011011010.0$
$-a^2 = -437 = 10000110110101.0$
$-a^3 = -6974 = 11101100111110.0$
$+a^4 = +6523 = 01100101111011.0$
$-a^5 = -121 = 10000001111001.0$ Each of the operants in the problem is represented by a waveform shown in Fig. 3a. For example, waveforms $b^0$, $a^0$, and $c\_^0$ correspond to the initial augend in the B register which is 0, the addend in the A register, and the negative carry function produced within the adder-subtracter unit, respectively. It will be noted that the least significant A register digit is 0, and that at $Dt(1)$ time, signified by the number 1 at the top of the composite waveform diagram shown in Fig. 3a, waveform $a^0$ has a value of 0. The waveforms shown in Fig. 3a are voltage-level waveforms which are taken from the adder-subtracter unit, and correspond to the voltage-level waveforms which appear at the output circuits of the registers one digit time earlier. Signal Oper is shown at the top of Fig. 3a, and becomes 1 at $Dt(17)$ time (where $n$ is assumed to be 16) and becomes 0 after $Dt(16)$ time.

It will be noted that the sign digit signals of waveforms $a^N$ are 0 since entry of this signal into the adder-subtracter unit is prevented. The sign digit signal of $a^N$ is entered into sign storage device 208, and determines the carry function which is utilized. Thus, waveform $c\_^0$ corresponds to a negative carry function $c_j^-$ utilized when the operation is addition and the addend sign is negative. If the first operation had been subtraction, the sign storage device 208 would be complemented at $Dt(n+1)$ time, and the carry signal waveform would be changed from $c\_^0$ to $c_+^0$ corresponding to a positive carry, since the resulting sign of the operation is plus.

The significance of the other waveforms in Fig. 3a should be apparent from the problem discussed above. The complementing operation which is performed when operant $b^6$ is converted to its "0's" complement $a^8$ will be explained in detail when the operation of transfer B to A is considered.

BOOLEAN ALGEBRAIC SIGNAL FUNCTIONS FOR THE MULTIPLICATION CIRCUITRY

Multiplication is performed as a series of additions or subtractions, and consequently the multiplication circuitry shown in Fig. 2b includes the addition-subtraction circuitry described above with reference to Fig. 2a, the addition-subtraction circuitry being modified to the extent necessary to introduce certain multiplication control signals, such as the control signal Mult.

The multiplier includes $n$ digits, where $x$ of these are significant digits including the sign digit, and $(n-x)$ are 0's to the right of the least significant multiplier digit which is 1. The same number $(n)$ of word times is used for multiplication, regardless of the number of 0's to the right of the least significant multiplier 1 digit. In other words, if multiplier digits $m_1$, $m_2$, $m_3$, and $m_4$ are 0's, the multiplier is shifted during the first four word times although the multiplicand is not added to the partial product. Consequently, the multiplication control signal Mult and the operation control signal Oper each remain at 1 for $n$ word times starting, as in addition, at $Dt(n+1)$ time at the beginning of the first word time.

The C register stores the multiplier signal series, and produces output signals $Cr$ and $\overline{Cr}$, corresponding to the multiplier digits $m_j$. The C register signals are circulated in a manner to be described and are applied through logical gate 239b to the input circuits 1Ds1 and 0Ds1 of first digit storage device 240. A digit signal from signal series $Cr$, corresponding to a multiplier digit $m_j$, is entered into digit storage device 240 just prior to the beginning of each word time. For example, the first multiplier digit $m_1$ is entered into device 240 at $Dt(n+1)$ time at the beginning of the first word time interval, as signalled by $Wt(1) = 1$. The multiplier sign digit $m_n$ is not utilized to control the addition or subtraction of the multiplicand and consequently entry of the multiplier digit signal is prevented by signal $\overline{Wt}(n)$, and digit storage device 240 is set to zero by signal $Dt(n+1).Wt(n)$.

Digit storage device 240 produces output signals $Ds1$ and $\overline{Ds1}$ corresponding to the multiplier digit $m_j$. Signal $Ds1$ is utilized to control the entry of the multiplicand into the adder-subtracter unit 204. When $Ds1$ is 1, signalling a multiplier digit of 1, the multiplicand is added or subtracted; otherwise, no addition or subtraction is performed.

The multiplicand sign digit is not added or subtracted, and is inhibited from the adder-subtracter input circuit $aA$ by signal $\overline{Dt}(n-1)$. It will be noted that this is done at the same time that the addend or subtrahend sign digit is inhibited during addition or subtraction.

The Boolean algebraic signal functions, then, for the input circuits 1Ds1 and 0Ds1 of the digit storage device 240 and for the adder input circuit $aA$ are as follows:

(239b)    $\begin{cases} 1Ds1 = \text{Mult}.Dt(n+1).\overline{Wt}(n).Cr \\ 0Ds1 = \text{Mult}.[Dt(n+1).\overline{Wt}(n).\overline{Cr} + Dt(n+1).Wt(n)] \end{cases}$ (202b)    $aA = \text{Mult}.\overline{Dt}(n-1).Ds1.Ar$ It will be noted that the clock pulse signals have been left out of the functions for simplicity. This will be done hereinafter, it being understood, however, that where clock pulse synchronizing signals are desired, they must be entered as a final "and" function.

The multiplier and partial products are shifted to the right with respect to the multiplicand, during all but the $n$th word time interval, by making the B and C register circulation paths one digit time shorter than the circulation path of the A register. Thus, during all but the $n$th word time interval, the B and C register circulation paths include only $n$ digit delays, whereas A register includes $n+1$ digit delays.

Since only $n-1$ word times are required to complete the multiplication, the B register already stores the final product during time interval $Wt(n-1)$; therefore, no shift is required during time interval $Wt(n)$ and the B register circulation path includes $(n+1)$ digit delays.

During all but the $n$th word time interval of multiplication, the $n$-digit-time B register circulation paths includes logical gate 206b, the adder-subtracter unit 204 (including one delay), and logical gate 214b. During the $n$th word time interval of multiplication, the $(n+1)$-digit-time circulation path of the B register is completed through logical gate 206b, adder-subtracter unit 204, logical gate 212b, delay means 213, and logical gate 214b. The $n$-digit C register circulation path is completed through logical gate 223b.

A 0 sign digit is entered into the B register during each word of positive multiplication by control signal $\overline{Dt}(n+1)$. After one B register shift, the 0 appears in the $n$th or sign digit position. The sign digits for negative multiplication are entered at the same time in the manner described below.

The Boolean algebraic functions, then, for the A, B, and C register circulation paths appear as:

(209b)  $inAr = \text{Mult}.Ad1$
(206b)  $bA = \text{Mult}.Br$
(214b)  $inBr = \text{Mult}.\overline{Dt}(n+1).[\overline{Wt}(n).A_0 + Wt(n).Bd1]$
(212b)  $inBd1 = \text{Mult}.Wt(n).A_0$
(223b)  $inCr = \text{Mult}.Cr$ In addition to the above functions, special functions are introduced into the B register circuitry, in order to enter the "1's" into the sign digit positions of the partial products during negative multiplication. The negative carry signal $c_{j-1}^-$ is utilized as a control signal, which causes a "1" to be stored in delay means 213. In this operation, delay means 213 functions as a flip-flop digit storage device. The "1" signal is continuously regenerated in delay means 213 until $Wt(n)$ time when delay means 213 again functions as a delay in the B register circulation path. The regeneration of the "1" signal is effected by applying the output signal Bd1 of delay means 213 to its input circuit $inBd1$.

When negative multiplication is signalled by $S=1$, as explained below, the regenerated "1" signals produced by delay means 213 are then applied to the B register input circuit $inBr$.

The signal functions required for negative multiplication appear as:

(212b)  $inBd1 = \text{Mult}.\overline{Wt}(n).(c_{j-1}^- + Bd1)$
(214b)  $inBr = \text{Mult}.S.Dt(n+1).Bd1$ and the signal functions for the complete B register circuitry appear as:

(212b)  $inBd1 = \text{Mult}.[Wt(n).A_0 + \overline{Wt}(n).(c_{j-1}^- + Bd1)]$
(214)   $inBr = \text{Mult}.[\overline{Dt}(n+1).(\overline{Wt}(n).A_0 + Wt(n).Bd1) + Dt(n+1).S.Bd1]$ In positive multiplication, as indicated by like signs in the multiplicand and multiplier, the $c_{j-1}^+$ carry function is utilized; whereas in negative multiplication, as indicated by a different multiplicand and multiplier signs, the $c_{j-1}^-$ carry function is utilized. Since the adder-subtracter circuitry is the same as in addition and subtraction, the $c_{j-1}^+$ carry function is utilized when $S=0$, whereas $c_{j-1}^-$ is utilized when $S=1$. Therefore, in order to set sign storage device 208 for multiplication, the multiplicand sign digit $Ar_n$ is entered prior to operation while signal $\overline{\text{Oper}} = 1$, and then the sign storage device is complemented if $Cr_n$, the multiplier sign digit signal is 1. Thus if $Ar_n$ and $Cr_n$ are both 0 or both 1, S is finally set to 0; whereas, if $Ar_n$ is 1 and $Cr_n$ is 0 or $Ar_n$ is 0 and $Cr_n$ is 1, S is finally set to 1. The multiplier sign digit signal is entered at $Dt(n+1)$ time at the beginning of the first word time interval.

The signal functions at the sign storage device input circuits then appear as:

(207b)  $\begin{cases} 1S = \overline{\text{Oper}}.Ar_n \\ 0S = \overline{\text{Oper}}.\overline{Ar_n} \end{cases} + \text{Mult}.Wt(1).Dt(n+1).Cr_n$ where $\text{Mult}.Wt(1).Dt(n+1).Cr_n$ is a "triggering" function common to 1S and 0S.

A digit overflow may occur in the B register if the total number of multiplier plus multiplicand digits is greater than $n$, where $n$ is the digit capacity of the B register. It will be noted, however, that when the multiplication is performed by shifting the partial products to the right with respect to the multiplicand, the overflow digits are the least significant digits of the final product, whereas in multiplication, by shifting the multiplicand to the left with respect to the partial product, the most significant digits will overflow. Consequently, multiplication in the first manner is preferred since, in many problems, it may be permissible to lose the least significant digits of the product, but it is never permissible to lose the most significant digits of the product.

The operation of the above-described multiplication circuitry is completed in $n$ word times regardless of the number of significant digits $x$ in the multiplier. It is possible, however, to complete a multiplication in $(x-1)$ word times, since $x$ includes the multiplier sign digit. To do this, however, $(x-1)$ timing control signals must be produced, one for each number of multiplier digits. Therefore, unless time economy is of the utmost importance, it is preferred to use a standard $n$-word-time operation.

In the $n$-word-time multiplication system described above, a multiplicand or a multiplier, which includes digits to the left of the radix point, is entered with the sign digit at the extreme left and the most significant digit next to the sign digit. When the multiplicand or multiplier has no digits to the left of the radix point, it is entered with the sign digit at the extreme left, and the radix point next to the sign digit. Thus, in a system where $n=8$, the binary equivalent of the decimal number $-10.0$ is entered as 11010.000, and the binary equivalent of $-\frac{1}{8}$ is entered as 1.0010000.

When the multiplier has no significant digits to the left of the radix point and is entered, as explained above, no radix point shift is required for the product, since the operation of the machine shifts the product so that it is positioned correctly with respect to the original radix position of the multiplicand. However, the radix point of the product must be shifted to the right with respect to the original multiplicand position for each significant digit in the multiplier to the left of the radix point.

In a programmed computer system where the operants are entered first and a programmed instruction is then read, the multiplicand sign digit $Ar_n$ is entered into sign storage device 208 during the time when the order to multiply is being read and the multiplier sign digit $Cr_n$ is read from the C register and stored. Sign digit $Cr_n$ is then read at the beginning of multiplication and entered into device 208, as has been explained above.

It should be noted that signals may be entered or read at different digit times than those indicated if the proper delay is introduced. Thus, instead of reading the C register multiplier digit signals $Cr$ at $Dt(n+1)$ time, as above, these signals may be read at $Dt(n)$ time from a point which is one digit delay to the left in the C register. Where time sharing is desired, the same structure may provide signals for different input circuits by utilizing different timing control signals; whereas, where it is desired to minimize the load placed upon a particular device, a buffer delay may be introduced and the signal or signal series desired is then read in response to later control signals.

The operation of the multiplication circuitry is illustrated by performing the first and second multiplication problems set forth above. It is assumed that $n=16$. Thus, multiplication is begun after $Dt(17)$ time, and ended after $Dt(16)$ time.

*First multiplication problem*

Multiplicand = −280 = 1100011000.000000
Multiplier   = −39 = 1100111.000000000
Product      = +10920 = 0010101010101000.

*Second multiplication problem*

Multiplicand = +10920 = 010101010101000.0
Multiplier   = −¾ = 1.110000000000000
Product      = −8190 = 110000000000010.0

Waveforms $a^n$ and $b^n$ correspond to the operants $a^N$ and $b^N$ in the problems set forth above. The integer N corresponds to the word time of operation as well as to an operant number. $Cr^N$ is the multiplier waveform corresponding to the C register output signal $Cr$, after one digit delay. N again designates the word time, as well as a multiplier operand number.

It will be noted that the first nine digits of the multiplier in the first problem are 0, and thus waveform $Cr^1$ has a 0 voltage level $Dt(1)$ time through $Dt(9)$ time. Since, during the word times that the multiplier digit signal $Ds1$ is at the 0 voltage level, the multiplicand is not added, the waveforms which occur during word times $Wt(2)$ through $Wt(9)$ are not shown.

At $Dt(1)$ time of the 10th word time interval, the multiplier digit signal appearing in waveform $Cr^{10}$ is 1, and consequently the multiplicand is added. The partial product which appears at the output of the B register is the multiplicand shifted one digit time to the right due to the fact that the B register circulation path is one digit less than its normal circulation path. Thus, waveform $b^{11}$ is the same as waveform $a^{10}$ except for a shift of one digit position.

At the beginning of the 11th word time interval, the multiplier digit is again 1, and again the multiplicand in the A register is added to the partial product in the B register through the adder-subtracter unit, and the sum or initial partial product appears as waveform $b^{12}$, which again is shifted one digit to the right due to the shorter circulation path of the B register. This process is continued for sixteen word times until the final product $b^{16}$ is formed. It will be noted that the radix point shown on waveform $b^{16}$ has been shifted six positions to the right with respect to the original multiplicand position shown at waveform $a^1$. This is in accordance with the rule discussed above. Multiplication is not performed in response to the multiplier sign digit which is read from the C register at $Dt(1)$ time at the beginning of the 16th word time, as has been explained above.

In the second problem, the multiplier, as represented by waveform $Cr^1$ at the bottom of Fig. 3b, has thirteen "0's" to the right of the first 1 and consequently, the waveforms occurring during thirteen word times are omitted. At the beginning of the 14th word time interval, the multiplier digit signal is 1, the multiplicand is then subtracted since the operation is negative multiplication, and the partial product $b^{15}$ appears shifted one digit to the right as explained above. At the beginning of the 15th word time interval, the next multiplier digit is also 1 and the multiplicand is subtracted again. The final product is represented by waveform $b^{16}$ which, it will be noted, is in its "0's" complemented form.

BOOLEAN ALGEBRAIC SIGNAL FUNCTIONS FOR THE DIVISION CIRCUITRY

The addition-subtraction circuitry shown in Fig. 2a is included in the division circuitry shown in Fig. 2c for the addition or subtraction of the divisor, which is entered into the A register, and the dividend or partial remainder, in the B register. A quotient digit is entered into the C register after $Dt(1)$ time during each word time, the first word time utilized to enter the quotient sign digit.

The dividend is entered into the B register by adding it to zero as if it were an addend. Thus, a negative dividend is entered into the B register as it "0's" complement with a 1 sign digit.

The first digit storage device 240 is utilized to store the dividend sign digit and the partial remainder sign digits, the dividend sign being stored during the first word time of operation, and the partial remainder signs being stored during the following word time intervals. Second digit storage device 242 is utilized for storing the dividend sign digit after the first word of operation.

The partial remainders in the B register are shifted to the left with respect to the divisor in the A register by making the B register circulation path one digit time longer than the A register circulation path, or $(n+2)$ digit times. Thus, in addition to delay means 213, the B register circuitry for division includes delay means 216.

The quotient is shifted to the left with respect to the divisor by including $n+2$ delays in the C register circulation path. For this purpose, first and second delay means 228 and 230 are included in the C register circulation path. In preparation for the next operation, it is desirable to clear the B register during the last word time of division. This is done by signal $\overline{Wt}(n)$ which is applied to the input circuit of delay means 213 and enters a series of "0's" during the $n$th word time interval, these "0's" being then entered into the B register. The circulation signal functions for division then appear as:

(209c)   $inAr = \text{Div}.Ad1$.  ⎫

(210c)   $\begin{cases} 1Ad1 = Ar \\ 0Ad1 = \overline{Ar} \end{cases}$  ⎬ A Register Circulation (206c)   $bA = \text{Div}.Bd2$  ⎫

(212c)   $inBd1 = \text{Div}.\overline{Wt}(n).A_0$ (214c)   $inBr = \text{Div}.Bd1$  ⎬ B Register Circulation (215c)   $\begin{cases} 1Bd2 = \text{Div}.Br \\ 0Bd2 = \text{Div}.\overline{Br} \end{cases}$ (227c)   $\begin{cases} 1Cd1 = \text{Div}.Cr \\ 0Cd1 = \text{Div}.\overline{Cr} \end{cases}$  ⎬ C Register Circulation (229c)   $\begin{cases} 1Cd2 = \text{Div}.Cd1 \\ 0Cd2 = \text{Div}.\overline{Cd1} \end{cases}$ Division in the system shown in Fig. 2c is performed in accordance with the second approach described above. A word time of operation is utilized for each addition or subtraction during division. The partial remainder sign digit produced during each word time determines whether or not the divisor is added or subtracted during the following word time. In analyzing the division problems considered in column 13, line 45, to column 15, line 18, it can be seen that for both positive and negative division, a partial remainder sign digit of 1 indicates that an addition is to be performed during the next word time interval, and a 0 sign digit indicates that a subtraction is to be performed during the next word time interval.

The dividend and partial remainder signs are read from the sign series $Bd1$ and $\overline{Bd1}$ produced by delay means 213 at $Dt(n+1)$ time during each word time interval, and are entered into first storage device 240 through logical gate 239. Thus, the input circuit functions for digit storage device 240 appear as:

(239c)   $\begin{cases} 1Ds1 = \text{Div}.Dt(n+1).Bd1 \\ 0Ds1 = \text{Div}.Dt(n+1).\overline{Bd1} \end{cases}$ As in addition and multiplication, the A register sign digit $Ar_n$, corresponding to the divisor sign, is entered into sign digit storage device 208 prior to operation, as signalled by $\overline{\text{Oper}} = 1$. The resulting sign digit storage device output signals S and $\overline{S}$ are utilized, as explained below, to determine the quotient sign digit signal. In response to timing control signal $Dt(1)$, signals $Ds1$ and $\overline{Ds1}$, corresponding to the partial remainder sign digit, are applied to the 0S and 1S input circuits of the sign digit storage device, respectively. If $Ds1$ is 1 and $\overline{Ds1}$ is 0, S then becomes 0 and the divisor is added during the next word time interval, whereas, if $Ds1$ is 0 and $\overline{Ds1}$ is 1, $S = 1$, and the divisor is subtracted during the next word time interval. The signal functions appearing at the sign storage device input circuits then appear as:

(207c)   $\begin{cases} 1S = \overline{\text{Oper}}.Ar_n + \text{Div}.Dt(1).\overline{Ds1} \\ 0S = \overline{\text{Oper}}.\overline{Ar_n} + \text{Div}.Dt(1).Ds1 \end{cases}$ At $Dt(1)$ time of each word of division, a quotient digit is entered into the C register, the first word time, as signalled by $Wt(1)$, being utilized to enter the quotient sign digit. The quotient sign digit is 1, representing a negative quotient, when the dividend and divisor sign digits are different as indicated by $Ds1=1$ and $\bar{S}=1$ or $\overline{Ds1}=1$ and $S=1$, and the sign digit is 0 when the dividend and divisor sign digits are the same. The signal relationship, then, for entering the quotient sign digit is:

(223c)  $inCr=Div.Dt(1).\overline{Wt}(1)(Ds1.\bar{S}+\overline{Ds1}.S)$

Since the quotient digits following the quotient sign digit are determined as a function of the dividend sign digit and the corresponding partial remainder sign digit, it is necessary to store the dividend sign digit during the entire division operation. This is done at the beginning of the first word of operation by transferring the dividend sign digit from first digit storage device 240 to the second digit storage device 242. The signal relationships for this operation are shown by:

(241c)  $\begin{cases} 1Ds2=Div.Wt(1).Ds1 \\ 0Ds2=Div.Wt(1).\overline{Ds1} \end{cases}$ The quotient digit rule for division, according to the second approach explained above, may be represented algebraically as: $Ds1.Ds2+\overline{Ds1}.\overline{Ds2}$, where $Ds1$ and $Ds2$ represent the partial remainder and dividend sign digit signals, respectively. This function indicates that the quotient digit is 1 whenever the partial remainder sign is the same as the dividend sign, that is, when the dividend sign is 1 and the partial remainder sign is 1, or when the dividend sign is 0 and the partial remainder sign is 0; otherwise, the quotient digit is 0. The input to the C register for quotient digit entry then is:

(223c)  $inCr=Div.Dt(1).\overline{Wt}(1)(Ds1.Ds2+\overline{Ds1}.\overline{Ds2})$ And the complete C register input function is:

(223c)  $inCr=Div.[Cd2+Dt(1).Wt(1).(Ds1.\bar{S}+\overline{Ds1}.S)+Dt(1).\overline{Wt}(1)(Ds1.Ds2+\overline{Ds1}.\overline{Ds2})]$ The operation of the division circuitry is illustrated by performing the first and second division problems set forth in column 13, line 45, column 15, line 18, each problem being performed according to the second approach. The waveforms $a^N$ and $b^N$ in Fig. 3c correspond to the operants $a^N$ and $b^N$ in the above problems, respectively. As above, the number N may be considered either as an operant number or as a number indicating the word time of operation. A waveform, corresponding to the quotient digit signals, is found at the input of the C register and is designated as $inCr^N$.

*In the first division problem*

Dividend=   $-8190=10000000000010.00$
Divisor  =   $-13=11101.00000000000$
Quotient =(630−1/32)=$01001110101.11111$

*In the second division problem*

Figure 3C:
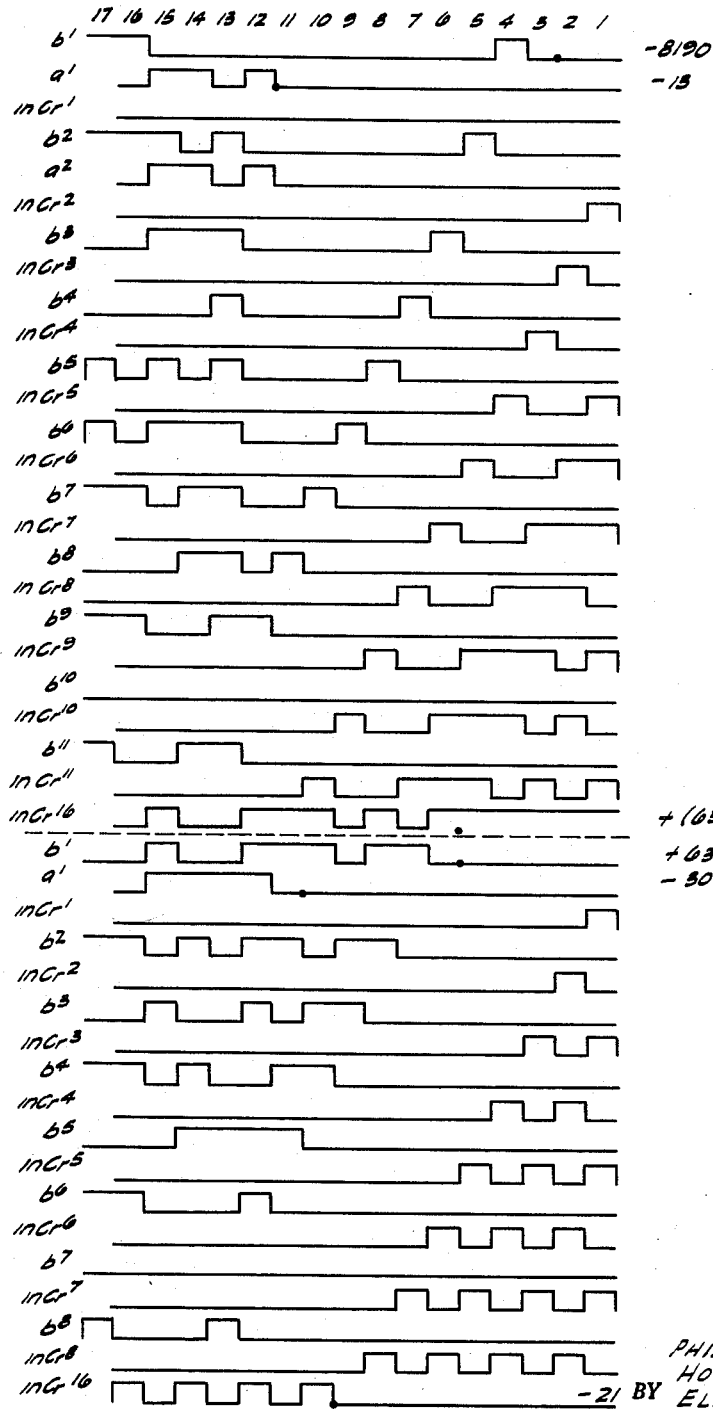
Fig. 3c is a composite diagram of the waveforms of signals appearing at various points in the embodiment of Fig. 2 during the operation of division.

Dividend= 630=$01001110110.00000$
Divisor  =−30=$111110.0000000000$
Quotient =−21=$1010101.000000000$ Waveforms $b^N$ and $a^N$ are derived from the adder-subtracter unit and consequently, the time positions in the waveforms correspond to the digits represented. Thus, the voltage level during the 4th digit time interval of waveform $b^1$ corresponds to the 4th digit of the dividend or initial partial remainder. The 17th partial remainder digit signals are shown in Fig. 3c since these signals correspond to the 16th or sign digit signals as read after one delay from delay means 213.

In performing the first problem, the first word time of operation is utilized to enter the quotient sign. In the first problem, both the dividend and divisor are negative and consequently a 0 signal appears at the input of the C register at $Dt(1)$ time at the beginning of the first word time of operation. During the following word time of operation, a 1 voltage level appears during $Dt(1)$ time at the C register input circuit whenever the voltage level of the partial remainder sign digit is 1. For example, during the second word time, a voltage level of 1 appears at the C register input circuit at $Dt(1)$ time since the partial remainder sign digit signal appearing at $Dt(17)$ time in waveform $b^2$ is 1. After each word time of operation, the quotient digit signals and the partial remainder signals are shifted to the left with respect to the divisor signals in the A register.

In the second problem, it will be noted that a sign of 1 is entered into the C register at $Dt(1)$ time at the beginning of the first word time of operation because the dividend and divisor have different signs. Operation then is continued as above except that the second division problem is a positive division problem, whereas the first division problem is a negative division problem.

BOOLEAN ALGEBRAIC SIGNAL FUNCTIONS FOR TRANSFER AND SHIFT

Although numbers in the registers may be shifted either to the right or to the left, it is preferred to shift in the direction of normal circulation, so as to avoid the necessity of additional logical gates. With normal circulation to the right, as explained above, a shift to the left is accomplished by circulation for $[(n+1)-SL]$ digit times, where SL is the number of shifts to the left desired. Thus, the A register is shifted SL digits to the left by utilizing a control signal which is 1 during $[(n+1)-SL]$ digit times. The manner in which the control signal for shift is derived is explained in detail in connection with the mechanization of the other control signals.

Referring now to Fig. 2d, it will be noted that in transfer operations, number in the B and C registers pass through one digit delay before entering the A register through logical gate 209d. For the B register, the extra delay is in the adder-subtractor unit, whereas for the C register it is in delay means 228. The extra delay is required since the normal word time of $(n+1)$ digit times is utilized for transfer, each of control signals Tba and Tca being 1 between $Dt(n+1)$ time and $Dt(n)$ time. Thus, the signal functions at the A register input circuit $inAr$ appear as:

(209d)  $inAr=Tca.Cd1+Tba.A_0$

When negative numbers in the B register are transferred to the A register, they are complemented in order to convert them from their "0's" complemented form to the proper form for A register storage. Numbers in the A register, it will be recalled, are entered as an absolute value plus sign digit.

The B register sign may be utilized in many operations, as for example, the transfer of a negative product to an external register and consequently, it is convenient to store the sign digit signal as read from delay means 213 in digit storage device 240 after each operation, as signalled by $\overline{Oper}$. The signal functions for this entry are:

(239d)  $\begin{cases} 1Ds1=\overline{Oper}.Bd1 \\ 0Ds1=\overline{Oper}.\overline{Bd1} \end{cases}$ Signals $Ds1$ and $\overline{Ds1}$, then, representing the B register sign digit, are utilized to set sign storage device 208 so that its output signal $S=1$ when $Ds1=1$ and $S=0$ when $\overline{Ds1}=1$. The entry into sign storage device 208 is made at $Dt(n+1)$ time at the beginning of the transfer operation B to A as signalled by $Tba=1$. The signal functions for this entry are:

(207d)  $\begin{cases} 1S=Tba.Ds1.Dt(n+1) \\ 0S=Tba.\overline{Ds1}.Dt(n+1) \end{cases}$ When the number in the B register is negative, it must be subtracted from 0 in order to obtain its absolute value. The carrying function for subtracting $b$ from $a$ is:

$c_j\text{-}=\bar{a}_j.b_j+\bar{a}_j.c_{j-1}+b_j.c_{j-1}$

When $a=0$, this function reduces to:

$$c_j{}^- = b_j + c_{j-1} + b_j.c_j = b_j + c_{j-1}$$

As in normal subtraction, the carries are eliminated during $Dt(n)$ and $Dt(n+1)$ digit times by signal $\overline{Dt}[n,(n+1)]$. The difference function, it will be recalled is the same for addition and subtraction and thus no change is made in the signal function for $A_0$. The adder-subtracter carry function for the transfer of negative B register numbers to the A register then is:

$$c_j{}^- = Tba.\overline{Dt}[n,(n+1)].S.(b_j + c_{j-1})$$

When $S=0$, it will be noted that there is no carry and the B register number is not complemented.

Since the true "0's" complement of a negative B register number would have a 0 sign digit, it is necessary to eliminate the B register sign digit during the operation of transfer B to A. This is done by signal $\overline{Dt}(n-1)$. The signal function for the adder-subtracter input circuit $bA$ then appears as:

$$(206d) \quad bA = Tba.\overline{Dt}(n-1).Br$$

The complementing operation during the transfer of B to A is illustrated by waveforms $b^7$, $a^7$, $c_-^7$, and $a^8$ in Fig. 3a. These waveforms correspond to operants $b^7$, $a^7$, $c_-^7$, and $a^8$, respectively, utilized in the addition problem above.

The shifting operation is utilized in preparing the signal series $a^8$ in Fig. 3a for use as an operant in the multiplication operation illustrated by the waveforms in Fig. 3b. Thus, waveform $a^8$ corresponds to waveform $a^1$ in Fig. 3b after a shift of five digit positions to the left.

COMBINING AND SIMPLIFYING THE BOOLEAN ALGEBRAIC SIGNAL FUNCTIONS

The input functions for each of the circuits above described are combined by logical addition. Thus, the separate input functions for the A register input circuit, $inAr$: (209a) $(Add+Subt).Ad1$, (209b) $Mult.Ad1$, (209c) $Div.Ad1$, (209d) $Tba.A_0+Tca.Cd1$, are combined to provide the complete A register input function, which appears as:

$$(209) \quad inAr = (Add+Subt+Mult+Div).Ad1 + Tba.A_0 + Tca.Cd1$$

After the mechanization functions for an input circuit have been combined, they are simplified in accordance with the well-known Boolean algebraic rules. Briefly summarized, these rules are:

(1) $x+y=y+x$ ⎫ Cumulative
(2) $x.y=y.x$ ⎭
(3) $x.(y+z)=x.y+x.z$ ) Distributive
(4) $x+\bar{x}=1$
(5) $x.\bar{x}=0$
(6) $x+x=x$
(7) $x.x=x$
(8) $1-x=\bar{x}$
(9) $1+x=1$ Where $x$, $y$, and $z$ may be variables, such as $a$, $b$, and $c$; or functions of variables, such as $(a+b)$ or $a.b$. Thus, according to rules 3, 7, and 9 above $(a+b).(a+c) = a.a+a.c+b.a+b.c=a.[1+(c+b)]+b.c=a+b.c$.

An important relationship utilized in the simplification process below is that the logical sum of all the combinations of $n$ complementary pairs of variables, $n$ variables being taken at a time, is equal to 1. Thus $x=a.b+a.\bar{b}+\bar{a}.b+\bar{a}.\bar{b}=1$. From this and rule 4 above, it can be seen that if $f(a,b)=a.b$ then $\bar{f}(a,b)=a.\bar{b}+\bar{a}.b+\bar{a}.\bar{b}$, since $f(a,b)+\bar{f}(a,b)=a.b+a.\bar{b}=\bar{a}.b+\bar{a}.\bar{b}=1$. This relationship is hereinafter referred to as rule (10).

From rules 3, 4, and 10 above, it can be shown that a function, such as $x$, may be changed into its complementary function, $\bar{x}$, by complementing each of the variables of the function and by changing all "and" operations into "or" operations and all "or" operations into "and" operations. Thus, if $x=a.\bar{b}+c$, then $\bar{x}=(\bar{a}+b).\bar{c}$.

Another important relationship which may be derived from the above rules is that $w.(x+\bar{x}.y)=w.(x+y)$, where $w$ is a variable or function of variables. This relationship is hereinafter referred to as rule (11).

It will be shown below, when the mechanization of the control signals is considered, that the sum of all the control functions is equal to 1. This is established by applying rule (10) above in connection with another algebraic manipulation explained below. Thus:

$$Add+Subt+Mult+Div+Tba+Tca=1$$

From this and rule (8) above, it can be seen that the sum of a set of control signals is equal to the complement of the sum of the remaining control signals. For example:

$$Add+Subt+Div+Tca = 1-(Mult+Tba)$$
$$= \overline{(Mult+Tba)} = \overline{Mult}.\overline{Tba}$$

Since most of the combining and simplifying manipulations are obvious from the above rules, only a few situations are considered below, illustrating the more difficult algebraic manipulations which may be involved in the simplification technique.

The complete signal function for logical gate 214 connected to the input circuit of the B register is found by adding the signal functions of logical gates 214a, 214b, and 214c. The combined input signal function then appears as:

(214) $inBr = (214a)$ $(Add+Subt).Bd1+$
  (214b) $Mult.[\overline{Dt(n+1)}.(\overline{Wt(n)}.A_0+Wt(n).Bd1)$
  $+Dt(n+1).S.Bd1]+$
  (214c) $Div.Bd1$ In order to simplify this function, the B register is allowed to circulate during both transfer operations by adding the function $(Tba+Tca).Bd1$. It will be noted, then, that signal series $Bd1$ is applied to the B register input circuit during addition, subtraction, division, and both transfer operations; in other words, during all operations except multiplication. Thus, the B register input function may be rewritten as:

(214) $inBr = Bd1.[\overline{Mult}+Mult.\overline{Dt}(n+1).Wt(n)$
  $+Mult.Dt(n+1).S]+A_0.Mult.\overline{Dt}(n+1).\overline{Wt}(n)$ where $(Add+Subt+Div+Tba+Tca)$ is replaced with $\overline{Mult}$.

This expression may then be simplified according to rule (11) above to:

(214) $inBr = Bd1.[\overline{Mult}+\overline{Dt}(n+1).Wt(n)$
  $+Dt(n+1).S]+A_0.Mult.\overline{Dt}(n+1).\overline{Wt}(n)$ Consider now the combined input function appearing at the input of delay means 213:

(212) $inBd1 = (212a)$ $(Add+Subt).A_0+$
  (212b) $Mult.[Wt(n).A_0+\overline{Wt}(n).(c_{j-1}{}^-+Bd1)]+$
  (212c) $Div.\overline{Wt}(n).A_0+$
  $Tca.A_0$ Signal $Tca.A_0$ has been added so that the B register circulates during the transfer C to A. The addition of this function facilitates the simplification below. From the combined function above, it can be seen that signal series $A_0$ is applied to delay means 213 through logical gate 212 during all operations except transfer B to A, the first $(n-1)$ word times of multiplication, as signalled by $Mult.\overline{Wt}(n)=1$, or the $n$th word time of division, as signalled by Div. $Wt(n)=1$. Thus, equation 212 above may be written as:

(212) $inBd1 = A_0.[1-(Tba+\text{Mult}.\overline{Wt}(n)$
$+\text{Div}.Wt(n)] + \text{Mult}.\overline{Wt}(n).(c_{j-1}+Bd1)$ where $[1-(Tba+\text{Mult}.\overline{Wt}(n)+\text{Div}.Wt(n))]$ provides the except . . . logic, above.

This, according to rule (8) above and the rule for complementing a function, becomes:

(212) $inBd1 = A_0.\overline{Tba}.[\overline{\text{Mult}}+Wt(n)].[\overline{\text{Div}}$
$+\overline{Wt}(n)] + \text{Mult}.\overline{Wt}(n).(c_{j-1}+Bd1)$ Finally, the above function may be simplified to:

(212) $inBd1 = A_0.[\overline{Tba}.\overline{\text{Mult}}.\overline{\text{Div}}$
$+\overline{Tba}.\overline{\text{Mult}}.\overline{Wt}(n) + \overline{Tba}.\overline{\text{Div}}.Wt(n)]$
$+\text{Mult}.\overline{Wt}(n).(c_{j-1}+Bd1)$ From the above examples and rules, the manner of combining and simplifying the remaining signal functions should be apparent. The combined and simplified signal functions for all the logical gates shown in Fig. 2 are:

(202) $aA = \overline{Dt}(n-1).Ar.(\text{Add+Subt+Mult}.Ds1+\text{Div})$
(206) $bA = (\text{Add+Subt}).Br+\text{Mult}.Br+\text{Div}.Bd2+Tba.\overline{Dt}(n-1)Br+Tca.Br$
$= Br.[(1-(\text{Div}+Tba))+Tba.\overline{Dt}(n-1)]+Bd2.\text{Div}$
$= Br.[\overline{\text{Div}}.\overline{Tba}+Tba.\overline{Dt}(n-1)]+Bd2.\text{Div}$ (207) $\begin{cases} 1S = \overline{\text{Oper}}.Ar_n+Dt(1).\text{Div}.\overline{Ds1}+Tba.Ds1.Dt(n+1) \\ 0S = \overline{\text{Oper}}.\overline{Ar}_n+Dt(1).\text{Div}.Ds1+Tba.\overline{Ds1}.Dt(n+1) \end{cases}$
$+\text{Subt}.Dt(n+1)+\text{Mult}.Wt(1).Dt(n+1).Cr_n$ Adder-Sub-tracter $\begin{cases} A_0 = a_j.\overline{b}_j.\overline{c}_{j-1}+\overline{a}_j.b_j.\overline{c}_{j-1}+\overline{a}_j.\overline{b}_j.c_{j-1}+a_j.b_j.c_{j-1} \\ c_j^{\pm} = \overline{Dt}[(n),(n+1)].[Tba.S.(b_j+c_{j-1})+ \\ \qquad Tba.\overline{S}.b_j.c_{j-1}+\overline{Tba}.(\overline{S}.(a_j.b_j+b_j.c_{j-1})+ \\ \qquad a_j.c_j.+S.(a_j.\overline{b}_j+\overline{b}_j.c_{j-1}))] \end{cases}$ (NOTE.—Signal $Tba.\overline{S}.b_j.c_{j-1}$ has been added for simplification purposes. This signal is equal to 0 because when $\overline{S}=1$ the carry function $c_{j-1}=0$.)

Utilizing rules 4 and 11 above, the carry function may be simplified to:

$c_j^{\pm} = \overline{Dt}[(n),(n+1)].[S.c_{j-1}.(Tba+\overline{Tba}.\overline{b}_j)+Tba.S.b_j+$
$\overline{S}.b_j.c_{j-1}.(Tba+\overline{Tba})+\overline{Tba}.(\overline{S}.a_j.b_j+$
$a_j.c_{j-1}+S.a_j.\overline{b}_j)]$
$= \overline{Dt}[(n),(n+1)].[S.c_{j-1}.(Tba+\overline{b}_j)+Tba.S.b_j+$
$\overline{S}.b_j.c_{j-1}+\overline{Tba}.(\overline{S}.a_j.b_j+a_j.c_{j-1}+S.a_j.\overline{b}_j)]$ (209) $inAr = Tca.Cd1+Tba.A_0+(\text{Add+Subt+Mult+Div}).Ad1$
$= Tca.Cd1+Tba.A_0+\overline{Tba}.\overline{Tca}.Ad1$ (210) $\begin{cases} 1Ad1 = Ar \\ 0Ad1 = \overline{Ar} \end{cases}$ (212) $inBd1 = A_0.\overline{Tba}.\overline{\text{Mult}}.\overline{\text{Div}}+\overline{Tba}.\overline{\text{Mult}}.\overline{Wt}(n)+\overline{Tba}.\overline{\text{Div}}.Wt(n)+$
$\text{Mult}.\overline{Wt}.(n).(c_{j-1}+Bd1)$ (214) $inBr = Bd1.[\text{Mult}+\overline{Dt}(n+1).Wt(n)+Dt(n+1).S]+$
$A_0.\text{Mult}.\overline{Dt}(n+1).Wt(n)$ (215) $\begin{cases} 1Bd2 = \text{Div}.Br \\ 0Bd2 = \text{Div}.\overline{Br} \end{cases}$ (223) $inCr = \text{Mult}.Cr+\text{Div}.Cd2+Dt(1).\overline{Wt}(1).(Ds1.\overline{S}+\overline{Ds1}.S)+$
$Dt(1).Wt(1).(Ds1.Ds2+\overline{Ds1}.Ds2)+\overline{\text{Mult}}.\overline{\text{Div}}.Cd1$ (NOTE.—Signal $\overline{\text{Mult}}.\overline{\text{Div}}.Cd1$ has been added so that the C register circulates through delay means 228 during all operations except multiplication and division. This allows the use of a continuously circulating type of register, if desired.)

(227) $\begin{cases} 1Cd1 = Cr \\ 0Cd1 = \overline{Cr} \end{cases}$ (229) $\begin{cases} 1Cd2 = Cd1 \\ 0Cd2 = \overline{Cd1} \end{cases}$ (239) $\begin{cases} 1Ds1 = Dt(n+1).[\text{Mult}.\overline{Wt}(n).Cr+Bd1(\text{Div}+\overline{\text{Oper}})] \\ 0Ds1 = Dt(n+1).[\text{Mult}.(\overline{Wt}(n).Cr+Wt(n)+\overline{Bd1}(\text{Div}+\overline{\text{Oper}})] \end{cases}$ (NOTE.—Signal $(\text{Div}+\overline{\text{Oper}})$ may be replaced by $\overline{\text{Mult}}$ so that the B register sign digit is always entered into storage device 240 except during multiplication.)

The function may then be simplified to:

(239) $\begin{cases} 1Ds1 = Dt(n+1).[\text{Mult}.\overline{Wt}(n).Cr+Bd1.\overline{\text{Mult}}] \\ 0Ds1 = Dt(n+1).[\text{Mult}.(\overline{Cr}+Wt(n))+\overline{Bd1}.\overline{\text{Mult}}] \end{cases}$ (241) $\begin{cases} 1Ds2 = \text{Div}.Wt(1).Ds1 \\ 0Ds2 = \text{Div}.Wt(1).\overline{Ds1} \end{cases}$ Each of the above signal functions may be modified by multiplying it by a function equal to 1, such as $(\text{Mult}+\overline{\text{Mult}})$ or $Br+\overline{Br}$); by adding a function equal to 0, such as $\text{Div}.\overline{\text{Div}}$ or $Ar.\overline{Ar}$; or by substituting equivalent functions such as $(\text{Add+Subt}+Tca)$ for $$\overline{Tba}.\overline{\text{Mult}}.\overline{\text{Div}}$$

As a general rule, a signal function may be mechanized most economically if it is in its simplest form with respect to the number of signals required. However, due to the fact that the signal functions may be modified quite simply, as above, each signal function must be considered as generic to all modifications thereof, and consequently are not considered as being limited to the preferred or simplified signal functions shown.

BOOLEAN ALGEBRAIC SIGNAL FUNCTIONS FOR THE CONTROL CIRCUITRY

A plurality of two-stable-state devices are utilized to store binary-coded signals representing the input instructions for addition, subtraction, multiplication, division, transfer of the B register signals to the A register, and transfer of the C register signals to the A register, respectively. As is well known, the number of binary codes storable in a group of flip-flops or two-stable-state devices is equal to $2f$, where $f$ is equal to the number of flip-flops or two-stable-state devices. Thus, a three flip-flop register can store eight binary codes.

Three flip-flops, which may be of the type illustrated in Fig. 6, are utilized to store instruction signals corresponding to the six instructions above. This means that two of the possible eight storage codes are not utilized. The unused codes are effectively equal to zero and may be used, as shown below, to simplify the six instruction codes.

The three instruction storage flip-flops are referred to as I1, I2, and I3 and produce complementary output signals $I^1$ and $\bar{I}^1$, $I^2$ and $\bar{I}^2$, and $I^3$ and $\bar{I}^3$, respectively. The following set of signal relationships are illustrative of one of the many possible ways that the binary control signals, Add, Subt, Mult, Div, Tba, and Tca, may be defined:

$$\text{Add} = \bar{I}^1.\bar{I}^2.\bar{I}^3$$

$$\text{Subt} = \bar{I}^1.\bar{I}^2.I^3$$

$$\text{Mult} = \bar{I}^1.I^2.\bar{I}^3$$

$$\text{Div} = \bar{I}^1.I^2.I^3$$

$$Tba = I^1.\bar{I}^2.\bar{I}^3$$

$$Tca = I^1.\bar{I}^2.I^3$$

Not used: (1) $I^1.I^2.\bar{I}^3 = 0$ (2) $I^1.I^2.I^3 = 0$

It will be noted that the unused signals above are functions of complementary flip-flop output signals. This selection makes it possible to obtain the simplest mechanization functions for the binary control signals. The simplified functions are derived as follows:

$$\text{Add} = \bar{I}^1.\bar{I}^2.\bar{I}^3 + \bar{I}^1.\bar{I}^2.I^3 = \bar{I}^1.\bar{I}^2$$

$$\text{Subt} = \bar{I}^1.\bar{I}^2.I^3 + \bar{I}^1.I^2.I^3 = \bar{I}^1.I^3$$

$$\text{Mult} = \bar{I}^1.I^2.\bar{I}^3 + I^1.I^2.\bar{I}^3 = I^2.\bar{I}^3$$

$$\text{Div} = \bar{I}^1.I^2.I^3 + I^1.I^2.I^3 = I^2.I^3$$

$$Tba = I^1.\bar{I}^2.I^3 + I^1.I^2.I^3 = I^1.I^3$$

$$Tca = I^1.I^2.\bar{I}^3 + I^1.I^2.I^3 = I^1.I^2$$

If each of the control signals is multiplied by the complementary flip-flop signals which are not utilized, the sum of all the control signals can be shown to be equal to the sum of all the combinations of complementary flip-flop signals, taken three at a time, which, as explained above, is equal to 1. Thus:

Add.(1)+Subt.(1)+Mult.(1)+Div.(1)+Tba.(1)
$$+Tca.(1) = \bar{I}^1.\bar{I}^2.(\bar{I}^3 + I^3) + \bar{I}^1.I^3.(\bar{I}^2 + I^2) + I^2.I^3.(\bar{I}^1 + I^1) + \bar{I}^2.I^3.(\bar{I}^1 + I^1) + I^1.I^3(\bar{I}^2 + I^2) + I^1.I^2(\bar{I}^3 + I^3)$$
$$= \bar{I}^1.\bar{I}^2.\bar{I}^3 + \bar{I}^1.\bar{I}^2.I^3 + \bar{I}^1.I^2.I^3 + I^1.\bar{I}^2.I^3 + I^1.I^2.I^3$$
$$+ I^1.\bar{I}^2.\bar{I}^3 + \bar{I}^1.I^2.\bar{I}^3 + I^1.I^2.\bar{I}^3 = 1$$

It will be recalled that each of the binary control signals is to include an operation signal, referred to as Oper, so that each operation may be initiated when Signal Oper becomes 1 and terminated after signal Oper becomes 0. For this purpose, an operate flip-flop is utilized having input circuits 0-Oper and 1-Oper and producing complementary output signals Oper and $\overline{\text{Oper}}$. The complementary binary control signals then appear as:

| | |
|---|---|
| Add = $\bar{I}^1.\bar{I}^2$.Oper | $\overline{\text{Add}} = (I^1 + I^2 + \overline{\text{Oper}})$ |
| Subt = $\bar{I}^1.I^3$.Oper | $\overline{\text{Subt}} = (I^1 + \bar{I}^3 + \overline{\text{Oper}})$ |
| Mult = $I^2.\bar{I}^3$.Oper | $\overline{\text{Mult}} = (\bar{I}^2 + I^3 + \overline{\text{Oper}})$ |
| Div = $I^2.I^3$.Oper | $\overline{\text{Div}} = (\bar{I}^2 + \bar{I}^3 + \overline{\text{Oper}})$ |
| Tba = $I^1.I^3$.Oper | $\overline{\text{Tba}} = (\bar{I}^1 + \bar{I}^3 + \overline{\text{Oper}})$ |
| Tca = $I^1.\bar{I}^2$.Oper | $\overline{\text{Tca}} = (\bar{I}^1 + I^2 + \overline{\text{Oper}})$ |

To operate flip-flop is to be turned "on" after the concurrence of a 1 signal representing the nth digit time and a 1 signal representing an order to start. This may be done as follows: A start flip-flop having input circuits 1St and 0St is turned "on" by a start pulse applied to input circuit 1St and produces output signals St and $\overline{St}$. Synchronizing pulses, $p^n$ and $p^{(n+1)}$, are applied to the 1T(n) and 0T(n) input circuits, respectively, of a timing flip-flop which produces complementary output signals T(n) and $\overline{T}(n)$. The synchronizing pulse $p^n$ is applied to input circuit 1T(n) of the timing flip-flop once every (n+1) digit times or once each word time. Synchronizing pulse $p^{(n+1)}$ is applied to input circuit 0T(n) one digit time after $p^n$ is applied to input circuit 1T(n). Thus, signal T(n) is 1 between the application of synchronization pulses $p^n$ and $p^{(n+1)}$. It will be seen that once the computer is operating, $p^n$ and $p^{(n+1)}$ are applied, respectively, at Dt(n) time and Dt(n+1) time, during operation.

If the computer utilizes a magnetic drum to generate clock pulse signals, then synchronizing pulses $p^n$ and $p^{(n+1)}$ are also put on the drum in the proper position. otherwise these pulses may be generated by an oscillator and frequency divider system which is synchronized with the clock pulses.

When both the timing flip-flop and the start flip-flop are "on," a clock pulse is applied to input circuit 1-Oper of the operate flip-flop. This signal function, then, appears as:

$$1\text{-Oper} = St.T(n).cp$$

The clock pulses are generated at a frequency such that (n+1) clock pulses are produced during each word time. Each clock pulse is produced at the beginning of a digit time interval. The nth clock pulse during each word time is produced simultaneously with pulse $p^n$ and the (n+1)st clock pulse is produced simultaneously with pulse $p^{(n+1)}$. Thus, after signals T(n) and St become 1, a clock pulse is applied to input circuit 1-Oper of the operate flip-flop and signal Oper becomes 1 at Dt(n+1) time.

One digit time after signal Oper becomes 1, a clock pulse is applied to input circuit 0St of the start flip-flop and turns it to 0. The signal function for this appears as:

$$0St = \text{Oper}.cp$$

During all operations except multiplication and division, as signalled by $\overline{\text{Mult.Div}}$, signal Oper remains 1 during one word time and then is turned to 0. During multiplication and division, signal Oper remains 1 for n word times and then is turned to 0. For all operations, this is done by applying a clock pulse to input circuit 0-Oper after signal T(n) is 1. Thus, the function for signals applied to input circuit 0-Oper is:

$$0\text{-Oper} = T(n).[(\overline{\text{Mult.Div}}) + Wt(n)].cp$$

The signals provided by the start, timing, and operate flip-flops are shown by waveforms St,T(16) and Oper in Fig. 3a, where it is assumed that n=16. It will be noted that both the start signal St and timing flip-flop signal T(16) are 1 during digit time 16, start signal St having been turned "on" at some previous time. After signals St and T(16) are equal to 1, a clock pulse is applied to the 1 input circuit of the operate flip-flop and thus signal Oper becomes 1 at the beginning of Dt(17) time. During the operations of addition and subtraction, as illustrated, signal Oper remains 1 for seventeen digit time intervals until signal T(16) is again 1. At this time, a clock pulse is applied to the 0 input circuit of the operate flip-flop and signal Oper becomes 0. For the operations of multiplication and division, signal Oper is turned to 0 by $T(16).Wt(16).cp$ at the end of the 16th word.

Two counters are required to produce digit and word time control signals. In order to illustrate how these counters are operated, it is assumed that n=16 and that four flip-flops are utilized in each of the counters. The flip-flops in the digit time counter are designated as D1, D2, D4, and D8 and the flip-flops in the word time counter are designated as W1, W2, W4, and W8. Each flip-flop has a 1 and a 0 input circuit and produces complementary output signals, the usual notation being utilized. For example, flip-flop W8 has input circuits designated as 1W8 and 0W8 and produces output signals W8 and $\overline{W}^8$.

Clock pulses are applied to input circuits 1D1 and 0D1 of the first digit counter flip-flop after each digit time of operation except the 16th, the first clock pulse being applied after Dt(17) of the 0th word or at the beginning of Dt(1) time for the first word time of operation. Each of the digit counter flip-flops is set to 0 after the 16th digit time interval by a clock pulse. Thus, the signal input functions for the 1D1 and 0D1 input circuits of the first digit counter flip-flop are:

$$1D1 = \text{Oper}.\overline{T}(16).cp$$

$$0D1 = [\text{Oper}.\overline{T}(16) + T(16)].cp = [\overline{\text{Oper}} + T(16)].cp$$

Signal $T(16).cp$ is also applied to 0D2, 0D4, and 0D8.

Figure 4A:
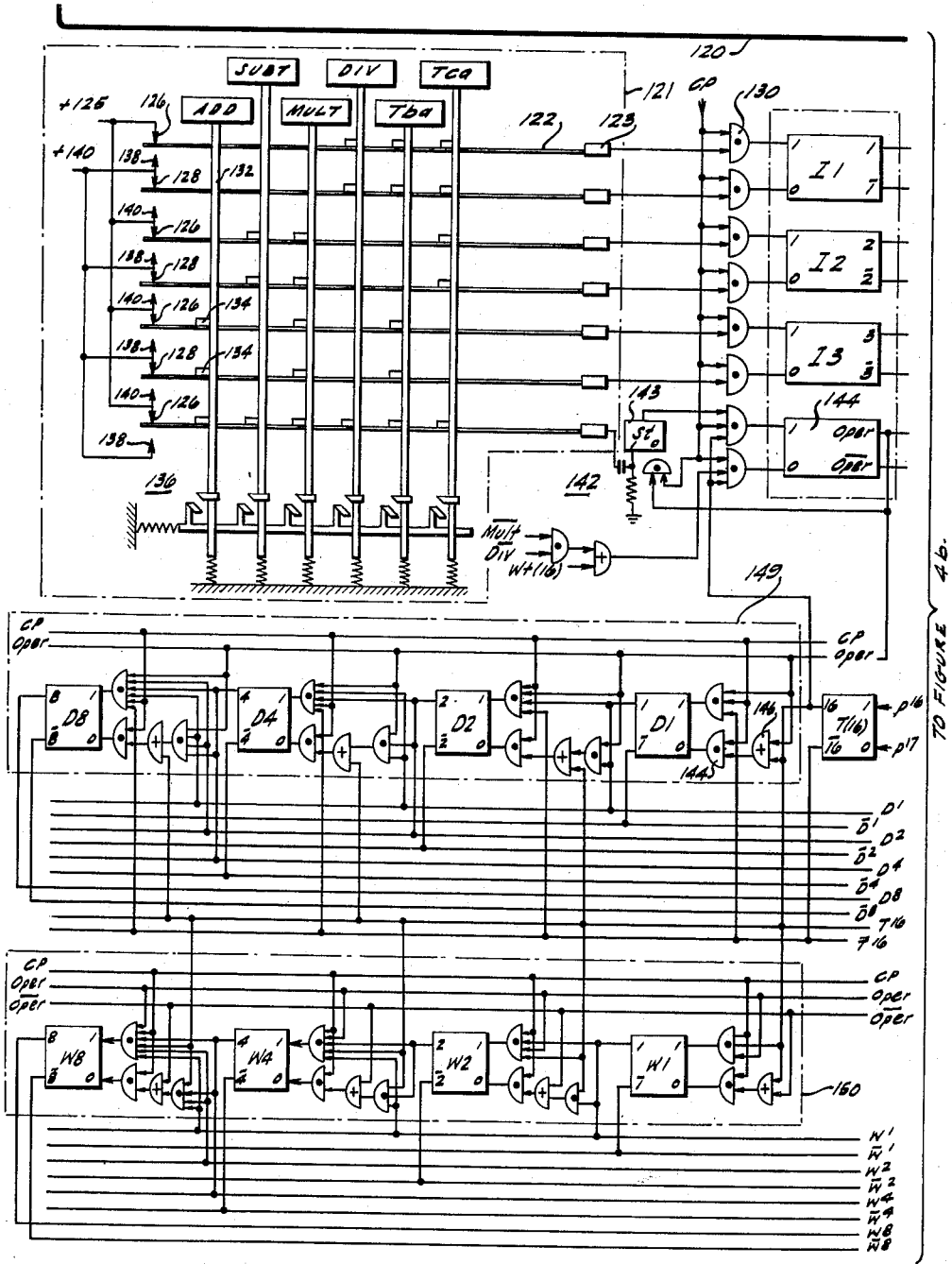
Figs. 4a and 4b are parts of the schematic diagram of one form of the control means shown in Fig. 2.

One type of counter suitable for use in the control circuitry is illustrated in Fig. 4a and is described in connection therewith. However, any of the well-known types of flip-flop counters is suitable.

Prior to the receipt of the first clock pulse, all of the flip-flops of the digit counter are set at 0. Since each clock pulse is applied to both input circuits of the first flip-flop of the digit counter, it is triggered at the beginning of each digit time of operation except the 17th. Assuming that the digit counter flip-flops are interconnected as a binary counter in the order D1, D2, D4, and D8, corresponding to first, second, third, and fourth binary places, respectively, then the digit time control functions appear as follows:

$$Dt(1) = D^1.\bar{D}^2.\bar{D}^4.\bar{D}^8$$
$$\overline{Dt}(1) = (\bar{D}^1 + D^2 + D^4 + D^8)$$
$$Dt(15) = D^1.D^2.D^4.\bar{D}^8$$
$$\overline{Dt}(15) = (\bar{D}^1 + \bar{D}^2 + \bar{D}^4 + D^8)$$

$$Dt(16,17) = \bar{D}^1.\bar{D}^2.\bar{D}^4.\bar{D}^8$$
$$\overline{Dt}(16,17) = (D^1 + D^2 + D^4 + D^8)$$
$$Dt(17) = Dt(16,17).\bar{T}(16)$$
$$\overline{Dt}(17) = (\overline{Dt}(16,17) + T(16))$$

Clock pulses are applied to input circuits 1W1 and 0W1 of the first word time counter flip-flop at the end of each word time, as signalled by $T(16) = 1$. Thus, each word time interval begins one digit time after $T(16) = 1$, or at $Dt(17)$. After the operation is completed, as signalled by Oper, all of the word counter flip-flops are reset to 0 by a clock pulse. The signal functions for the input circuits of the first word time counter flip-flop then are:

$$1W1 = \text{Oper}.T(16).cp$$
$$0W1 = \text{Oper}.T(16).cp + \overline{\text{Oper}}.cp = [T(16) + \overline{\text{Oper}}].cp$$

Signal $\overline{\text{Oper}}.cp$ is also applied to the input circuits 0W2, 0W4, and 0W8.

The first clock pulse is applied to the word time counter at the end of the first word time interval and consequently, during the first word time interval, the word time counter flip-flops remain set at 0. The word time control functions then are:

$$Wt(1) = \bar{W}^1.\bar{W}^2.\bar{W}^4.\bar{W}^8$$
$$\overline{Wt}(1) = (W^1 + W^2 + W^4 + W^8)$$
$$Wt(16) = W^1.W^2.W^4.W^8$$
$$\overline{Wt}(16) = (\bar{W}^1 + \bar{W}^2 + \bar{W}^4 + \bar{W}^8)$$

As has been explained above, the shift control signals are binary signals which are 1 for $[(n+1) - SL]$ digit time intervals. If $n = 16$, then for a shift to the left of sixteen positions, a signal which is 1 for only on digit time interval, is utilized. This may be any of the digit time signals above as, for example, $Dt(1)$. A signal which is 1 for a total of two digit time intervals during each word time interval may be obtained by including three of the digit time counter flip-flop signals in an "and" function, as for example, $D^1.D^2.D^4$. This signal is 1 for either $D^1.D^2.D^4.D^8$ or $D^1.D^2.D^4.\bar{D}^8$. A signal which is 1 during four digit time intervals may be obtained by utilizing two of the flip-flop signals in an "and" function as, for example, $D^1.D^2$; and a signal which is 1 during eight digit time intervals may be obtained by utilizing one flip-flop signal as, for example, $D^1$. A signal which is 1 for the other digit time intervals may be obtained by combining two or more of the above signals in an "or" function. For example, a signal which is 1 for five digit time intervals may be obtained by combining $D^1.D^2$ and $Dt(1)$ to form a signal $D^1.D^2 + Dt(1)$.

When a shifting operation is desired, it is necessary to include a seventh binary control signal which may be considered as signal Shift. Signal Shift then remains 1 for an interval determined by the number of shifts desired.

MECHANIZATION FUNCTIONS FOR THE SERIAL ARITHMETIC SYSTEM

It has been pointed out that each of the Boolean algebraic signal functions is generic to a class of mechanization functions. It has also been noted that the particular form of a signal function is immaterial since algebraic manipulation does not change the output signal or signal series of a logical gate. When a signal function is considered as a mechanization function, however, form is of the essence since each form determines a different mechanization. In this section, various factored forms of a generic signal function are considered with respect to the mechanization which is required for the function. In order to illustrate a specific case, it is assumed that $n = 16$.

Consider now the signal function:

(202) $aA = \overline{Dt}(15).Ar.(\text{Add} + \text{Subt} + \text{Mult}.Ds1 + \text{Div})$ This function may be rearranged into several different factored forms. For example:

(1) $aA = \overline{Dt}(15).Ar.\text{Add} + \overline{Dt}(15).Ar.\text{Subt}$
$\quad + \overline{Dt}(15).Ar.\text{Mult}.Ds1 + \overline{Dt}(15).Ar.\text{Div}$ (2) $aA = \overline{Dt}(15).Ar.\text{Mult}.Ds1$
$\quad + \overline{Dt}(15).Ar.(\text{Add} + \text{Subt} + \text{Div})$ Each of the above functions for the $aA$ input circuit requires a different mechanization and consequently will require a different arrangement of "and" and "or" circuits. If signal function (202) itself is mechanized, an output "and" circuit is required having signals $\overline{Dt}(15)$, $Ar$, and $(\text{Add} + \text{Subt} + \text{Mult}.Ds1 + \text{Div})$ applied to separate input terminals. The "or" function $(\text{Add} + \text{Subt} + \text{Mult}.Ds1 + \text{Div})$ is produced by an "or" circuit having signals Add, Subt, Mult.$Ds1$ and Div applied to separate input terminals, and the logical product Mult.$Ds1$ is produced by an "and" circuit having signals Mult and $Ds1$ applied to separate input terminals. The complete mechanization then requires a final "and" circuit having three input terminals, signals $Dt(15)$ and $Ar$ being applied to two of the input terminals and the third input terminal being connected to the output terminal of an "or" circuit having four input terminals. Signals Add, Subt, and Div are applied to three of the four input terminals of the "or" circuit and the fourth input terminal of the "or" circuit is connected to the output terminal of an "and" circuit having two input terminals. Signals Mult and $Ds1$ are applied to the two input terminals of the "and" circuit.

It can be seen that the above mechanization requires a total of nine terminals for the "and" and "or" circuits. The number of input terminals is an indication of the number of diodes or control grids (where electron discharge tubes are utilized) which are required for the logical circuits. It will be noted that signals Mult and $Ds1$ must be effective through three logical circuits, an input "and" circuit, an "or" circuit, and a final "and" circuit. Thus, this mechanization is considered as having three levels since certain signals must pass through three logical circuits.

The mechanization of examples (1), above, requires a final "or" circuit having signals $\overline{Dt}(15).Ar.\text{Add}$, $\overline{Dt}(15).Ar.\text{Subt}$, $\overline{Dt}(15).Ar.\text{Mult}.Ds1$, and $\overline{Dt}(15).Ar.\text{Div}$ applied to separate input terminals and four "and" circuits, one having signals $\overline{Dt}(15)$, $Ar$, and Add applied to separate input terminals, a second "and" circuit having signals $\overline{Dt}(15)$, $Ar$, and Subt applied to separate input terminals, a third "and" circuit having signals $\overline{Dt}(15)$, $Ar$, Mult, and $Ds1$ applied to separate input terminals, and a fourth "and" circuit having signals $\overline{Dt}(15)$, $Ar$, and Div applied to separate input terminals.

This mechanization, it will be observed, requires four input terminals for the final "or" circuit and thirteen input terminals for the "and" circuits or a total of seventeen input terminals. In this mechanization, however, no signal passes through more than two levels.

The mechanization of example (2) above requires a final "or" circuit having a signal $Dt(15).Ar.\text{Mult}.Ds1$ applied to one input terminal and a signal $Dt(15).Ar.(\text{Add} + \text{Subt} + \text{Div})$ applied to the other input terminal. Signal $Dt(15).Ar.\text{Mult}.Ds1$ is produced by an "and" gate having signals $Dt(15)$, $Ar$, Mult, and $Ds1$ applied to separate input terminals and signal $Dt(15).Ar.(\text{Add} + \text{Subt} + \text{Div})$ is produced by an input "and" circuit having signals $Dt(15)$, $Ar$, $(\text{Add} + \text{Subt} + \text{Div})$ applied to separate input terminals. Signal $(\text{Add} + \text{Subt} + \text{Div})$ is produced by an input "or" circuit having signals Add, Subt, and Div applied to separate input terminals. It can be seen that this mechanization requires twelve input terminals and three levels.

As a general rule, logical circuits which are mechanized according to the factored form of the signal function will require fewer diodes or control grids, but will have more levels. As will be explained in more detail below, more power is generally required to drive a greater number of levels. Briefly, some of the factors involved are: the requirement of lower load impedances for lower-level logical circuits, the requirement of higher voltages to compensate for the signal attenuation which results when a signal must pass through several levels, and the requirement of a lower output impedance to compensate for the increase in RC time constant due to the increased impedance of cascaded levels.

After considering the relative merits of several mechanization forms with respect to circuit economy and power requirement, certain mechanization functions are selected and the logical "and" and "or" circuits are then mechanized. A specific mechanization is illustrated in Figs. 4a, 4b, 5a, 5b, and 5c. The functions selected for this mechanization are, for the most part, unfactored. The reason for this is that the particular mechanization has been designed with power minimization as the primary consideration. It should be noted, however, that the principles of the present invention are in no way limited to the specific mechanization illustrated. For some applications, it may be preferable to mechanize a factored form of the generic signal function which requires a minimum of diodes or control grids, regardless of the power requirement.

Where minimum power is of the essence, it is frequently useful to separate the mechanization function into two or more "or" functions. The reason that this mechanization technique results in reduced power requirement is explained more fully below where the design of specific "and" and "or" circuits is considered. The mechanization function, in this case, will have parentheses or brackets around the separate "or" functions. Thus, the signal function for the input to the C register is mechanized as:

(223)  $inCr = [\text{Mult}.Cr + \overline{\text{Mult}}.\overline{\text{Div}}.Cd1 + \text{Div}.Cd2]$
$+ [Dt(1).\text{Div}.Wt(1).Ds1.\bar{S}$
$+ Dt(1).\text{Div}.Wt(1).\overline{Ds1}.S$
$+ Dt(1).\text{Div}.\overline{Wt(1)}.Ds1.Ds2$
$+ Dt(1).\text{Div}.\overline{Wt(1)}.\overline{Ds1}.\overline{Ds2}]$ Instead of a final "or" circuit with four input terminals, a final "or" circuit with two input terminals is utilized. Signal $[\text{Mult}.Cr + \overline{\text{Mult}}.\overline{\text{Div}}.Cd1 + \text{Div}.Cd2]$ is applied to one of the input terminals of the final "or" circuit and signal $[Dt(1).\text{Div}.Wt(1).Ds1.\bar{S} + Dt(1).\text{Div}.Wt(1).\overline{Ds1}.S$
$+ Dt(1).\text{Div}.\overline{Wt(1)}.Ds1.Ds2$
$+ Dt(1).\text{Div}.\overline{Wt(1)}.\overline{Ds1}.\overline{Ds2}]$ is applied to the other input terminal of the final "or" circuit. Each of these signals, then, is produced by a separate "or" circuit, one having three input terminals and the other having four input terminals.

Before considering the details of the mechanization of the embodiment shown in Figs. 4a, 4b, 5a, 5b, and 5c, it is convenient to list the mechanized functions which are utilized:

FIRST SET OF EQUATIONS FOR CONTROL $\text{Add} = \bar{I}^1.I^2.\text{Oper}$    $\overline{\text{Add}} = (I^1 + \bar{I}^2 + \overline{\text{Or er}})$
$\text{Subt} = \bar{I}^1.\bar{I}^3.\text{Oper}$    $\overline{\text{Subt}} = (I^1 + I^3 + \overline{\text{Or er}})$
$\text{Mult} = I^2.I^3.\text{Oper}$    $\overline{\text{Mult}} = (\bar{I}^2 + \bar{I}^3 + \overline{\text{Oper}})$
$\text{Div} = \bar{I}^2.\bar{I}^3.\text{Oper}$    $\overline{\text{Div}} = (I^2 + I^3 + \overline{\text{Or er}})$
$Tba = I^1.\bar{I}^3.\text{Oper}$    $\overline{Tba} = (\bar{I}^1 + I^3 + \overline{\text{Or er}})$
$Tca = I^1.I^2.\text{Oper}$    $\overline{Tca} = (\bar{I}^1 + \bar{I}^2 + \overline{\text{Oper}})$ $\begin{cases} 1\text{-Oper} = St.T(n).cp \\ 0\text{-Oper} = T(n).(\overline{\text{Mult}}.\overline{\text{Div}}) + Wt(n).cp \end{cases}$ $\begin{cases} 1St = \text{Start Signal by Operator} \\ 0St = \overline{\text{Oper}}.cp \end{cases}$ $Dt(1) = D^1.\bar{D}^2.\bar{D}^4.\bar{D}^8$
$\overline{Dt(1)} = (\bar{D}^1 + D^2 + D^4 + D^8)$ $Dt(15) = \bar{D}^1.D^2.D^4.D^8$
$\overline{Dt(15)} = (\bar{D}^1 + \bar{D}^2 + \bar{D}^4 + \bar{D}^8)$
$Dt(16,17) = \bar{D}^1.\bar{D}^2.\bar{D}^4.\bar{D}^8$
$\overline{Dt(16,17)} = (D^1 + D^2 + D^4 + D^8)$
$Dt(17) = Dt(16,17).\overline{T(16)}$
$\overline{Dt(17)} = (\overline{Dt(16,17)} + T(16))$
$Wt(1) = \bar{W}^1.\bar{W}^2.\bar{W}^4.\bar{W}^8$
$\overline{Wt(1)} = (W^1 + W^2 + W^4 + W^8)$
$Wt(16) = W^1.W^2.W^4.W^8$
$\overline{Wt(16)} = (\bar{W}^1 + \bar{W}^2 + \bar{W}^4 + \bar{W}^8)$

SECOND SET OF EQUATIONS FOR LOGICAL NETWORK 200

(202)   $aA = \overline{Dt(15)}.Ar.\text{Add} + \overline{Dt(15)}.Ar.\text{Subt} +$
$\overline{Dt(15)}.Ar.\text{Mult}.Ds1 + \overline{Dt(15)}.Ar.\text{Div}$ (206)   $bA = \text{Div}.Bd2 + \overline{\text{Div}}.\overline{Tba}.Br + Tba.\overline{Dt(15)}.Br$ (207)   $\begin{cases} 1S = \overline{\text{Oper}}.Ar_{16} + Tba.Ds1 + \text{Div}.Dt(1).\overline{Ds1} \\ 0S = \overline{\text{Oper}}.\overline{Ar_{16}} + Tba.\overline{Ds1} + \text{Div}.Dt(1).Ds1 + \\ \quad \text{Subt}.Dt(17) + \text{Mult}.Wt(1).Dt(17).Cr_{16} \end{cases}$ Adder-Sub-tracter
$\begin{cases} A_0 a_j.\bar{b}_j.\bar{c}_{j-1} + \bar{a}_j.b_j.\bar{c}_{j-1} + \bar{a}_j.\bar{b}_j.c_{j-1} + a_j.b_j.c_{j-1} \\ c_j \pm = [Tba.S.b_j.\overline{Dt(16,17)} + Tba.S.c_{j-1}.\overline{Dt(16,17)} + \\ \quad S.\bar{b}_j.c_{j-1}.\overline{Dt(16,17)}] + [\overline{Tba}.\bar{S}.a_j.b_j.\overline{Dt(16,17)} + \\ \quad \overline{Tba}.\bar{S}.a_j.\bar{b}_j.\overline{Dt(16,17)} + \overline{Tba}.a_j.c_{j-1}.\overline{Dt(16,17)} + \\ \quad \bar{S}.b_j.c_{j-1}.\overline{Dt(16,17)}] \end{cases}$ (209)   $inAr = Tca.Cd1 + Tba.A_0 + \overline{Tba}.\overline{Tca}.Ad1$ (210)   $\begin{cases} 1Ad1 = Ar \\ 0Ad1 = \overline{Ar} \end{cases}$ (212)   $inBd1 = \overline{Tba}.\overline{\text{Mult}}.\overline{\text{Div}}.A_0 + \overline{Tba}.\overline{\text{Mult}}.\overline{Wt(16)}.A_0 +$
$\overline{Tba}.\text{Div}.Wt(16).A_0 + \text{Mult}.\overline{Wt(16)}.c_{j-1} +$
$\text{Mult}.\overline{Wt(16)}.Bd1$ (214)   $inBr = \overline{Wt(16)}.\overline{Dt(17)}.\text{Mult}.A_0 + Bd1.\overline{\text{Mult}} +$
$Bd1.Dt(17).\bar{S} + Bd1.Wt(16).Dt(17)$ (215)   $\begin{cases} 1Bd2 = \text{Div}.Br \\ 0Bd2 = \text{Div}.\overline{Br} \end{cases}$ (223)   $inCr = [\text{Mult}.Cr + \overline{\text{Mult}}.\overline{\text{Div}}.Cd1 + \text{Div}.Cd2] +$
$[Dt(1).\text{Div}.Wt(1).Ds1.\bar{S} + Dt(1).\text{Div}.Wt(1).\overline{Ds1}.S +$
$Dt(1).\text{Div}.\overline{Wt(1)}.Ds1.Ds2 + Dt(1).\text{Div}.\overline{Wt(1)}.\overline{Ds1}.\overline{Ds2}]$ (227)   $\begin{cases} 1Cd1 = Cr \\ 0Cd1 = \overline{Cr} \end{cases}$ (229)   $\begin{cases} 1Cd2 = Cd1 \\ 0Cd2 = \overline{Cd1} \end{cases}$ (239)   $\begin{cases} 1Ds1 = Dt(17).\overline{\text{Mult}}.Bd1 + Dt(17).\text{Mult}.\overline{Wt(16)}.Cr \\ 0Ds1 = Dt(17).\overline{\text{Mult}}.\overline{Bd1} + Dt(17).\text{Mult}.\overline{Cr} + \\ \quad \overline{Dt(17)}.\text{Mult}.\overline{Wt(16)}. \end{cases}$ (241)   $\begin{cases} 1Ds2 = \text{Div}.Wt(1).Ds1 \\ 0Ds2 = \text{Div}.Wt(1).\overline{Ds1} \end{cases}$ A specific mechanization of the control signal functions discussed previously is illustrated in Figs. 4a and 4b. The flip-flops which are utilized are given the same designation as in the above discussion. For example, instruction storage flip-flop I1 has 1 and 0 input circuits and produces complementary output signals $I^1$ and $\bar{I}^1$. A digit counter 149 and a word counter 150 are utilized to count digit time and word time intervals, respectively. These are binary counters of the type shown and described in copending application for patent entitled "High-Speed Flip-Flop Counter," by Eldred C. Nelson, Serial No. 245,860, filed September 10, 1951. The flip-flops of these counters are represented by the notation which is utilized above. Thus, D1, the first flip-flop in digit interval counter 149, has 1 and 0 input circuits and produces complementary output signals $D^1$ and $\bar{D}^1$.

Each flip-flop in the counters shown in Fig. 4a receives a triggering pulse when all of the flip-flops in the preceding places register 1. Thus, flip-flops D8, D4, and D2 are triggered when flip-flops D4, D2, and D1 each register 1. The flip-flops are triggered simultaneously at the beginning of the digit time interval after $$D^4 = D^2 = D^1 = 1$$

It can be seen, therefore, that this type of counter is preferred for high-speed operation since cascaded carries are eliminated and the change from a count of 7 (0111) to 8 (1000) occurs very rapidly. As has been explained above, the digit counter is set to 0 after $T(16)=1$, and the word counter is set to 0 after signal $\overline{\text{Oper}}=1$. The signal functions for the digit and word counters are:

(140) DIGIT COUNTER $$\begin{cases} 1D1 = \text{Oper}.\overline{T(16)}.cp \\ 0D1 = [\overline{\text{Oper}} + T(16)].cp \end{cases}$$

$$\begin{cases} 1D2 = \text{Oper}.\overline{T(16)}.D^1.cp \\ 0D2 = [\overline{\text{Oper}}.\overline{D^1} + T(16)].cp \end{cases}$$

$$\begin{cases} 1D4 = \text{Oper}.\overline{T(16)}.D^1.D^t.cp \\ 0D4 = [\overline{\text{Oper}}.\overline{D^1.D^t} + T(16)].cp \end{cases}$$

$$\begin{cases} 1D8 = \text{Oper}.\overline{T(16)}.D^1.D^2.D^4.cp \\ 0D8 = [\overline{\text{Oper}}.\overline{D^1.D^2.D^4} + T(16)].cp \end{cases}$$

(150) WORD COUNTER $$\begin{cases} 1W1 = \text{Oper}.T(16).cp \\ 0W1 = [T(16) + \overline{\text{Oper}}].cp \end{cases}$$

$$\begin{cases} 1W2 = \text{Oper}.T(16).W^1.cp \\ 0W2 = [T(16).\overline{W^1} + \overline{\text{Oper}}].cp \end{cases}$$

$$\begin{cases} 1W4 = \text{Oper}.T(16).W^1.W^2.cp \\ 0W4 = [T(16).\overline{W^1.W^2} + \overline{\text{Oper}}].cp \end{cases}$$

$$\begin{cases} 1W8 = \text{Oper}.T(16).W^1.W^2.W^4.cp \\ 0W8 = [T(16).\overline{W^1.W^2.W^4} + \overline{\text{Oper}}].cp \end{cases}$$

In some applications of the computer, it may be desirable to shift a preliminary count into the digit and word counters. In this case, it is necessary to include shift gating in the counters. The mechanization required for shifting is explained in detail in connection with the A register shown in Fig. 5a.

Entry means 121 is provided for entering instruction signals into instruction storage flip-flops I1, I2, and I3. While any type of entry may be utilized, a keyboard entry is illustrated for simplicity. It should be understood, however, that for many applications, it may be desirable to shift the instruction code into the instruction storage flip-flops serially rather than in parallel as shown in Fig. 4a. Thus, instead of the parallel entry keyboard shown in Fig. 4a, entry means 121 may include a magnetic drum having the instruction signals stored thereon as serial digits. In this case, the instruction storage flip-flops are interconnected as a shifting register of the type described above. Entry is then made by shifting the instruction signals into the first flip-flop of the shifting register.

The keyboard entry structure includes a conductor spring arm 122 for each input circuit of the instruction flip-flops and one for the 1 input circuit of a start flip-flop 143. Each conductor spring arm is connected to an anchor 123 which, in turn, is coupled to the associated input circuit. Normally, the conductor spring arms which are coupled to the 1 input circuits of flip-flops I1, I2, I3, and 143 touch contacts 126 which, in turn, are connected to a +125-volt direct-current potential source, not shown, while the conductor spring arms coupled to the 0 input circuits of the instruction flip-flops touch contacts 128 which are connected to a +140-volt direct-current potential source, not shown.

The input circuits of the instruction flip-flops are coupled to the corresponding anchor in the keyboard entry through "and" circuits 130. Clock pulses are continuously applied to one input terminal of each of "and" circuits 130. The clock pulse is a negative-going signal which changes from 140 volts to 125 volts and is applied to a flip-flop input circuit through an "and" circuit only when the voltage applied to the other input terminal of the "and" circuit is 140 volts. Thus, prior to the entry of an instruction, clock pulses pass through "and" circuits 130 to the 0 input circuits of the instruction flip-flops, setting them to 0.

A push rod 132 is provided for each instruction to be entered. Each push rod has lugs 134 positioned adjacent to certain conductor spring arms 122 in accordance with the instruction code. For example, the lugs connected to the Add push rod are positioned adjacent to the conductor spring arms which are connected to the 1 and 0 input circuits of instruction flip-flop I3. When the Add push rod is depressed, the conductor spring arms coupled to the 1 and 0 input circuits of flip-flop I3 are moved to a lower position where they touch contacts 138 and 140 connected to the 140 and 125 volt potential sources, respectively. Thus, the voltages which are applied to the input circuits of flip-flop I3 are reversed so that 140 volts is applied to the 1 input circuit of I3 through contact 138 and 125 volts is applied to the 0 input circuit of flip-flop I3 through contact 140. The next clock pulse which passes through the "and" circuit connected to the 1 and 0 input circuits of flip-flop I3 causes this flip-flop to register a 1. Flip-flops I1 and I2, however, continue to register "0's." The signal function $\overline{I^1}.\overline{I^2}.I^3$, corresponding to the instruction Add, becomes 1 since $\overline{I^1} = \overline{I^2} = I^3 = 1$.

After any push rod has been depressed, it is held in its position by latch 136. Each push rod has a lug positioned adjacent to the conductor spring arm which is coupled to the start flip-flop so that when any of the push rods is depressed, a pulse is applied through differentiating circuit 142 to the 1 input circuit of the start flip-flop 143. Start flip-flop 143, thus, is caused to register a 1. As soon as timing flip-flop T(16) is caused to register 1, when pulse $p^{16}$ is applied to its 1 input circuit, the "and" conditions for applying a clock pulse to the 1 input circuit of operate flip-flop 144 are satisfied, and operate flip-flop 144 is turned to 1. One digit time after the operate flip-flop is turned to 1, a clock pulse is applied to the 0 input circuit of start flip-flop 143 turning it to 0.

When pulse $p^{17}$ is applied to the 0 input circuit of T(16), it is set to 0 and clock pulses then are applied to the 1 and 0 input circuits of flip-flop D1 triggering it at the beginning of each digit time interval. The digit and word time counters then begin their counting operation, as explained above.

Figure 4B:
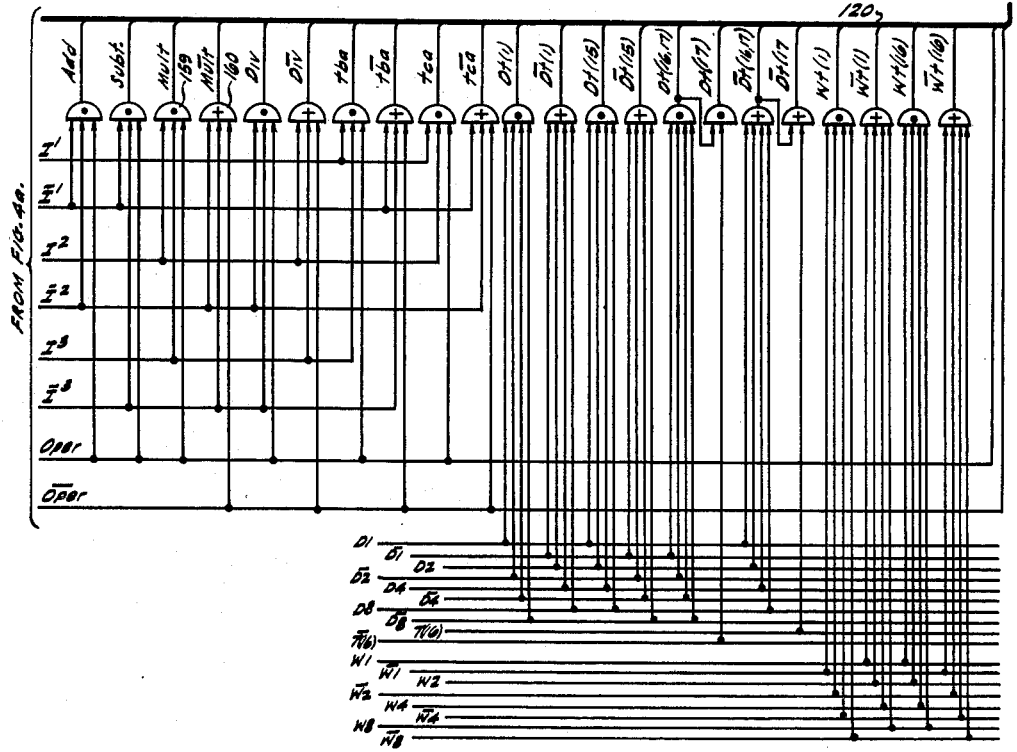

The complementary binary control signals and the complementary timing signals are produced in the logical circuitry shown in Fig. 4b. Each "and" and "or" circuit is mechanized in accordance with one of the control signal functions. For example, binary control signal Mult is provided by "and" circuit 159 having three input terminals connected, respectively, to lead $\overline{I^2}$, lead $I^3$, and lead Oper. "Or" circuit 160, producing complementary time instruction signal $\overline{Di(1)}$, has four input terminals connected, respectively, to leads $\overline{D^1}$, $D^2$, $D^4$, and $D^8$. The mechanization of the other "and" and "or" circuits should be apparent from these examples.

The complementary control signals and the complementary timing signals are carried via cable 120 to the logical gates in logical network 200. Each of the leads in cable 120 is designated by the signal it carries so that the mechanization of each logical gate may be interpreted directly from the functions listed above.

The structure of logical network 200 is divided into three parts for convenience of illustration. Fig. 5a shows the part of logical network 200 which is associated most directly with the A register. Thus, logical gates 209 and 210 and delay means 211 illustrating the A register circulation circuitry, logical gate 202, providing the coupling between the A register and adder-subtracter 204, and logical gate 207 storing the A register sign digit, are shown.

Fig. 5b illustrating the B register and associated circuitry shows the detailed circuitry of adder-subtracter unit 204 and that of logical gates 206, 212, 214, and 215.

Finally, Fig. 5c shows the C register and associated circuitry, including the specific circuitry illustrating logical gates 223, 227, 229, 239, and 241.

Each logical gate in Figs. 5a, 5b, and 5c is given the equation number of its mechanization function. Since the mechanization of the logical gates should be apparent after a few examples, only the more difficult mechanizations will be analyzed. Consider, for example, logical gate 202 in Fig. 5a, mechanized according to Equation 202 above. The mechanization includes four "and" circuits and a final "or" circuit. Signals $\overline{Dt(15)}$, $Ar$, and $Add$ are applied to separate input terminals of first "and" circuit 202-1; signals $\overline{Dt(15)}$, $Ar$, and $Subt$ are applied to separate input terminals of second "and" circuit 202-2; signals $\overline{Dt(15)}$, $Ar$, $Mult$, and $Ds1$ are applied to separate input terminals of third "and" circuit 202-3; and signals $\overline{Dt(15)}$, $Ar$, and $Div$ are applied to separate input terminals of fourth "and" circuit 202-4. The output terminal of each of the "and" circuits is connected to the input terminal of final "or" circuit 202-5. The output terminal of "or" circuit 202-5 is connected to the $aA$ input circuit of the adder-subtracter unit 204.

Logical gate 223, shown in Fig. 5c, provides the signal function for the C register input circuit and is mechanized as follows. The mechanization function is separated into two groups of "and" functions, each of which is combined into an "or" function, as indicated by the brackets in Equation 223. The first group includes "and" functions $Mult.Cr$, $\overline{Mult}.\overline{Div}.Cd1$, and $\overline{Div}.Cd2$, each of which is produced by an "and" circuit, the output of each "and" circuit being applied to a separate input terminal of a first "or" circuit 223-1. The second group includes "and" functions $$Dt(1).Div.\overline{Wt}(1).Ds1.\overline{S},\ Dt(1).Div.\overline{Wt}(1).\overline{Ds1}.S$$
$$Dt(1).Div.\overline{Wt}(1).Ds1.Ds2,\ \text{and}$$
$$Dt(1).Div.\overline{Wt}(1).\overline{Ds1}.\overline{Ds2}$$

each of which is produced by an "and" circuit having its output terminal connected to a separate input terminal of a second "or" circuit 223-2. The output terminals of the first and second "or" circuits are connected to the input terminals of a final "or" circuit 223-3 which has its output terminal connected to the input circuit of the C register.

It will be noted that the input circuits $aA$, $bA$, $inAr$, $inBd1$, $inBr$, and $inCr$ each include a complementer circuit Com, as shown in the A register, which may be of the type shown in Fig. 8 and described in connection therewith. The complementer circuit is required wherever the input circuit includes a flip-flop having 1 and 0 input circuits and where the signal function for the 0 input circuit of the flip-flop is complementary to the signal function for the 1 input circuit. If the complementer circuit is not used, it would be necessary to provide an extra logical gate for generating the complementary signal function. For example, if the $aA$ input circuit of the adder-subtracter unit had $1aA$ and $0aA$ input circuits instead of a complementer circuit, the signal functions would appear as:

$$(202)\begin{cases} 1aA = \overline{Dt(15)}.Ar.Add + \overline{Dt(15)}.Ar.Subt + \\ \quad \overline{Dt(15)}.Ar.Mult.Ds1 + \overline{Dt(15)}.Ar.Div \\ 0aA = [Dt(15) + \overline{Ar} + \overline{Add}].[Dt(15) + \overline{Ar} + \overline{Subt}]. \\ \quad [Dt(15) + \overline{Ar} + \overline{Mult} + \overline{Ds1}].[Dt(15) + \overline{Ar} + \overline{Div}] \end{cases}$$

The A register shown in Fig. 5a illustrates a suitable type of flip-flop shifting register. A flip-flop is provided for each of the binary digits to be stored. Flip-flop $Af(j)$ stores the $j$th binary digit and produces corresponding signals $Af^j$ and $\overline{f}^j$. Prior to operation, as signalled by $\overline{Oper}$, entry is made into the A register flip-flops by means of switches $Ar(j)$. Switches $Ar(j)$ produce complementary signals $Ar_j$ and $\overline{Ar_j}$ corresponding to the binary digits to be entered. These signals are carried on leads $Ar_j$ and $\overline{Ar_j}$, respectively. When a switch $Ar(j)$ is in its upper or "0" position, signal $Ar_j$ is 125 volts and signal $\overline{Ar_j}$ is 140 volts, whereas when a switch is depressed, signal $Ar_j$ becomes 140 volts and signal $\overline{Ar_j}$ becomes 125 volts. Signals $Ar_j$ and $\overline{Ar_j}$ are applied through a logical gate $250(j)$ to the 1 and 0 input circuits, respectively, of a flip-flop $Af(j)$. When signal $Ar_j$ equals 140 volts, a clock pulse is applied through logical gate $250(j)$ to the 1 input circuit of flip-flop $Af(j)$. When signal $Ar_j$ is 125 volts and $\overline{Ar_j}$ is 140 volts, a clock pulse is applied through logical gate $250(j)$ to the 0 input circuit of flip-flop $Af(j)$.

When operation begins, as signalled by $Oper=1$, the A register is shifted to the right. Signal $Af^{(j+1)}$ produced by flip-flop $Af(j+1)$ is applied to the 1 input circuit of flip-flop $Af(j)$ and signal $\overline{Af^{(j+1)}}$ is applied to the 0 input circuit of flip-flop $Af(j)$. The shifting and entry signal functions for the A register, then, are:

$$250(j)\begin{cases} 1Af(j) = \overline{Oper}.Ar_j + Oper.Af^{(j+1)} \\ 0Af(j) = \overline{Oper}.\overline{Ar_j} + Oper.\overline{Af^{(j+1)}} \end{cases}$$

The A and C register sign digit signals $Ar_{16}$, $\overline{Ar_{16}}$ and $Cr_{16}$, $\overline{Cr_{16}}$ are produced in the same manner by switches $Ar(16)$ and $Cr(16)$. These signals are utilized in logical gate 207 for entry into the sign storage device 208.

Since the C register is utilized to store the quotient after division, it is necessary to prevent re-entry of the switch-input signals at the end of division, as signalled by $\overline{Oper}$. This may be done by replacing signal $\overline{Oper}$ with signal $\overline{Oper}.St$. Signal $\overline{Oper}.St$ has a value of 1 only before operation and not after operation. Thus, the switch entry functions for the C register are:

$$255(j)\begin{cases} 1Cf(j) = \overline{Oper}.St.Cr_j + Oper.Cf^{(j+1)} \\ 0Cf(j) = \overline{Oper}.St.\overline{Cr_j} + Oper.\overline{Cf^{(j+1)}} \end{cases}$$

where the A register signals in function $250(j)$ above have been replaced with corresponding C register signals.

It should be understood that the switch entry described is illustrative of only one type of entry which is suitable. For many operations, it may be desirable to shift the numbers into the registers serially starting with the least significant digit. This is done by applying the serial signals to the register input circuit and by shifting the signals to the right after they are applied.

CONSIDERATION OF SPECIFIC CIRCUIT ELEMENTS

A flip-flop is shown in Fig. 6 which may be utilized as either a two-stable-state digit storage device or as a delay device. The 1 and 0 input circuits of the flip-flop are coupled, respectively, to the control grids of a first electron discharge tube 307 and a second electron discharge tube 308.

The 1 and 0 input circuits of the flip-flop include capacitors 301 and 302, load resistors 303 and 304, and diodes 305 and 306, respectively. Diodes 305 and 306 are coupled to the control grids of tubes 307 and 308, respectively, and are biased such that only negative signals may pass to the control grids. The complementary output signals of the flip-flops, $f$ and $\overline{f}$, are derived, respectively, from a first and a second resistor network 309 and 310. The signal $f$ is derived from point 311 in the first resistor network, and signal $\overline{f}$ is derived from point 312 in the second resistor network. The anodes of tubes 307 and 308 are connected, respectively, to the first and second resistor networks. A B+ potential is applied to junction 314 of the first and second resistor networks.

When a negative signal is applied to the 1 input circuit of the flip-flop, a negative signal passes to the grid of tube 307 through diode 305 and tube 307 becomes nonconducting. Due to the well-known action of the cross-coupling circuits of the flip-flop, tube 308 then becomes conducting. As a result, the anode voltage of tube 307 rises toward B+, whereas the anode voltage of tube 308 becomes more negative. Output signals $f$ and $\bar{f}$ are clamped, respectively, at 140 and 125 volts by clamping diode network 313. These voltages of 140 and 125 volts are assumed to represent the binary values of 1 and 0, respectively.

When a negative signal is applied to the 0 input circuit of the flip-flop, tube 308 becomes nonconducting and tube 307 becomes conducting. In this situation, the output signals are complemented with respect to the above values. Signals $f$ and $\bar{f}$ are clamped at 125 and 140 volts, representing 0 and 1, respectively.

When negative signals are applied to both input circuits, the flip-flop is "triggered," that is, it is changed from one stable state to another, and the output signals are complemented.

Diode "and" and "or" circuits are illustrated in Figs. 7a and 7b, respectively. In the "and" circuit, a positive potential, such as 265 volts, is applied to the anodes of three diodes 316, 317, and 318 through a gate resistor 315. Input signals, having either one or two voltage levels representing binary 1 or 0, are applied to the input terminals 319, 320, and 321 which are connected, respectively, to the cathodes of diodes 316, 317, and 318. It is assumed that 140 and 125 volts are utilized, respectively, to represent binary 1 and 0.

When the signals applied to all of the input terminals are at 140 volts or the "1" level, the output signal of the "and" circuit is approximately 140 volts. Thus, the application of a 1 representing signal level at each of the signal terminals produces a 1 output signal. However, if any of the input signals is at the 125 volt level representing 0, then the output signal of the "and" circuit falls to approximately 125 volts indicating that the "and" condition of the circuit is not satisfied.

In the "or" circuit of Fig. 7b, the cathode of each of diodes 323, 324, and 325 is coupled through a gate resistor 322 to ground. The input terminals 326, 327, and 328 of the "or" circuit are connected to diodes 323, 324, and 325, respectively. Assuming again that 140 and 125 volts represent, respectively, 1 and 0, it will be noted that if 140 volts is applied to any of the input terminals of the "or" circuit, the output signal becomes 140 volts or 1. Thus, the "or" circuit produces an output 1 signal when a 1 signal is applied to any one of its input terminals.

If the "and" circuit shown in Fig. 7a is the final "and" circuit of a logical network and has its output terminal coupled to the input circuit of a flip-flop, then a clock pulse signal is applied to one of its input terminals, for example, input terminal 319. The clock pulse is assumed to be a negative-going signal which is initially at 140 volts and decreases to 125 volts. If the signal applied to input terminal 320 is 125 volts representing 0, then the application of clock pulse signal to terminal 319 will have no effect since there will be no change in the level of the output signal. However, if prior to the application of a clock pulse, the final "and" circuit signal level is 140 volts, then, when the clock pulse is applied, the output signal level will change rapidly from 140 volts to 125 volts and a negative signal will be applied to the flip-flop input circuit to which the output circuit of the final "and" circuit is connected.

When the final logical circuit is an "or" circuit, special circuitry must be provided in order to introduce the clock pulse. In this case, the final "or" circuit provides both "and" and "or" logic. If signals $a$ and $b$ are applied to two input terminals of the final "or" circuit and the clock pulse is applied to a third input terminal of the final "or" circuit, then the logic appears as $cp.(a+b)$. Since this expression involves both "and" and "or" logic, it has been represented in Figs. 5a, 5b, 5c, and 5d as an "and" circuit having a clock pulse signal and signal $(a+b)$ applied to separate input terminals, and an "or" circuit for producing signal $(a+b)$ having signals $a$ and $b$ applied to separate input terminals.

In practical applications, it is possible to combine the "and" and "or" logic into one circuit. Where all of the input signals for the final "or" circuit are produced by lower level "and" circuits, the combined clock pulse and final "or" circuit is as shown in Fig. 7c. It will be noted that diodes 331 and 332 and gate resistor 329 in Fig. 7c are connected in the same manner as the "or" circuit of Fig. 7b. Diode 330, however, is reversed, and the negative-going clock pulse is applied to its cathode. The circuit shown in Fig. 7c produces a negative-going signal which is applied to the input terminal of a flip-flop when a 1 or a 140 volt signal is applied to one or more of the other input terminals.

When one or more of the input terminals of the combined clock pulse and final "or" circuit is connected to the output circuit of a lower level "or" circuit, then a circuit of the type shown in Fig. 7d is utilized. In this case, an additional gate resistor 336 and isolating diode 337 are added to the "or" circuit shown in Fig. 7b. The clock pulse again is applied through a diode 338. The operation of the circuit is the same as the combined clock pulse and "or" circuit, shown in Fig. 7c, no negative signal being produced unless a 140 volt signal is applied to one of the input terminals 339 or 340. A more specific description of the clock pulse circuits shown in Figures 7c and 7d is found in copending U.S. patent application Serial No. 305,955 filed August 23, 1952 for "Electronic Gates" by E. C. Nelson, and now abandoned. This copending application has been assigned of record to the same assignee as the present application.

It is desirable that the gating resistors have as large a resistance as is permissible in order to minimize the amount of power dissipation in the network. The maximum value of resistance permissible is determined by the amount of current which may be drawn through the gate resistor. If the gate resistor of an "and" circuit is too large for the amount of current which is drawn through it, then the output signal representing 1 will be too small. If too large a gate resistor is utilized in an "or" circuit, then an output signal representing 0 will be at too high a level. Thus, if 140 volts is desired at the output of an "and" circuit and the gate resistor is too large, this signal may appear as 135 volts, and if 125 volts is desired at the output of an "or" circuit and the gate resistor is too large, this signal may appear as 130 volts. From this example, it can be seen that an error of 5 volts in the 1 and 0 representing signals reduces the difference between these signals from 15 volts to 5 volts, and consequently, it becomes difficult to distinguish between the 1 and 0 representing signals.

The resistance of the gate resistor of the final "and" circuit or final combined clock pulse and "or" circuit is determined first. The maximum current which this resistor must carry is that current which is required to charge or discharge an associated flip-flop input capacitor through a voltage difference of 15 volts, corresponding to a change from a 1 representing signal level of 140 volts to a 0 representing signal level of 125 volts or vice versa. The amount of current required is estimated to be the average current to develop a charge within a specified time, the time being determined by an amount of time allowed for changing the signal level from 1 to 0 or 0 to 1. In general, this time must be less than the time between clock pulses.

In one embodiment of the present invention, it was found that a final gate resistor of 1.5 megohms was suitable for charging a flip-flop input capacitor of 25 microfarads and a shunt capacitance of 25 micromicrofarads in less than 6 microseconds after the termination of a clock pulse.

After selecting the final gate resistor which passes the desired charging current without distorting the 1 and 0 representing signals, the gate resistors in the circuits of the next level are determined. The resistance of each of these resistors, again, is a function of the amount of current which the resistor must pass in order to charge the associated flip-flop input capacitor. In this case, however, the gate resistor must also supply current to the other circuits in the same level. Consequently, the amount of current that a gate resistor in the second level must pass and its reistance, is a function of the number of circuits in the same level. In the embodiment of the present invention utilizing 1.5 megohms as final gate resistors, it was found that with two "and" circuits in the same level producing output signals which are applied to a final "or" circuit, 360,000 ohm gate resistors more suitable. Where three "and" circuits were utilized in the same level, 300,000 ohm gate resistors were found to be suitable; where four "and" circuits in the same level were utilized, 270,000 ohm gate resistors were suitable; where five "and" circuits were utilized in the same level, 220,000 ohm gate resistors were suitable; and where six "and" circuits were utilized in the same level, 200,000 ohm gate resistors were suitable.

It will be noted that the value of the gate resistors decreases and consequently more power is dissipated when a greater number of "and" circuits appear at the same level. This results because under maximum current conditions, each gate resistor must not only supply current to charge an associated flip-flop input capacitor, but must also supply current through the back impedances of the diodes in other "and" circuits. It is for this reason, therefore, that mechanization function 223 for the C register input circuit is separated by brackets into two "or" functions. Thus, instead of having seven "and" circuits at the same level connected into a final "or" circuit, three "and" circuits are connected to a first "or" circuit, and four "and" circuits are connected to a second "or" circuit. This mechanization effectively reduces the number of "and" circuits at the same level from seven to five and four. Thus, 220,000 and 270,000 ohm gate resistors may be utilized instead of the extremely small gate resistors required for seven "and" circuits at the same level, and the power dissipation is greatly reduced.

The gate resistors for the control signal "and" circuits are determined by static current considerations. The maximum current passes through the gate resistor when the control signal is at its 1 level and is applied to a plurality of other logical circuits, each of which is at its 0 level. This means that sufficient current must pass through the gate resistor of the control circuit in order to maintain all of the other circuits at the lower voltage level, for example, at 125 volts.

The gate resistor of an "or" circuit, producing a complementary binary control signal, passes the maximum current when the signal level is 0, and is applied to a plurality of "and" circuits, each of which has at least one "1" signal applied to it.

The values of the gate resistors for the control circuits, then, must be determined separately, each gate resistor being small enough to insure the proper output level of the control signals.

The complementer circuit shown in Fig. 8 is a special type of clock pulse circuit which produces a negative signal at one output terminal in response to a negative-going clock pulse signal and a 1 representing signal, and produces a negative signal at the other output terminal in response to a clock pulse signal and a 0 representing signal. In the circuit shown in Fig. 8, clock pulse signals are applied to input terminal 340 and the output signal of an "and" or "or" circuit is applied to input terminal 341. The clock pulse input terminal is connected to the cathode of a first diode 342, having its anode connected to the anode of a second diode 343; the anode junction of diodes 342 and 343 being connected to the cathode of a third diode 344. Input terminal 341 is connected to the cathode of diode 343. The anode of the third diode is connected to a first output terminal 345 of the complementer circuit. The junction of the anode of diodes 342 and 343 is also connected to a second output terminal 346. Input terminal 340 is coupled by a capacitor 349 to the cathode of diode 344. Assuming that the clock pulse signal is to vary, as above, from 140 volts to 125 volts, a potential of 140 volts is applied through a load resistor 347 to the junction of the anode of second diode 343 and the cathode of third diode 344, and a 125 volt potential is applied through a load resistor 348 to the anode of third diode 344.

When a 140 volt signal, representing 1, is applied to input terminal 341 and a clock pulse is applied to input terminal 340, a negative signal passes through diode 342 to output terminal 346. This signal is applied to the 1 input circuit of a flip-flop. The negative clock pulse signal cannot pass through capacitor 349 and diode 344 to output terminal 345 because the cathode of diode 344 is clamped at 140 volts by the 140 volt potential applied through load resistor 347.

When the signal level applied to input terminal 341 is 125 volts diode 343 conducts, allowing the cathode potential of diode 344 to fall to about 125 volts. Then, when a clock pulse signal is applied to input terminal 340, a negative signal passes through capacitor 349 and diode 344 to output terminal 345, being then applied to the 0 input circuit of a flip-flop. In this case, diode 344 is effective to pass the negative signal since it is no longer biased off by the signal applied through resistor 347. A negative signal does not pass through diode 342 to output terminal 346 since there is no voltage change across diode 342 when the clock pulse is applied.

From the above, it can be seen that the complementer circuit produces a negative signal which is applied to the 1 input circuit of the associated flip-flop when the signal applied to input terminal 341 is a 1 signal, and applies a negative signal to the 0 input circuit of the flip-flop when the signal applied to input terminal 341 is a 0 representing signal.

The complementer circuit is described in detail and claimed in copending application for patent entitled "Complementary Signal Generating Networks" by Daniel L. Curtis, Inventor, Serial No. 308,045, filed September 5, 1952, now Patent No. 2,812,451. Co-pending application Serial No. 308,045, now Patent No. 2,812,451, has been assigned of record to the same assignee as this application.

Another technique for developing complementary signals for the 1 and 0 input circuits of a flip-flop is achieved through the use of an "overriding" flip-flop, such as is described and claimed in copending application for patent entitled "Triggering Networks for Flip-Flop Circuits," by Daniel L. Curtis, Inventor, Serial No. 245,737, filed September 8, 1951, now Patent No. 2,723,080. Co-pending application Serial No. 245,737, now Patent No. 2,723,080, has been assigned of record to the same assignee as this application. An "overriding" flip-flop operates the same as a conventional flip-flop when pulses are applied separately to the 1 and 0 input circuits. However, when pulses are applied simultaneously to both the 1 and 0 input circuits, the signal applied to one of the input circuits "overrides" that applied to the other. If the flip-flop is selected so that the signal applied to the 1 input circuit always overrides a signal applied simultaneously to the 0 input circuit and clock pulses are continuously applied to the 0 input circuit, it may be utilized in place of a complementer.

PARALLEL ARITHMETIC SYSTEM

Referring now to Fig. 9, it will be noted that the parallel system, like the serial system explained above, comprises three registers, A, B, and C, control means 100, a sign storage device 208, a digit storage device 260, and a plurality of logical gates.

The B and C registers may be shifted either to the right or to the left. This means that each of these registers includes two sets of logical shifting circuits, such as have been described with regard to the A register shown in Fig. 5a. One set of logical shifting circuits for each of the B and C registers is utilized to shift to the right during multiplication, and the other set is utilized to shift to the left during division. The registers are shifted one digit position in response to each clock pulse.

For shifts to the right, the B register is circulated through logical gate 270, and for shifts to the left, is circulated through logical gate 272. The C register is circulated through logical gate 274 during shifts to the right, and is circulated through logical gate 276 during shifts to the left. No shifting circuitry is required for the A register.

Each of the registers includes $n$ input circuits corresponding to the number of digit positions. For the B and C registers, the $n$th input circuit may be the same as the input circuit for shifting to the right, and the 1st input circuit may be the same as the input circuit which is utilized in shifts to the left. In a flip-flop type of shifting register, the input circuits are the 1 and 0 grid input circuits of a flip-flop, such as have been described in connection with Fig. 6. The input circuits for the A, B, and C registers are designated, respectively, as $inAr_j$, $inBr_j$, and $inCr_j$, where $j$ designates the digit position. Thus, $inAr_n$ is the sign digit input circuit for the A register. Each register also produces output signals corresponding to $n$ digits stored therein. The A, B, and C register complementary output signals are designated, respectively, as $Ar_j$, $\overline{Ar_j}$; $Br_j$, $\overline{Br_j}$; and $Cr_j$, $\overline{Cr_j}$. Thus, the B register signals $Br_n$ and $\overline{Br_n}$ correspond to the sign digit stored in the B register. It should be noted that during multiplication, symbol $Cr_1$ represents the multiplier digit series.

The adder-subtracter unit for the parallel system comprises $n$ separate adder-subtracter sections, each of which has two input circuits $aA_j$ and $bA_j$. A register signals $Ar_j$ are applied through logical gates $202_j$ to the $aA_j$ input circuits, respectively; and B register signals $Br_j$ are applied through logical gates $206_j$ to input circuits $bA_j$, respectively. The adder-subtracter unit produces signals $A_j$ which are applied to logical gates $214_j$, respectively, the signals produced by logical gates $214_j$ being applied, respectively, to B register input circuits $inBr_j$. During the operation of transferring B and C register numbers to the A register, signals $A_j$ and $Cr_j$ are applied to logical gates $209_j$, respectively, the signals produced by logical gates $209_j$ being applied to input circuits $inAr_j$ at $Dt(1)$ time. The signal functions for logical gates $209_j$ are:

$$(209_j)\, inAr_j = [Tca \cdot Cr_j + Tba \cdot A_j] \cdot Dt(1)$$

Control means 100 is substantially the same as that described above for the serial system except that no word timing control signals are required. As explained above, each of the control signals and signal Oper becomes 1 at $Dt(n+1)$ time for a voltage-level system. At $Dt(n+1)$ time, the A and B register signals are transferred in parallel to the adder-subtracter unit. $Dt(1)$ time is then utilized to perform addition and subtraction as well as transfer B to A and transfer C to A. Signal Oper, then, is 1 for two digit time intervals during addition and subtraction.

The mechanization functions for each of the adder sections except the first are similar to the serial adder-subtracter unit described above. The sum digit $A_j$, then, is equal to $A_0$ given above for all adder-subtracter sections except the first. The carry function is the same as has been described above except for the first carry. No carry is produced by the $n$th adder-subtracter section. The sum and carry functions for the first adder-subtracter section appear as:

$$A_1 = a_1 \cdot \overline{b_1} + \overline{a_1} \cdot b_1$$

$$c_1 \pm = Tba \cdot S \cdot b_1 + Tba \cdot [\overline{S} \cdot a_1 \cdot b_1 + S \cdot a_1 \cdot \overline{b_1}]$$

The carry signal for the $j$th adder-subtracter section is applied to the $(j+1)$st section.

The detailed construction of parallel adder-subtracter units is more fully explained in the above-mentioned copending application for patent to Nelson, Serial No. 189,318.

The A register sign digit is entered into sign storage device 208 prior to operation by signal $\overline{Oper} \cdot Ar_n$ just as has been explained for the serial system. In the same manner as explained above, the sign storage device is complemented in response to signal $Subt \cdot Dt(n+1)$ and a clock pulse if the operation is subtraction.

The operations of addition and subtraction then are performed as follows: Just prior to operation, the addend or subtrahend is entered into the A register and the sign digit is entered into the sign storage device 208. At $Dt(n+1)$ time, the addend or subtrahend is transferred from the A register to the adder-subtracter unit through logical gates $202_j$, and the augend or minuend is transferred from the B register through logical gates $206_j$. The sum digits $A_j$ are then formed, and after $Dt(n+1)$ time, as signalled by $\overline{Dt(n+1)}$, are transferred through logical gates $214_j$ to the B register input circuits $inBr_j$. During all operations, except transfer B to A and transfer C to A, the adder-subtracter output signals $A_j$ are entered into the B register. The B register input functions appear as:

$$(214_j)\, inBr_j = A_j \cdot \overline{Tba} \cdot \overline{Tca} \cdot \overline{Dt(n+1)}$$

Multiplication is performed during $n$ digit times of operation and consequently, signal Mult=1 for $n$ digit time intervals. No multiplier digit storage device is required since signals $Cr_1$ may be utilized directly to control the addition or subtraction of the multiplicand. Signal $\overline{Dt}(n-1)$ is utilized to eliminate the multiplier sign digit as an addition-subtraction control. Signal $\overline{Dt}(n-1)$ is not required to eliminate the sign digit of the addend, subtrahend, or divisor since the sign digit is not added in the parallel adder-subtracter unit. The signal function for the $A_j$ input circuits of the adder-subtracter unit are:

$$(202_j)\, aA = Ar_j \cdot (\text{Add} + \text{Subt} + \text{Mult} \cdot Cr_1 \cdot \overline{Dt}(n-1) + \text{Div})$$

The multiplier and partial products are shifted to the right with respect to the multiplicand after each digit time of operation except the $n$th. It should be noted that the B and C registers are shifted after $Dt(n+1)$ time, but, since both the partial product and the multiplier are 0, this shift has no significance. As in addition and subtraction, the A register sign digit is entered prior to operation into the sign storage device 208. If the multiplier is negative, as indicated by signal $Cr_n = 1$ at $Dt(n+1)$ time, then the sign storage device is complemented, in the manner explained above, in response to signal $$\text{Mult} \cdot Dt(n+1) \cdot Cr_n$$

Multiplication is performed as follows: The multiplier is entered into the C register and the multiplicand is entered into the B register by adding it as if it were an addend. Operation begins at $Dt(n+1)$ at which time the sign storage device is complemented if $Cr_n = 1$, and the multiplicand signals are added into the adder-subtracter unit in accordance with the first multiplier digit signal. After each digit time of operation, except $Dt(n)$, the B and C registers are shifted to the right in response to signal Mult.$\overline{Dt}(n)$, and the multiplicand in the A register is added to the partial product in the B register if signal $Cr_1=1$.

During division, the C register is shifted to the left in response to signal Div and the B register is shifted to the left in response to clock pulses and signal Div.$\overline{Dt}(n+1)$. Signal $\overline{Dt}(n+1)$ is included in the B register shifting and circulation circuits in order to prevent a shift of the dividend prior to the first addition or subtraction of the divisor. Such a shift may be permitted if it is certain that the divisor is larger than the dividend. As in the other operations, the A register or divisor sign digit is entered into the sign storage device 208 prior to operation. At $Dt(n+1)$ time, the quotient sign digit is entered into the C register and is determined by signal function $$(Br_n.\overline{S}+\overline{Br_n}.S)$$

After $Dt(n+1)$ time, the partial remainder sign digits are entered into the sign storage device prior to each digit time of operation. The sign storage device then, as in the serial system, is utilized to control the operation of the adder-subtracter unit.

The dividend sign digit is stored, during division, in digit storage device 260, the dividend sign being obtained from $Br_n$ and $\overline{Br_n}$ and entered through logical gate 274 at $Dt(n+1)$ time. After $Dt(n+1)$ time, one quotient digit is entered into the C register during each digit time, the quotient digit being determined by signal function $$(Br_n.Ds_2+\overline{Br_n}.\overline{Ds_2})$$

The signal functions for the parallel system are given below, each function being numbered according to the corresponding logical gate.

(202$_j$)  $aA_j = Ar_j.(\text{Add}+\text{Subt}+\text{Mult}.Cr_1.\overline{Dt}(n-1)+\text{Div})$ (206$_j$)  $bA_j = Br_j.\text{Oper}$ (207)  $\begin{cases} 1S = \overline{\text{Oper}}.Ar_n + Tba.Br_n + \text{Div}.\overline{Br_n} \\ 0S = \overline{\text{Oper}}.\overline{Ar_n} + Tba.\overline{Br_n} + \text{Div}.Br_n \\ \text{Subt}.Dt(n+1)+\text{Mult}.Dt(n+1).Cr_n \end{cases} +$ (209$_j$)  $inAr_j = [Tca.Cr_j+Tba.A_j].Dt(1)$ B register shifted to right by Mult.$\overline{Dt}(n)$ and through logical gate 270

B register shifted to left by Div.$\overline{Dt}(n+1)$ and through logical gate 272

(Adder) $\begin{cases} c_j^\pm = \overline{Tba}.S.(b_j+c_{j-1})+\overline{Tba}.[\overline{S}.(a_j.b_j+b_j.c_{j-1})+ \\ \qquad a_j.c_j+S.(a_j.\overline{b_j}+\overline{b_j}.c_{j-1})] \\ A_j = a_j.\overline{b_j}.\overline{c_{j-1}}+\overline{a_j}.b_j.\overline{c_{j-1}}+\overline{a_j}.\overline{b_j}.c_{j-1}+ \\ \qquad a_j.b_j.c_{j-1} \end{cases}$ (214$_j$)  $inBr_j = A_j.\overline{Tba}.\overline{Tca}.\overline{Dt}(n+1)$ (259)  $\begin{cases} 1Ds2 = \text{Div}.Br_n.Dt(n+1) \\ 0Ds2 = \text{Div}.\overline{Br_n}.Dt(n+1) \end{cases}$ (274)  $inCr = \text{Div}.Dt(n+1).(Br_n.\overline{S}+\overline{Br_n}.S)+$
$\overline{Dt}(n+1).(Br_n.Ds2+\overline{Br_n}.\overline{Ds2})+\text{Mult}.\overline{Dt}(n).Cr_1$ C register shifted to right by Mult.$\overline{Dt}(n)$ and through gate 274

C register shifted to left by Div.$\overline{Dt}(n+1)$ and through gate 276

From the foregoing description, it is evident that the present invention provides an electronic binary calculator for performing mathematical operations in accordance with binary input instructions upon binary numbers, and is completely mechanized in accordance with Boolean algebraic equations. It has been shown that each of the orders, such as Add, Subt, Mult, and Div are specified in accordance with a first set of Boolean algebraic functions, and that all instructions are carried out by means of a logical network which is mechanized in accordance with a second set of Boolean algebraic equations.

While the embodiment which has been discussed in detail is a serial arithmetic system which uses voltage-level signals to represent binary numbers, it has been pointed out that the principles of the invention are applicable as well to parallel systems and to pulse-type systems. It has also been pointed out that the signal functions which are utilized to define the logical gates may be considered as generic to all other signal functions which may be derived therefrom and to all mechanization functions based upon a particular form of the signal function.

In the preferred embodiment discussed in detail, miniaturization and power minimization is the primary consideration. It has been pointed out, however, that the principles of the present invention are applicable as well to larger systems utilizing a great deal of power in order to insure reliability of operation.

The specific circuit elements which are utilized in the preferred embodiment of the present invention have been described in detail. It should be evident, however, that the diode logical circuits which have been described may be replaced by logical circuits using electron discharge tubes, transistors or other circuits which provide the desired logical operation.

While it has been assumed that the arithmetic unit performs only operations of addition, subtraction, multiplication, division, transfer and shift, it should be evident that other logical operations may be mechanized into the system by the inclusion of appropriate logical circuits. It should be noted, however, that whenever a new logical function is added, an additional complementary pair of control signals is required.

The manner in which additional logical operations are added is illustrated in the following example. Let us assume that it is desired to have an operation wherein a function table is read and not read in response to complementary pairs of control signals F and $\overline{F}$, respectively. Then, all of the functions already in the arithmetic unit which are not utilized for function table reading must be multiplied by variable $\overline{F}$ indicating that this particular logical function is 0 during the function table operation. The function table logic is then added and is multiplied by the variable F indicating that these functions are considered during the function table operation when $F=1$.

It should be evident, from this example, that any number of logical operations may be built into the arithmetic unit, the only limitation being that of circuit complexity and power dissipation.

Just as logical operations may be added to the arithmetic unit, they may be removed from the arithmetic unit. This is done by setting the corresponding control signal equal to 0 and its complement equal to 1. Thus, if it is desired to remove the operation of transfer B to A, signal Tba is set to 0 and $\overline{Tba}$ is set to 1. It should be understood, therefore, that it is possible to mechanize a considerable number of combinations and subcombinations according to the present invention, where the transformation from subcombination to combination, or combination or subcombination, is made in the manner explained above.

It should also be noted that all embodiments of the present invention utilize complementary signals and, thus, may clearly be distinguished from computers which use no complementary signals but obtain the desired result through the use of inhibitor circuits, as described in "Calculating Instruments and Machines" by Douglas R. Hartree, referred to above.

What is claimed as new is:

1. In combination, a plurality of registers each constructed to store a plurality of signal indications, a first plurality of "and" networks and "or" networks formed from diodes and connected to one another in a particular relationship for respectively providing first, second, third and fourth distinctive signal indications at first, second, third and fourth times to represent different types of operations to be performed including addition, subtraction, multiplication and division, information means for providing at the first, second, third and fourth particular times signal indications representing an addend and an augend for addition, a subtrahend and a minuend for subtraction, a multiplicand and a multiplier for multiplication and a dividend and a divisor for division and representing the polarities of these different quantities, a second plurality of "and" networks and "or" networks formed from diodes and connected to one another in a particular relationship and coupled electrically to the first plurality of "and" networks and "or" networks and to the registers for storing the signal indications representing the different quantities in the various registers, a third plurality of "and" networks and "or" networks formed from diodes and connected to one another in a particular relationship and coupled to the information means and to the first plurality of "and" networks and "or" networks and to the registers for using the signal indications representing the polarities of the various quantities to provide signal indications representing the polarity of a resultant quantity for storage in a particular register in accordance with the type of operation being performed, a fourth plurality of "and" networks and "or" networks formed from a plurality of diodes and connected to one another in a particular relationship and coupled electrically to the registers and to the first and third pluralities of "and" and "or" networks for arithmetically combining the signal indications in a particular pair of registers in the plurality in accordance with the type of operation being performed and for combining the signal indications in the particular register on a direct basis at particular times and on a complementary basis at other times in accordance with the polarities of various quantities stored in the registers, a fifth plurality of "and" networks and "or" networks formed from diodes and connected to one another in a particular relationship and coupled electrically to the first and fourth pluralities of "and" and "or" networks and to the registers for introducing the signal indications from the fourth plurality of "and" networks and "or" networks to a particular register in the plurality in accordance with the type of operation being performed, a sixth plurality of "and" networks and "or" networks formed from diodes and connected to one another in a particular relationship and coupled electrically to the registers and to the first plurality of "and" and "or" networks for providing for a recirculation of the signal indications in the registers in accordance with the type of operation being performed and in accordance with the number of signal indications representing the various quantities, and a seventh plurality of "and" networks and "or" networks formed from diodes and connected to one another in a particular relationship and coupled electrically to the registers and to the first and sixth plurality of "and" and "or" networks for providing for a shift in each recirculation of the signal indications in particular registers relative to the signal indicatons in other registers in accordance with the type of operation being performed.

2. In combination, a plurality of registers each constructed to store a plurality of signal indications, control means for respectively providing first, second, third and fourth distinctive signal indications controlling at first, second, third and fourth particular times various types of operations including addition, subtraction, multiplication and division, means including at least a first logical network formed from a plurality of diodes and coupled to the registers for recirculating the signal indications in the registers to obtain a positional shift of the signal indications in particular registers relative to the positional shift in other registers in accordance with the type of operation being performed, means including a second logical network formed from a plurality of diodes and coupled to the last mentioned means and to the registers for controlling the number of recirculations of the signal indications in the various registers in accordance with the type of operation being performed to obtain a plurality of recirculations for the operations of multiplication and division, means for providing signal indications representing the polarities of the various quantities being operated upon, means including a third logical network formed from a plurality of diodes and coupled to the polarity means for using the signal indications representing the polarities of the various quantities to provide signal indications representing the polarity of a resultant quantity, means including at least a fourth logical network formed from a plurality of diodes and coupled to the registers and to the polarity means and to the control means for receiving the signal indications from a particular pair of registers in the plurality and for combining the signal indications from the particular pair of registers on an additive basis at particular times in accordance with the polarities of particular quantities and the type of operation being performed and for combining the signal indications on a complementary basis at other times in accordance with the polarities of particular quantities and the type of operation being performed, and means including a fifth logical network formed from a plurality of diodes and coupled to the last mentioned means and to the registers and to the control means for introducing the signal indications from the last mentioned means to particular registers in the plurality in accordance with the type of operation being performed and to replace signal indications previously in the registers and to serve as the resultant quantity.

3. In the combination set forth in claim 2, means including the second logical network for controlling the number of recirculations of the signal indications in the registers in accordance with the number of signal indications representing the different quantities and in accordance with the type of operation being performed, and means including at least a sixth logical network formed from diodes and coupled to the control means and to the registers and to the second logical network for providing for a shift of signal indications in particular registers relative to the signal indications in other registers in accordance with the type of operation being performed and in accordance with the number of previous recirculations of the signal indications in the registers.

4. In the combination set forth in claim 2, means including at least a sixth logical network formed from diodes and coupled to the first logical network and to the control means and to the registers for receiving particular signal indications during each recirculation of the signal indications in the registers and in accordance with the number of previous recirculations of selected signal indications in the registers and for receiving the signal indications from a particular one of the registers in each recirculation of the signal indications in the registers and in accordance with the type of operation being performed, and means including at least a seventh logical network formed from diodes and coupled to the fourth and seventh logical networks for controlling the operation of the fourth logical network in accordance with the signal indications provided by the seventh logical network in each recirculation of the signal indications in the registers.

5. In a combination, a plurality of registers each constructed to store a plurality of signal indications, first logical circuitry for respectively providing first, second, third and fourth signal indications controlling various operations such as addition, subtraction, multiplication and division and for respectively providing such signal indications at first, second, third and fourth particular times, means coupled to the registers and to the first logical circuitry for storing in the various registers at the first, second, third and fourth particular time signal indications representing an addend and augend for addition, a subtrahend and a minuend for subtraction, a multiplicand and a multiplier for multiplication and a dividend and a divisor for division, means coupled to the registers and the first logical circuitry for providing for a recirculation of the signal indications in particular registers in accordance with the type of operation to be performed and for providing a count of the number of recirculations, second logical circuitry coupled to the first logical circuitry and to the registers and to the recirculating means for limiting the recirculation of the signal indications in the registers to a single cycle for the operations of addition and subtraction and to a plurality of cycles related to the plurality of signal indications in the register for the operations of multiplication and division, means coupled to the registers and to the first and second logical circuitry and to the recirculating means for providing for a shift in the signal indications in particular ones of the registers relative to the signal indications in other registers in each cycle of recirculation and at other times in accordance with the operations at the first, second, third and fourth particular times of addition, subtraction, multiplication and division, means for providing signal indications representing the polarities of the various quantities stored in the registers, third logical circuitry coupled to the first logical circuitry and to the polarity means and to the registers for receiving the signal indications from particular registers in accordance with the type of operation to be performed and for combining the signal indications on an additive basis at particular times and on a complementary basis at other times in accordance with the polarities of particular quantities in the registers and the type of operation to be performed, and means coupled to the first and third logical circuitry and to the registers for introducing the signal indications from the third logical circuitry to particular registers in the plurality at the first, second, third and fourth particular times for subsequent use as the sum, difference, product and remainder values in accordance with the type of operation being performed.

6. In combination, a plurality of registers each constructed to store a plurality of signal indications, means for storing in particular ones of the registers at first, second, third and fourth particular times signal indications representing an addend and an augend for addition, a subtrahend and a minuend for subtraction, a multiplicand and a multiplier for multiplication and a dividend and a divisor for division, means for providing signal indications representing the polarities of the last mentioned quantities, means coupled to the polarity means for using the signal indications representing the polarities of the various quantities to provide signal indications representing the polarity of a resultant quantity obtained by operation on the last mentioned quantities, first logical circuitry formed from a plurality of diodes connected in a particular pattern for respectively providing at first, second, third and fourth particular times, signal indications representing operations of addition, subtraction, multiplication and division, second logical circuitry formed from a plurality of diodes connected in a particular pattern and coupled to the registers and to the first logical circuitry for arithmetically combining on a direct basis the signal indications in a particular pair of registers dependent upon the type of operation being performed, third logical circuitry formed from a plurality of diodes connected in a particular pattern and coupled to the registers and the first logical circuitry for arithmetically combining on a complementary basis the signal indications in a particular pair of registers dependent upon the operation being performed, means coupled to the first, second and third logical circuitry and to the polarity means for energizing the second logical circuitry at particular times and the third logical circuitry at other times in accordance with the signal indications representing the polarities of the quantities stored in the registers and in accordance with the signal indications representing the type of operation being performed, fourth logical circuitry formed from a plurality of diodes connected in a particular pattern and coupled to the first, second and third logical circuitry and to the registers for controlling the introduction of signal indications from the second and third logical circuitry to particular ones of the registers in accordance with the type of operation being performed, fifth logical circuitry formed from a plurality of diodes and coupled to the registers and to the first logical circuitry for providing for a recirculation of the signal indications in particular registers in the operation of multiplication and division through a number of cycles corresponding to the pluralty of signal indications in the registers, and sixth logical circuitry formed from a plurality of diodes and coupled to the second and third logical circuitry and to the registers for presenting the signal indications from the particular pair of registers to the second and third logical circuitry upon each recirculation of the signal indications.

7. In combination, a first register for storing in a plurality of positions signal indications digitally representing a multiplier, a second register for storing in a plurality a multiplier, a second register for storing in a plurality of positions signal indications digitally representing a multiplicand, a third register for storing in a pluralty of positions signal indications digitally representing a product value, a first plurality of "and" and "or" networks formed from diodes and electrically coupled to one another in a particular relationship and electrically coupled to the second and third registers for providing signal indications representing a carry from one position to the next in accordance with operations of addition at first particular times and subtraction operations at second particular times of in the network, a second plurality of "and" and "or" networks formed from diodes and electrically coupled to one another in a particular relationship and electrically coupled to the second and third registers and to the first plurality of "and" and "or" networks for arithmetically combining the signal indications representing the carry and the signal indications from the second and third registers for each position in accordance with the operations of addition at the first particular times and in accordance with the operations of subtraction at the second particular times, means coupled to the third register and to the second plurality of "and" and "or" networks for introducing signal indications from the second plurality into the third register, a third plurality of "and" and "or" networks formed from diodes and electrically coupled to one another in a particular relationship and electrically coupled to the first, second and third registers and to the second plurality of "and" and "or" networks and to the last mentioned means for controlling the introduction of signal indications from the second and third registers into the second plurality of "and" and "or" networks in accordance with the signal indications representing digital information in the first register, means including a fourth plurality of "and" and "or" networks formed from diodes and electrically coupled to one another in a particular relationship and electrically coupled to the second plurality of "and" and "or" networks and to the polarity means for controlling the operation of the second plurality of "and" and "or" networks for addition at the first particular times and subtraction at the second particular times in accordance with signal indications representing the polarities of the multiplier and multiplicand, means including a fifth plurality of "and" and "or" networks formed from a plurality of diodes electrically coupled to one another in a particular relationship and electrically coupled to the registers and to the second plurality of "and" and "or" networks for recirculating the signal indications during the operation of the second plurality of "and" and "or" networks in combining the signal indications from the second and third registers, and means including a sixth plurality of "and" and "or" networks formed from diodes and electrically coupled to one another in a particular relationship and electrically coupled to the registers for providing for a positional shift in the signal indications in the first and second registers relative to the signal indications in the third register upon each operation of the second plurality of "and" and "or" networks in combining the signal indications from the second and third registers.

8. In combination, a first register for storing a plurality of signal indications digitally representing a multiplier, a second register for storing a plurality of signal indications digitally representing a multiplicand, a third register for storing a plurality of signal indications digitally representing a product value, first logical circuitry formed from a plurality of diodes connected in a particular relationship and coupled electrically to the registers for arithmetically combining the signal indications in the second and third registers on a direct basis, second logical circuitry formed from a plurality of diodes connected in a particular relationship and coupled electrically to the registers for arithmetically combining the signal indications in the second and third registers on a complementary basis, means for providing signal indications representing the polarities of the multiplier and multiplicand, third logical circuitry formed from a plurality of diodes connected in a particular relationship and coupled to the polarity means for using the signal indications representing the polarities of the multiplier and multiplicand to provide signal indications representing the polarity of the product, fourth logical circuitry formed from a plurality of diodes connected in a particular relationship and coupled to the first, second and third logical circuitry for energizing the first logical circuitry at first particular times and the second logical circuitry at second particular times in accordance with the signal indications representing the polarity of the product, and fifth logical circuitry formed from a plurality of diodes connected in a particular relationship and coupled electrically to the third register and to the first and second logical circuitry for introducing the signal indications from the first logical circuitry at the first particular times and from the second logical circuitry at the second particular times to the third register to represent a new product value.

9. In combination, a first register for storing a plurality of signal indications digitally representing a multiplier, a second register for storing a plurality of signal indications digitally representing a multiplicand, a third register for storing a plurality of signal indications digitally representing a product value, first logical circuitry formed from a plurality of diodes connected in a particular relationship and coupled electrically to the second and third registers for arithmetically combining the signal indications in the second and third registers on a direct basis, second logical circuitry formed from a plurality of diodes connected in a particular relationship and coupled electrically to the second and third registers for arithmetically combining the signal indications in the second and third registers on a complementary basis, means for providing signal indications representing the polarities of the multiplier and multiplicand, third logical circuitry formed from a plurality of diodes connected in a particular relationship and coupled to the polarity means for using the signal indications representing the polarities of the multiplier and multiplicand to provide signal indications representing the polarity of the product, fourth logical circuitry formed from a plurality of diodes connected in a particular relationship and coupled electrically to the first, second and third logical circuitry for energizing the first logical circuitry at first particular times and the second logical circuitry at second particular times in accordance with the signal indications representing the polarity of the product, fifth logical circuitry formed from a plurality of diodes connected in a particular relationship and coupled to the second and first logical circuitry and to the third register for introducing the signal indications from the first logical circuitry at the first particular times and from the second logical circuitry at the second particular times to the third register to represent a new product value, sixth logical circuitry formed from a plurality of diodes connected in a particular relationship and including a first bistable member and electrically coupled to the registers for recirculating the signal indications in the second and third registers and for providing a digital shift in the signal indications in the first register relative to the signal indications in the second register upon each such recirculation, and control means including seventh logical circuitry formed from a plurality of diodes connected in a particular relationship and including at least a second bistable member and coupled electrically to the registers for receiving signal indications representing a successive digit of the multiplier upon each recirculation and for providing for the combination in the first logical circuitry at the first particular times and in the second logical circuitry at the second particular times of the signal indications from the second and third registers upon the introduction of particular signal indications from the control means and for otherwise obtaining the passage of the signal indications from the third register through the first and second logical circuitry without combination with the signal indications from the second register.

10. In combination, a first register for storing a plurality of signal indications digitally representing a divisor, a second register for storing a plurality of signal indications digitally representing a remainder value including a dividend, a third register for storing a plurality of signal indications, means for providing signal indications representing the polarities of the divisor and the dividend, means including at least a first logical network formed from a plurality of diodes and coupled electrically to the polarity means for using the signal indications representing the polarities of the divisor and the dividend to provide signal indications representing the polarity of a quotient, means including second logical circuitry formed from a plurality of diodes and coupled electrically to the first and second registers for arithmetically combining the signal indications in the first and second registers on a direct basis, means including third logical circuitry formed from a plurality of diodes and coupled electrically to the second and third registers for arithmetically combining the signal indications in the second and third registers on a complementary basis, means including fourth logical circuitry formed from a plurality of diodes and coupled to the first, second and third logical circuitry for energizing the first logical circuitry at first particular times and the second logical circuitry at second particular times in accordance with the signal indications representing the polarities of the various quantities, and means including fifth logical circuitry formed from a plurality of diodes and coupled electrically to the first, second, third and fourth logical circuitry and to the registers for introducing signal indications from the first logical circuitry at the first particular times and from the second logical circuitry at the second particular times to the third register in accordance with the signal indications representing the polarity of the quotient to obtain in the third register a plurality of signal indications digitally representing the quotient.

11. In combination, a first register for storing a plurality of signal indications digitally representing a divisor, a second register for storing a plurality of signal indications digitally representing a remainder value including a dividend, a third register for storing a plurality of signal indications, first logical circuitry formed from a plurality of diodes connected in a particular relationship and coupled to the first and second registers for arithmetically combining the signal indications in the first and second registers on a direct basis, second logical circuitry formed from a plurality of diodes connected in a particular relationship and coupled electrically to the first and second registers for arithmetically combining the signal indications in the first and second registers on a complementary basis, means for providing signal indications representing the polarities of the divisor and the dividend, third logical circuitry formed from a plurality of diodes connected in a particular relationship and coupled electrically to the polarity means for using the signal indications representing the polarities of the divisor and the dividend to provide signal indications representing the polarity of a quotient, fourth logical circuitry formed from a plurality of diodes connected in a particular relationship and coupled electrically to the first and second logical circuitry and to the polarity means for energizing the first logical circuitry at first particular times and the second logical circuitry at second particular times in accordance with the signal indications representing the polarities of the various quantities, fifth logical circuitry formed from a plurality of diodes connected in a particular relationship and coupled electrically to the registers and to the polarity means and to the first and second logical circuitry for introducing signal indications from the first logical circuitry at the first particular times and from the second logical circuitry at the second particular times to the third register in accordance with the polarity of the various quantities to obtain in the third register signal indications digitally representing the quotient, sixth logical circuitry formed from a plurality of diodes connected in a particular relationship and coupled to the registers for recirculating the signal indications in the first and second registers and for providing a digital shift of the signal indications in the first register relative to the signal indications in the second register upon each such recirculation, and the seventh logical circuitry formed from a plurality of diodes connected in a particular relationship and coupled electrically to the registers and the first and second logical circuitry for providing a shift in the signal indications in the third register upon each recirculation of the signal indications in the first and second registers for the introduction of new signals from the first logical circuitry at the first particular times and from the second logical circuitry at the second particular times to the third register in each such recirculation.

12. In combination, a first register for storing a plurality of signal indications digitally representing a divisor, a second register for storing a plurality of signal indications digitally representing a remainder value including a dividend, a third register for storing a plurality of signal indications, first "and" and "or" networks formed from a plurality of diodes and electrically coupled to one another in a particular relationship and electrically coupled to the registers for receiving the signal indications from the first and second registers and for arithmetically combining the signal indications to obtain signal indications representing a new remainder value for introduction to the second register, means for providing signal indications representing the polarities of the divisor and the dividend as represented by the remainder value initially in the second register, second "and" and "or" networks formed from a plurality of diodes and electrically coupled to one another in a particular relationship and electrically coupled to the polarity means for using the signal indications representing the polarities of the divisor and the dividend to provide signal indications representing the polarity of a quotient, third "and" and "or" networks formed from a plurality of diodes and electrically coupled to one another in a particular relationship and electrically coupled to the first and second "and" and "or" networks and to the registers for controlling the passage of signal indications from the first "and" and "or" networks to the third register in accordance with the signal indications representing the polarity of the quotient to produce in the third register signal indications representing the quotient, and fourth "and" and "or" networks formed from a plurality of diodes and electrically coupled to one another in a particular relationship and electrically coupled to the registers for providing a recirculation of the signal indications in the first and second registers upon each arithmetic combination and for providing a positional shift of the signal information in the first register relative to the signal indications in the second register upon each arithmetic combination.

13. In combination, a first register for storing in a plurality of positions signal indications digitally representing a divisor, a second register for storing in a plurality of positions signal indications digitally representing a remainder value including a dividend, a third register for storing signal indications in a plurality of positions, means for providing signal indications representing the polarities of the divisor and the dividend, first logical circuitry formed from a plurality of diodes connected in a particular "and" and "or" relationship and coupled electrically to the polarity means for using the signal indications representing the polarities of the divisor and the dividend to provide signal indications representing the polarity of a quotient for introduction to the third register, second logical circuitry formed from a plurality of diodes connected in a particular "and" and "or" relationship and coupled to the registers for recirculating the signal indications in the first and second registers to obtain a positional shift of the signal indications in the second register relative to the signal indications in the first register upon each such recirculation, third logical circuitry formed from a plurality of diodes connected in a particular "and" and "or" relationship and coupled electrically to the registers and the polarity means for receiving the signal indications from the first and second registers and for arithmetically combining the signal indications on a direct basis at first particular times and on a complementary basis at second particular times in accordance with the signal indications representing the polarities of the various quantities, fourth logical circuitry formed from a plurality of diodes connected in a particular "and" and "or" relationship and coupled electrically to the registers for stepping along the signal indications in the third register in accordance with each recirculation of the signal indications in the first and second registers, and fifth logical circuitry formed from a plurality of diodes connected in a particular "and" and "or" relationship and coupled electrically to the registers and the third logical circuitry for introducing particular signal indications to the third register from the third logical circuitry upon each arithmetic combination to store in the positions in the third register signal indications representing the quotient.

14. In combination, a first register for storing in a plurality of positions signal indications digitally representing a divisor, a second register for storing in a plurality of positions signal indications digitally representing a remainder value including a dividend, a third register for providing signal indications in a plurality of positions, a first plurality of "and" and "or" networks formed from diodes connected to one another in a particular relationship and coupled electrically to the registers for providing signal indications representing a carry from one position to the next in accordance with operations of addition at first particular times and subtraction at second particular times in the networks, a second plurality of "and" and "or" networks formed from diodes connected to one another in a particular relationship and coupled electrically to the registers and to the carry means for arithmetically combining the signal indications representing the carry and the signal indications from the first and second registers for each position in accordance with the operations of addition at the first particular times and subtraction at the second particular times, a third plurality of "and" and "or" networks formed from diodes connected to one another in a particular relaship and coupled electrically to the second plurality of "and" and "or" networks and to the third register for introducing particular signal indications from the second plurality of "and" and "or" networks to the third register, means for providing signal indications representing the polarities of the divisor and the dividend, a fourth plurality of "and" and "or" networks formed from diodes connected to one another in a particular relationship and coupled to the polarity means for using the signal indications representing the polarities of the divisor and the dividend to provide signal indications representing the polarity of a quotient, a fifth plurality of "and" and "or" networks formed from diodes connected to one another in a particular relationship and coupled electrically to the polarity means and to the second plurality of "and" and "or" networks for controlling the operation of the second plurality of "and" and "or" networks for addition at the first particular times and subtraction at the second particular times in accordance with the signal indications representing the polarities of the various quantities, a sixth plurality of "and" and "or" networks formed from diodes connected to one another in a particular relationship and coupled electrically to the first and second pluralities of "and" and "or" networks and to the registers for recirculating the signal indications in the registers during the operation of the second plurality of "and" and "or" networks in combining the signal indications from the first and second registers, a seventh plurality of "and" and "or" networks formed from diodes connected to one another in a particular relationship and coupled electrically to the registers, and the first and second pluralities of "and" and "or" networks for providing for a positional shift in the signal indications in the second and third registers relative to the signal indications in the first register upon each operation of the second plurality of "and" and "or" networks in combining the signal indications from the first and second registers to obtain a proper insertion of signal indications from the second plurality of "and" and "or" networks into the third register and to obtain a proper arithmetic combination in the second plurality of "and" and "or" networks of the signal indications from the first and second registers.

15. In combination, first, second and third registers each constructed to store a plurality of signal indications; means including the first register for storing signal indications representing an addend for addition at certain times and a subtrahend for subtraction at other times, means including the second register for storing signal indications representing an augend for addition at the certain times and a minuend for subtraction at the other times and for providing for the storage of signal indications representing the sum for addition and the difference for subtraction, combining means responsive to the signal indications from the first and second members for combining the signal indications on an additive basis at first selected times and on a subtractive basis at second selected times to obtain resultant signal indications for introduction to the second register for storage, and means including a first storage member responsive to signal indications representing the polarities of the addend and augend for addition and to the subtrahend and minuend for subtraction to produce signal indications controlling the operation of addition at the first selected times and subtraction at the second selected times by the combining means; means including the third register for storing signal indications representing a multiplier, means including the second register for storing signal indications representing a multiplicand and for providing a shift of the multiplicand in successive words relative to the signal indications in the third register, means including second storage means coupled to the third register for storing successive signal indications from the third register upon successive shifts of the signal indications in the register, means including a logical network coupled to the second storage means and to the second register for controlling the passage of signal indications through the second register in accordance with the signal indications in the second storage means upon each shift of the signal indications in the register, means including the first register for storing signal indications representing a resultant quantity and for providing a shift of the resultant quantity in successive words relative to the signal indications in the third register in successive words, and means including the combining means for combining the signal indications from the first register and from the logical network upon each shift of the signal indications in the first register and for introducing the resultant signal indications to the first register upon each combination; means including the first register for storing signal indications representing a divisor, means including the second register for initially storing signal indications representing a dividend and for subsequently storing signal indications representing a remainder and for providing a shift of the signal indications in the second register relative to the signal indications in the first register in successive words, means including the second storage means coupled to the second register for storing particular signal indications from the second register upon the introduction of signal indications to the register in successive words, means including the combining means coupled to the first and second registers and to the second storage means for combining the signal indications from the first and second registers upon each shift of the signal indications from the first register and in accordance with the signal indications from the storage means upon each such shift, and means including the third register for receiving and storing particular signal indications from the combining means and for providing a shift of the signal indications in the third register relative to the signal indications in the first register in successive words; and control means coupled to the first, second and third registers and to the first and second storage means and the combining means for obtaining the different operations of addition, subtraction, multiplication and division at first, second, third and fourth controlled times in accordance with the respective production of first, second, third and fourth distinctive control signals by the control means.

16. In combination, first, second and third registers each constructed to store a plurality of signal indications; means including the first register for storing signal indications representing an addend for addition at certain times and a subtrahend for subtraction at other times and for storing the polarities of these quantities; means including the second register for storing signal indications representing an augend for addition at the certain times and a minuend for subtraction at the other times and for storing the polarities of these quantities and for providing for the storage of signal indications representing the sum for addition at first particular times and the difference for subtraction at second particular times, means including first logical circuitry formed from diodes and responsive to the signal indications in the first and second registers for performing operations of addition at the first particular times and subtraction at the second particular times on the quantities stored in the registers to obtain signal indications representing a resultant quantity, and means including a first storage member and including second logical circuitry formed from diodes and responsive to the polarities of the different quantities introduced to the various registers for controlling the operation of the first logical circuitry in providing the operations of addition at the first particular times and subtraction at the second particular times; means including the second register for storing signal indications representing a multiplicand, means including the third register for storing signal indications representing a multiplier, means including third logical circuitry formed from diodes and coupled to the third register for providing a shift of the signal indications in the third register in successive words, means including fourth logical circuitry formed from diodes and coupled to the second register for providing a shift of the signal indications in the second register in successive words, means including a second storage member and including fifth logical circuitry formed from diodes and coupled to the third register for storing successive signal indications from the third register upon successive shifts of the signal indications in the register, means including sixth logical circuitry formed from diodes and coupled to the second storage member and the second register for obtaining the passage of the signal indications from the second register to the first logical circuitry upon the occurrence of a first indication in the storage member and for inhibiting the passage of the signal indications from the second register to the first logical circuitry upon the occurrence of a second indication in the storage member, means including the first register for storing signal indications representing a resultant quantity, means including seventh logical circuitry formed from diodes and coupled to the first register for providing a shift of the signal indications in the first register relative to the signal indications in the third register in successive words, and means including the first logical circuitry for combining the signal indications from the first register and from the sixth logical circuitry in each shift of the signal indications from the first register and for introducing the resultant signal indications to the first register upon each such shift to replace the signal indications previously in the first register; means including the first register for storing signal indications representing a divisor, means including the second register for initially storing signal indications representing a dividend and for subsequently storing signal indications representing a remainder, means including eighth logical circuitry formed from diodes and coupled to the first register for providing a shift of the signal indications in the first register in successive words, means including ninth logical circuitry formed from diodes and coupled to the second register for providing a shift of the signal indications in the second register relative to the signal indications in the first register in successive words, means including the second storage member and including tenth logical circuitry formed from diodes for storing particular signal indications from the second register upon the introduction of signal indications to the register in successive word times, means including the first logical circuitry and including eleventh logical circuitry formed from diodes and coupled to the first and second registers and to the second storage member for combining the signal indications from the first and second registers in each shift of the signal indications from the registers and in accordance with the signal indications from the storage means in each such shift, means including twelfth logical circuitry formed from diodes and coupled to the first logical circuitry and to the third register for introducing particular signal indications from the first logical circuitry to the third register in each recirculation of the signal indications from the first register, and means including thirteenth logical circuitry coupled to the third register for providing a shift of the signal indications in the third register relative to the signal indications in the first register in each shift of the signal indications in the first register; and means including fourteenth logical circuitry coupled to the other logical circuitry and to the registers for respectively obtaining the operations of addition, subtraction, multiplication and division at the first and second particular times and at third and fourth particular times in accordance with first, second, third and fourth distinctive control signals provided by the fourteenth logical circuitry.

17. In the combination set forth in claim 16, means including the second register for storing signal indications representing the polarity of the multiplicand, means including the third register for storing signal indications representing the polarity of the multiplier, means including fifteenth logical circuitry formed from diodes and coupled to the first storage member and responsive to the signal indications representing the polarities of the multiplicand and the multiplier for providing in the storage member signal indications representing the polarity of the product, and means including sixteenth logical circuitry formed from diodes and coupled to the first storage member and to the first logical circuitry for controlling the operation of the first logical circuitry in performing addition at first particular periods of the third particular time and for performing subtraction at second particular periods of the third particular time in each shift of the signal indications in the second and third registers and in accordance with the signal indications provided by the first storage member.

18. In the combination set forth in claim 16, means including the first register for storing signal indications representing the polarity of the divisor, means including the second register for storing signal indications representing the polarity of the dividend, means including fifteenth logical circuitry formed from diodes and coupled to the first storage member and responsive to the signal indications representing the polarities of the dividend and the divisor for providing in the storage member signal indications representing the polarity of the quotient, and means including sixteenth logical circuitry formed from diodes and coupled to the first storage member and to the first logical circuitry for controlling the operation of the first logical circuitry in performing addition at first particular periods of the fourth particular time and for performing subtraction at second particular periods of the fourth particular time in each shift of the signal indications in the first and second registers and in accordance with the signal indications provided by the first storage member.

19. In the combination set forth in claim 16, means including the second register for storing signal indications representing the polarity of the multiplicand, means including the third register for storing signal indications representing the polarity of the multiplier, means including fifteenth logical circuitry formed from diodes and coupled to the first storage member and responsive to the signal indications representing the polarities of the multiplicand and the multiplier for providing in the storage member signal indications representing the polarity of the product, means including sixteenth logical circuitry formed from diodes and coupled to the first storage member and the first register for providing for the introduction to the register of signal indications representing the polarity of the product, and means including seventeenth logical circuitry formed from diodes and coupled to the first storage member and to the first logical circuitry for controlling the operation of the first logical circuitry in performing addition at first particular periods of the fourth particular time and for performing subtraction at second particular periods of the fourth particular time in each shift of the signal indications in the second and third registers and in accordance with the signal indications provided by the first storage member; means including the second register for storing signal indications representing the polarity of the dividend, means including the first register for storing signal indications representing the polarity of the divisor, means including eighteenth logical circuitry formed from diodes and coupled to the first storage member and responsive to the signal indications representing the polarites of the dividend and the divisor for providing in the storage member signal indications representing the polarity of the quotient, means including nineteenth logical circuitry formed from diodes and coupled to the first storage member and the third register for providing for the introduction to the register of signal indications representing the polarity of the quotient, and means including twentieth logical circuitry formed from diodes and coupled to the first storage member and the first logical circuitry for controlling the operation of the first logical circuitry in performing addition at the first particular periods of the fourth particular time and for performing subtraction at the second particular periods of the fourth particular time in each shift of the signal indications in the first and second registers and in accordance with the signal indications provided by the first storage member.

20. In the combination set forth in claim 19, means including a third storage member and including twenty first logical circuitry formed from diodes and coupled to the second register for storing in the storage member signal indications representing the sign of the dividend in the successive shifts of the signal indications in the first and second registers, and means including twenty second logical circuitry coupled to the third storage member and to the third registers and to the first logical circuitry for controlling the signal indications entered into the third register from the first logical circuitry in each shift of the signal indications in the first and second registers and in accordance with the signal indications stored in the third storage member to represent the polarity of the dividend.

References Cited in the file of this patent

UNITED STATES PATENTS

| | | |
|---|---|---|
| 2,538,615 | Carbrey | Jan. 16, 1951 |
| 2,590,950 | Eckert et al. | Apr. 1, 1952 |
| 2,604,262 | Phelps et al. | July 22, 1952 |
| 2,609,143 | Stibitz | Sept. 2, 1952 |
| 2,633,402 | Fleming | Mar. 31, 1953 |
| 2,634,052 | Bloch | Apr. 7, 1953 |
| 2,637,812 | Hagen | May 5, 1953 |
| 2,700,504 | Thomas | Jan. 25, 1955 |
| 2,701,095 | Stibitz | Feb. 1, 1955 |
| 2,703,201 | Woods-Hill et al. | Mar. 1, 1955 |
| 2,719,670 | Jacobs et al. | Oct. 4, 1955 |
| 2,749,037 | Stibitz | June 5, 1956 |
| 2,758,787 | Felker | Aug. 14, 1956 |
| 2,764,343 | Diener | Sept. 25, 1956 |
| 2,772,050 | Robinson et al. | Nov. 27, 1956 |
| 2,775,402 | Weiss | Dec. 25, 1956 |
| 2,776,794 | Williams et al. | Jan. 8, 1957 |
| 2,810,516 | Tootill et al. | Oct. 22, 1957 |

FOREIGN PATENTS

| | | |
|---|---|---|
| 678,427 | Great Britain | Sept. 3, 1952 |

OTHER REFERENCES

Hartree: Calculating Instruments and Machines, published by The Univ. of Illinois Press, Urbana, Ill., Copyright 1949, pages 97 to 109.

ERA (1), 24 Digit Parallel Computer With Magnetic Drum Memory (PX29136), Engineering Research Associates, Inc., St. Paul, Minn., 1949, pages 9, 10, 30 to 58, and Figs. 3.4–1 to 3.4–20, and 3.5–1 to 3.5–7.

ERA (2), High Speed Computing Devices, Engineering Research Associates, Inc., McGraw Hill Book Co., Inc., New York, copyright 1950, page 187.

Synthesis of Electronic Computing and Control Circuits, Computation Lab., Harvard Univ. Press, Cambridge, Mass., copyright 1951, pages 158 to 173, and 189 to 200.

Auerbach et al.: The Binac, Proceedings of the I.R.E., January 1952, pages 12 to 28.

UNITED STATES PATENT OFFICE
Certificate of Correction

Patent No. 2,936,116                                              May 10, 1960

Phil A. Adamson et al.

It is hereby certified that error appears in the above numbered patent requiring correction and that the said Letters Patent should read as corrected below.

Column 8, line 27, for "$\bar{a}_{j-1}\bar{b}.\bar{c}_{j-1}$" read —$\bar{a}_j.\bar{b}_j.\bar{c}_{j-1}$—; line 56, for "$a_j.b_j.c_{j-1}$", third occurrence, read —$\bar{a}_j.\bar{b}_j.c_{j-1}$—; column 30, line 64, for "$(c_{j-1}-$" read —$(\bar{c}_{j-1}-$; column 31, line 47, for "$(Tba+\bar{b}_j+$" read — $(Tba+\bar{b}_j)+$ —; column 33, line 59, for "etherwise" read —Otherwise—; column 36, line 23, for "$Dt(15)$" read —$\overline{Dt}(15)$—; column 37, line 50, for "$Wt$" read —$\overline{Wt}$—; line 66, for "Oper)", second occurrence, read —$\overline{\text{Oper}}$)—; column 39, lines 15 and 16, each line, for "$D^1$", second occurrence, read —$D^2$—; column 40, line 23, for "$\bar{I}^3$" read —$I^3$—; column 42, line 21, for "$Af^{(j+1)}$" read —$\overline{Af}^{(j+1)}$—; column 45, line 22, for "more" read —were—; column 48, line 8, for "$Tba.S.b_1+Tba$" read —$Tba.S.b_1+\overline{Tba}$—; column 53, line 21, strike out "at other times"; column 54, line 24, strike out "a multiplier, a second register for storing in a plurality".

Signed and sealed this 13th day of June 1961.

[SEAL]

Attest:  
ERNEST W. SWIDER,                                             DAVID L. LADD,  
*Attesting Officer.*                                               *Commissioner of Patents.*